US012812198B2

(12) United States Patent
Pezeshki et al.

(10) Patent No.: US 12,812,198 B2
(45) Date of Patent: Nov. 24, 2026

(54) METHODS AND APPARATUS TO PROVIDE ELECTRONIC PROGRAM GUIDE (EPG) DATA

(71) Applicant: DIRECTV, LLC, El Segundo, CA (US)

(72) Inventors: Reza Pezeshki, Chevy Chase, MD (US); Horia-Mihai Popa, Iasi (RO); Wassim Daccache, Ellicott City, MD (US); Drew Truland Chen, Clarksburg, MD (US); Ionut-Andrei Luncanu, Iasi (RO); Richard Bradley Tatem, Middletown, MD (US)

(73) Assignee: DIRECTV, LLC, El Segundo, CA (US)

( * ) Notice: Subject to any disclaimer, the term of this patent is extended or adjusted under 35 U.S.C. 154(b) by 0 days.

(21) Appl. No.: 19/210,376

(22) Filed: May 16, 2025

(65) Prior Publication Data

US 2026/0113497 A1 Apr. 23, 2026

Related U.S. Application Data

(60) Provisional application No. 63/710,850, filed on Oct. 23, 2024.

(51) Int. Cl.

| | |
|---|---|
| ***H04N 21/2662*** | (2011.01) |
| ***H04N 21/24*** | (2011.01) |
| ***H04N 21/84*** | (2011.01) |

(52) U.S. Cl.

CPC ..... *H04N 21/2662* (2013.01); *H04N 21/2402* (2013.01); *H04N 21/84* (2013.01)

(58) Field of Classification Search

None

See application file for complete search history.

(56) References Cited

U.S. PATENT DOCUMENTS

| | | | |
|---|---|---|---|
| 8,341,255 | B2 | 12/2012 | Gopalakrishnan |
| 8,661,472 | B1 | 2/2014 | Kardatzke |
| 9,235,941 | B2 | 1/2016 | Ricci et al. |
| 9,361,373 | B1 | 6/2016 | Price |
| 9,369,654 | B2 | 6/2016 | Shoykher et al. |
| 9,591,339 | B1 | 3/2017 | Christie et al. |
| 12,032,650 | B2 | 7/2024 | Epstein |
| 2009/0019178 | A1 | 1/2009 | Melnyk et al. |
| 2013/0036234 | A1 | 2/2013 | Pazos et al. |

(Continued)

*Primary Examiner* — James R Marandi

(74) *Attorney, Agent, or Firm* — Hanley, Flight & Zimmerman, LLC

(57) ABSTRACT

Systems, apparatus, articles of manufacture, and methods are disclosed. An example apparatus to provide electronic programming guide (EPG) data, the apparatus comprising: interface circuitry, machine readable instructions, and programmable circuitry to at least one of instantiate or execute the machine readable instructions to: obtain a request for EPG data from a client device within the private network, identify a first media stream corresponding to a first copy of content and second media stream corresponding to a second copy of the same content, and provide, in response to the request, EPG data of the first media stream but not the second media stream to the client device, the providing based on one or more EPG filtering policies set by a management organization of the private network.

20 Claims, 26 Drawing Sheets

(56) References Cited

U.S. PATENT DOCUMENTS

| | | | | |
|---|---|---|---|---|
| 2014/0130097 | A1 | 5/2014 | Londero | |
| 2015/0128170 | A1 | 5/2015 | Fu et al. | |
| 2015/0134841 | A1 | 5/2015 | Fu et al. | |
| 2016/0360278 | A1 | 12/2016 | Moskowitz | |
| 2018/0123810 | A1 | 5/2018 | Luby et al. | |
| 2019/0025202 | A1* | 1/2019 | Mulligan ............... | G01N 15/14 |

* cited by examiner

610

```
{

612   MAXIMUM_BANDWITDTH = 1250000;

614   CLIENT_GROUP_A.NUM_CHANNELS( ) = 4;
      CLIENT_GROUP_A.CHANNEL_SELECT( ) = <LOCAL NEWS, WEATHER>;
      CLIENT_GROUP_A.CHANNEL_ORDER( ) = { // PRIOTIZE WEATHER IN THE MORNING };
      CLIENT_GROUP_A.CHANNEL_QUALITY() = LOW;
      CLIENT_GROUP_A.ASSIGN( ) = <SD_602A, SD_602B, ...>;

616   CLIENT_GROUP_B.NUM_CHANNELS( ) = VARIABLE;
      CLIENT_GROUP_B.CHANNEL_SELECT( ) = // ONLY SPORTS-RELATED MEDIA
      CLIENT_GROUP_B.CHANNEL_ORDER( ) = { // PRIOTIZE CHANNELS SHOWING GAMES;
                                          // PRIOTIZE GAMES WITH LOCAL TEAMS };
      CLIENT_GROUP_B.CHANNEL_QUALITY() = LOW;
      CLIENT_GROUP_B.ASSIGN( ) = <SD_604A, SD_604B, ...>;

618   CLIENT_GROUP_C.ISDEFAULT( ) = TRUE;
      CLIENT_GROUP_C.NUM_CHANNELS( ) = VARIABLE;
      CLIENT_GROUP_C.CHANNEL_SELECT( ) = ALL_UNIQUE;
      CLIENT_GROUP_C.CHANNEL_ORDER( ) = { // MOVE FAMILY-FRIENDLY CONTENT
                                             TO TOP OF UI };
      CLIENT_GROUP_C.CHANNEL_QUALITY() = MEDIUM;
      CLIENT_GROUP_C.ASSIGN( ) = <SD_606A, SD_606B, ...>;

620   CLIENT_GROUP_D.NUM_CHANNELS( ) = VARIABLE;
      CLIENT_GROUP_D.CHANNEL_SELECT( ) = ALL_UNIQUE;
      CLIENT_GROUP_D.CHANNEL_ORDER( ) = { // MOVE ROMANCE MOVIES AND SHOWS
                                            TO BOTTOM  OF UI};
      CLIENT_GROUP_D.CHANNEL_QUALITY() = HIGH;
      CLIENT_GROUP_D.ASSIGN( ) = <SD_608A, SD_608B, ...>;

                          ...

622   CLIENT_GROUPn.ISDEFAULT( ) = FALSE;
      CLIENT_GROUPn.NUM_CHANNELS( ) = ###;
      CLIENT_GROUPn.CHANNEL_SELECT( ) = ###;
      CLIENT_GROUPn.CHANNEL_ORDER( ) = ###;
      CLIENT_GROUPn.CHANNEL_QUALITY( ) = ###;
      CLIENT_GROUPn.ASSIGN( ) = ###;

}
```

FIG. 6F

ORCHESTRATOR CIRCUITRY

ORCHESTRATOR CIRCUITRY

SESSION

SESSION

METHODS AND APPARATUS TO PROVIDE ELECTRONIC PROGRAM GUIDE (EPG) DATA

RELATED APPLICATION

This patent claims the benefit of U.S. Provisional Patent Application No. 63/710,850, which was filed on Oct. 23, 2024. U.S. Provisional Patent Application No. 63/710,850 is hereby incorporated by reference in its entirety. Priority to U.S. Provisional Patent Application No. 63/710,850 is hereby claimed.

FIELD OF THE DISCLOSURE

This disclosure relates generally to media streams and, more particularly, to methods and apparatus to provide EPG data.

BACKGROUND

In recent years, the number of devices within a given location that support media playback has increased. Conventionally, delivery of media content to multiple devices utilizes a unicast architecture in which a content delivery network supports n different transmissions of the same media from a content provider to n different devices. In some examples, the n devices that receive copies of the same media belong to a local network of streaming-capable devices within a shared environment.

BRIEF DESCRIPTION OF THE DRAWINGS

FIG. 6F is an illustrative example of pseudocode used by the CPM circuitry to distribute EPG data as shown in FIGS. 6A-6E.

In general, the same reference numbers will be used throughout the drawing(s) and accompanying written description to refer to the same or like parts. The figures are not necessarily to scale.

DETAILED DESCRIPTION

Figure 1:
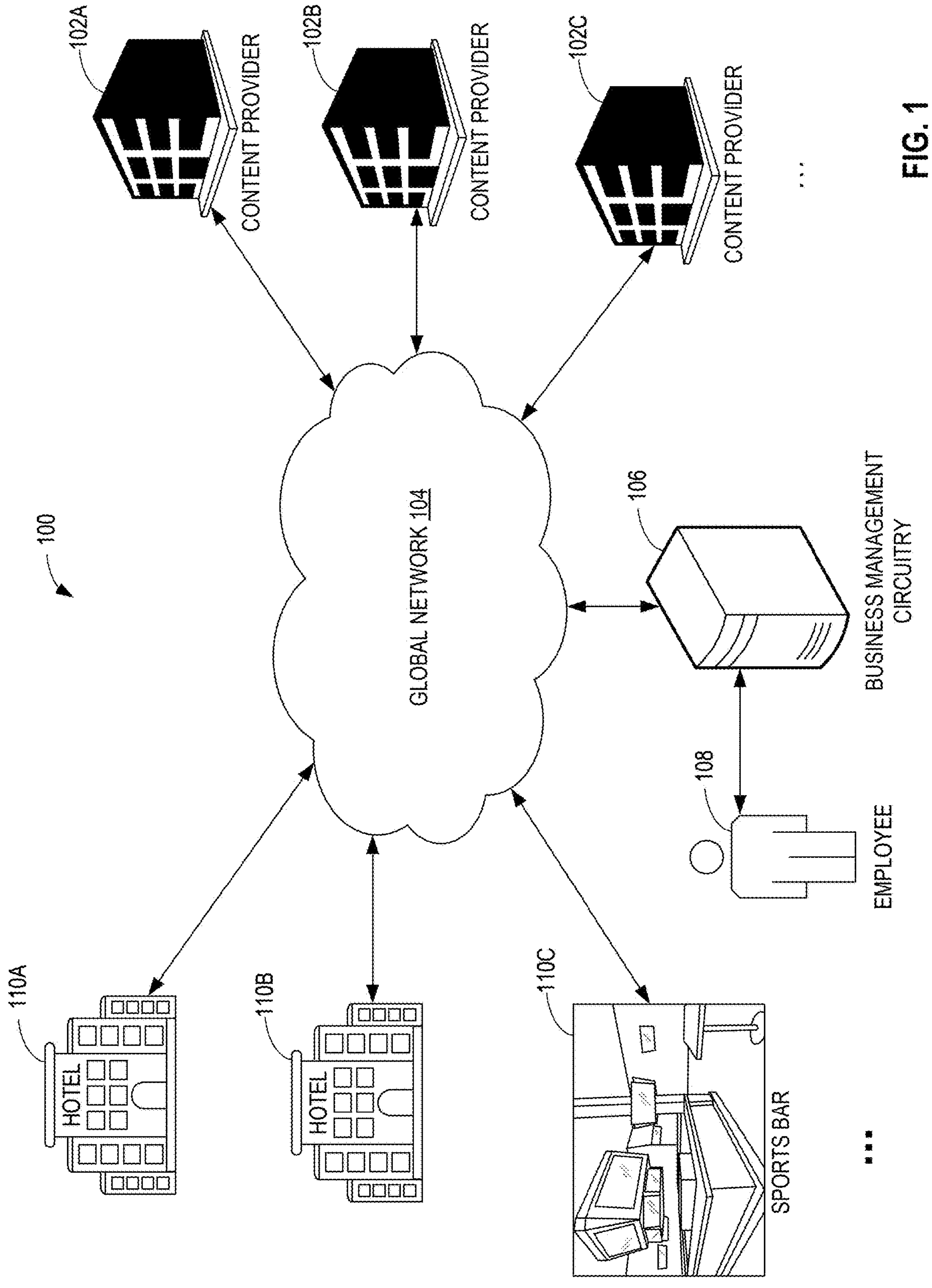
FIG. 1 is an illustrative example of media delivery.

In some use cases, unicast systems struggle to support efficient delivery of over the top (OTT) media. As used herein, OTT media refers to media that is transmitted and/or received over the Internet. For example, consider a streaming environment that includes both (1) a large number of devices requesting media and (2) legacy communications infrastructure having relatively limited total network traffic bandwidth. Such streaming environments may include, but are not limited to, hotels, malls, restaurants, sports bars, other commercial spaces, multiple dwelling units (MDUs), residential dwellings, etc. If such environments utilize a unicast content delivery network, a sufficiently large number of devices (n) requesting media at the same time can result in the need to transmit data that exceeds (or constitutes a disproportionate amount of) the total network traffic bandwidth available in the environment. As a result, one or more media playback sessions in the environment may experience a decrease in quality due to buffering, disconnections, etc. Additionally or alternatively, the large request for data from the n devices requesting media may cause other devices (e.g., phones, tablets, laptops) using the environment's local network to experience disconnections or other latencies. In some examples, a device requesting media is referred to as a client device.

Multicast content delivery systems may be utilized to decrease total network traffic and improve user experiences. In a multicast architecture, a content delivery network enables one transmission of a media stream from a content provider to a primary device (e.g., a server) located within the environment. The primary device then transmits n copies of the media stream to the n devices within the environment requesting the same media at approximately the same time.

Using multicast, the number of transmissions (e.g., channels of communication dedicated to a particular media stream) between the environment and the content delivery network is reduced from n to 1, thereby decreasing the total network traffic and improving user experiences.

As used above and herein, a media stream refers to data used to enable playback of a piece of media (e.g., a movie, a television show, a television channel, a live stream, etc.). The media stream may be provided to a playback device in any suitable format including but not limited to linear television channels and Video on Demand (VOD) services. The VOD services may follow any business model, including but not limited to Transactional Video on Demand (TVOD, also known as pay-per-view (PPV)), Subscription Video on Demand (SVOD), Advertising Video on Demand (AVOD), etc.

While multicast networks are generally more efficient than unicast networks, receiving a multicast stream requires the use of communication protocols that are not supported by some client devices. Additionally, different client devices may provide support for different types of multicast communication protocols. Such protocols include but are not limited to User Datagram Protocol (UDP) and Quadrature Amplitude Modulation (QAM). Thus, a streaming environment may include some client devices that only support unicast transmissions, some client devices that only support multicast transmissions via UDP, and some client devices that only support multicast transmissions via QAM. Such environments may still experience decreases in streaming quality due to the number of devices and network bandwidth limitations described above.

In examples below, unicast transmissions of media are formatted using HyperText Transfer Protocol (HTTP) Live Streaming (HLS) while multicast transmissions of media use either UDP or QAM. In other examples, one or more different streaming communication protocols are used to implement unicast and/or multicast transmissions.

In many examples, media streaming is facilitated by providing client devices with Electronic Program Guide (EPG) data. As used above and herein, EPG data refers to data that allows a user to learn about a media stream and subsequently select the media stream for viewing. EPG data may include but is not limited to a uniform resource link (URL) for the stream, a channel ID, poster art, authentication data structures such as tokens, etc. In general, client devices that use known techniques for media streaming obtain EPG data independently from one another. As part of such independent operation, a given client device generally communicates requests as much EPG data as possible, thereby providing users of the client device with as many channel and video options as possible.

While independent access to EPG data can be beneficial for client devices in personal usage contexts, such known techniques can be disadvantageous in business contexts. For example, consider a hotel with a large number of client devices and limited network bandwidth as described above (e.g., a streaming environment as described above). As described below, some client devices in the hotel may be used in specific roles that limit the amount and type of media such devices stream. Thus, a system that provides every client device in the hotel with access to all available EPG data adds unnecessary strain to the local network within the hotel.

In another example, client devices in the hotel with access to all available EPG data may request the highest video resolution possible despite being in a location where few people notice the video quality (e.g., in a lobby), thus consuming a relatively large amount of network bandwidth that could provide more business value to the hotel organization if it was assigned elsewhere (e.g., a guest room). Such network strain can lead to video buffering, disconnections, etc. as described above.

In a third example, client devices in the hotel with access to all available EPG data may request a version of a media stream from a first content provider, despite the hotel organization having a deal with a second content provider that would provide the same content to the client device at a lower cost. More generally, known techniques for client devices to obtain EPG data can decrease local network performance, add cost, decrease user experience, and add complexity for managing organizations when multiple client devices operate within a shared business context.

Example methods, apparatus, and systems described herein improve the quality of media streams in a streaming environment by performing local network operations based on global business logic. An example media manager device within a streaming environment serves as an intermediate between client devices (located within the streaming environment) and content providers (located outside the streaming environment). The media manager device can obtain all EPG data available to the streaming environment but provides only a subset of the EPG data to a given client device. In some examples, such operations of the media manager device are referred to as filtering EPG local data.

The example media manager device determines which EPG data is provided to a given client device (e.g., determines how to filter the EPG data) based on example business logic provided by a management organization. The management organization can provide business logic that includes both global rules that apply across its entire organization and local rules that are tailored to a particular streaming environment. Accordingly, by filtering EPG data based on the business logic, the media manager device can remove duplicative media streams, remove unique media streams, and determine the order of remaining media streams based on the needs of the management organization. The business logic also enables the media manager device to perform different EPG filtering operations for different client devices within the streaming environment, thereby providing further flexibility. More generally, the examples described herein enable a management organization to centrally configure and manage EPG data for all client devices within the organization, even when said client devices are used in different contexts and are implemented in different streaming environments with different infrastructure and network resources. Moreover, applying business logic to EPG filtering operations as described in examples herein saves cost and reduces bandwidth when compared to a different architecture that first transfers multiple media streams (e.g. the video files themselves) from content providers to a client device and then applies policies to prevent the presentation of some transferred media streams or to prioritize certain transferred media streams over others.

FIG. 1 is an illustrative example of media streaming. The example of FIG. 1 shows a system 100 that includes content providers 102A, 102B, 102C, . . . (collectively referred to as content providers 102), a global network 104, business management circuitry 106, a user 108, and streaming environments 110A, 110B, 110C, . . . (collectively referred to as streaming environments 110).

The content providers 102 provide data that forms various media streams. A media stream may be formatted as a linear television channel, a live stream, a video on demand (VoD) or streaming platforms, etc. The media stream may correspond to any type of content, including news, sports, television shows, movies, etc. FIG. 1 illustrates three content providers 102A, 102B, 102C for simplicity. In practice, a given device may request media from any number of content providers 102.

A given content provider 102A may host one or more compute devices (e.g., servers) that receive requests for content and provide a corresponding media stream via the global network 104. In some examples, the OTT media provided by the content providers 102 is Digital Rights Management (DRM) HLS content that can only be transmitted using HTTP.

The global network 104 enables communication between one or more of the content providers 102, the business management circuitry 106, and the streaming environments 110. In some examples, the data exchange includes HTTP requests and HTTP streams as described above.

The global network 104 may be implemented by any number of internal nodes using any number of transmission mediums and any number of communication topologies. In the illustrative example of FIG. 1, the global network 104 is the Internet. However, the global network 104 may be implemented using any suitable wired and/or wireless network(s) including, for example, one or more data buses, one or more local area networks (LANs), one or more wireless LANs (WLANs), one or more cellular networks, one or more coaxial cable networks, one or more satellite networks, one or more private networks, one or more public networks, etc. As used above and herein, the term "communicate" including variances (e.g., secure or non-secure communications, compressed or non-compressed communications, etc.) thereof, encompasses direct communication and/or indirect communication through one or more intermediary components and does not require direct physical (e.g., wired) communication and/or constant communication, but rather includes selective communication at periodic or aperiodic intervals, as well as one-time events.

The streaming environments 110 refer to any environments in which a plurality of client devices request media. In examples described herein, the streaming environments 110A and 110B are hotels and the streaming environment 110C is a sports bar. In other examples, one or more of the streaming environments 110 may be a mall, a household with multiple televisions, other commercial or residential dwellings, etc. The various streaming environments 110 may have different numbers of client devices, different client device configurations, and/or different network infrastructure from one another. The term 'network infrastructure' as used above may include, but is not limited to, the amount and age of wiring within the building, whether the building supports COAX, Ethernet, WiFi, a combination thereof, or other Internet communication protocols, the amount of bandwidth that can be simultaneously consumed by client devices within the building, etc.

Media streaming within a given streaming environment 110A is controlled by media manager circuitry (MMC). An MMC uses instructions from the business management circuitry 106 to improve streaming quality and local network efficiency for client devices within the streaming environment 110A. The streaming environments 110, MMCs, and client devices are described further in connection with FIG. 2A.

In the examples described herein, the streaming environments 110A and 110B are part of a chain of hotels that are managed by an organization, e.g., a business. The operations performed by the MMC in the streaming environment 110A are different than those performed by the MMC in the streaming environment 110B because of the differences between the two networks described above. Furthermore, the management organization in charge of the hotel chain may have business reasons for controlling the local network within the streaming environment 110A differently from the local network within the streaming environment 110B. For example, a hotel that primarily serves business guests on travel may have different streaming requirements than a hotel that primarily serves families on vacation.

The business management circuitry 106 provides instructions, via the global network 104, to each of the MMCs within the respective streaming environments 110. Accordingly, the user 108 can interface with the business management circuitry 106 to simultaneously monitor and control one or more multiple streaming environments 110 in a scalable manner. The business management circuitry 106 can provide instructions that are applied globally across an organization (e.g., to every hotel in the hotel chain). The business management circuitry 106 can also provide instructions that are specific to a particular streaming environment 110B. In the example of FIG. 1, the user 108 is an employee of the hotel chain. In other examples, the user 108 is a different type of individual. The business management circuitry 106 is described further in connection with FIG. 8.

Figure 2A:
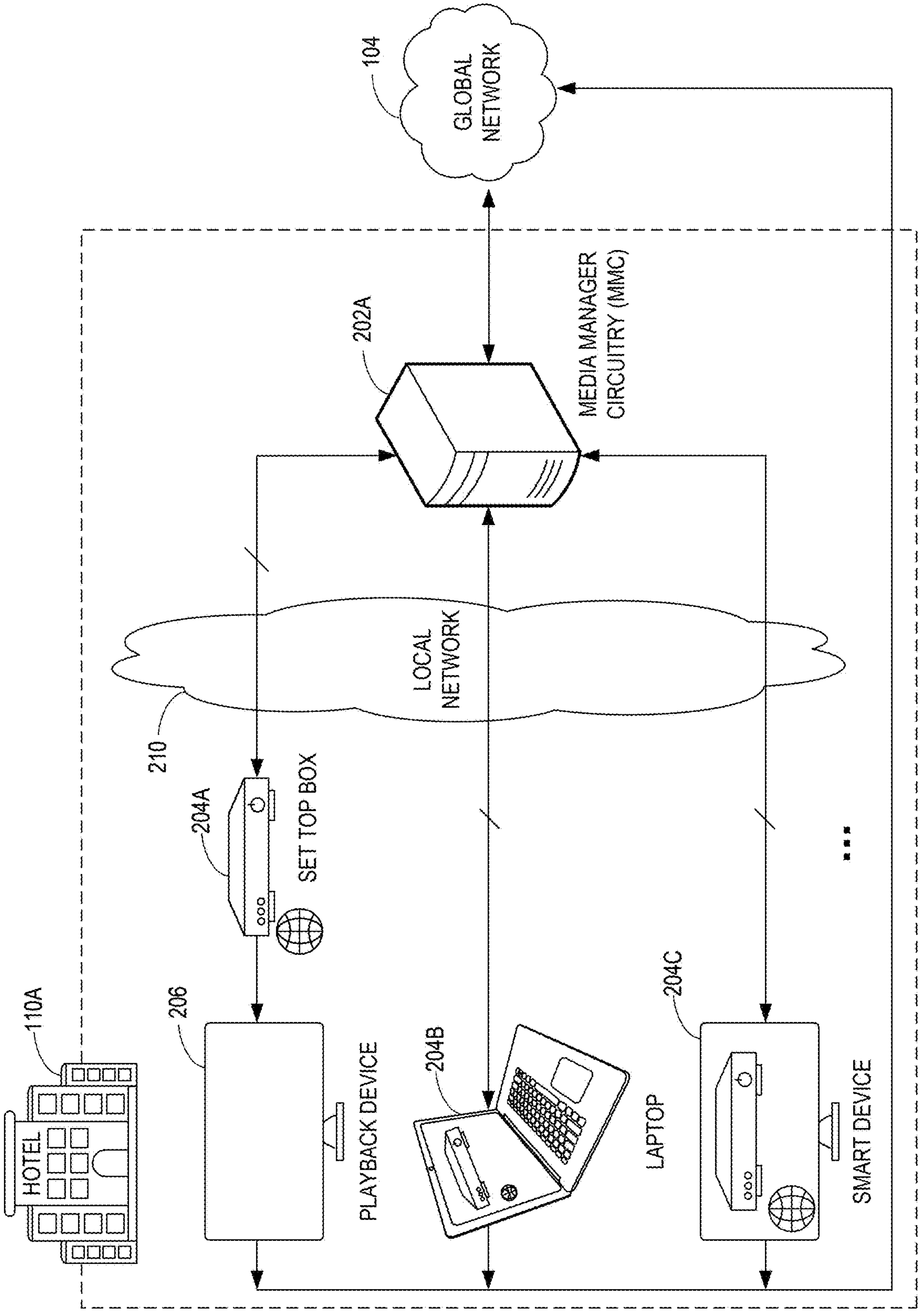
FIG. 2A is a block diagram of an example implementation of a streaming environment of FIG. 1.

FIG. 2A is a block diagram of a first example implementation of a streaming environment of FIG. 1. The example of FIG. 2A shows the streaming environment 110A includes MMC 202A, a set top box (STB) device 204A, a laptop 204B, a smart device 204C, . . . (collectively referred to as client devices 204), a playback device 206, and a local network 210. While the examples provided below refer to the streaming environment 110A, the teachings of this disclosure may be applied to any of the steaming environments 110.

The MMC 202A is a device that provides media streams to the client devices 204 in a manner that improves streaming quality and reduces bandwidth across the local network 210. In the illustrative example of FIG. 2A, the MMC 202A receives multiple requests for the same media streams (e.g., media from content provider 102A) from the client devices 204. In general, the MMC 202A makes one request and receives one media stream over the global network 104 per unique request generated from the client devices within the streaming environment 110. Upon receiving matching requests from one or more of the client devices 204, the MMC 202A sends a single request for the media stream to the content provider 102A via the global network 104 and receives a single HLS media stream.

The local network 210 refers to infrastructure within a given streaming environment 110A that enables the client devices 204 and MMC 202A to communicate with one another. Accordingly, the local network 210 may include hardware components such as cables, ports, routers, etc. In some examples, the local network 210 additionally includes intermediate devices such as Ethernet switches that receive a message from the MMC 202A, forward to one or more client devices 204, or vice versa. In some examples, the local network 210 may be referred to as a private network.

The MMC 202A transmits multiple copies of the media streams it receives to the client devices 204 that requested the media. Before the transmission, the MMC 202A reformats one or more copies of the media stream to match the settings of the requesting client devices 204 as described further below. Thus, the MMC 202A may simultaneously transmit one or more of a HLS unicast, and a UDP multicast, or a QAM carrying the same content. Advantageously, any client device that receives the stream data through a form of multicast reduces the bandwidth consumed by the local network 210 in comparison to the same client device having to instead use HLS unicast. The MMC 202A is described further in connection with FIG. 3.

The client devices 204 are devices within the that request media streams for playback. The media streams may be in any suitable architecture, including but not limited to linear television channels and Video on Demand (VoD)/streaming content. The client devices 204 form requests for media based on user input. The client devices 204 may use any suitable form of user input, including but not limited to button presses from a remote or software application, voice commands, etc. In some examples, the client devices 204 include Internet connections to request media streams, receive media metadata, receive user interface data, receive media streams, etc.

In some examples, one or more of the client devices 204 requests the same media stream. In such examples, the client devices 204 transmit the request to the MMC 202A, receive the corresponding media stream, and provide the resulting media data, e.g., synchronized image and audio data, to various internal or external displays. Such displays include but are not limited to the playback device 206, a laptop screen, a television screen, etc.

The client devices 204 may communicate with the MMC 202A using any suitable network communication protocol. Such protocols include but are not limited to Ethernet, COAX, WiFi, etc. The client devices 204 also support one or more stream delivery protocols. Such media protocols include but are not limited to HLS unicast, UDP multicast, or QAM. A given client device 204A may be limited to a particular selection of network communication protocol(s) and stream delivery protocol(s) for any reason, including but not limited to data storage requirements, processor speed requirements, the hardware, firmware, or software on the device being outdated, the streaming environment 110A not having the infrastructure to support a given protocol, etc.

In the example of FIG. 2A, each of the client devices 204A, 204B, 204C are able to communicate with the MMC 202A through the local network 210. In other examples, one or more of the client devices 204 are unable to communicate over the local network 210 and therefore communicate with the MMC 202A using the global network 104 instead. In such examples, communication between the client devices 204 and the MMC 202A that occurs through the global network 104 is referred to as back-channel communication. While FIG. 2A shows three client devices 204 for simplicity, the streaming environment 110A may include any number of client devices 204. The client devices 204 are described further in connection with FIG. 3.

Figure 2B:
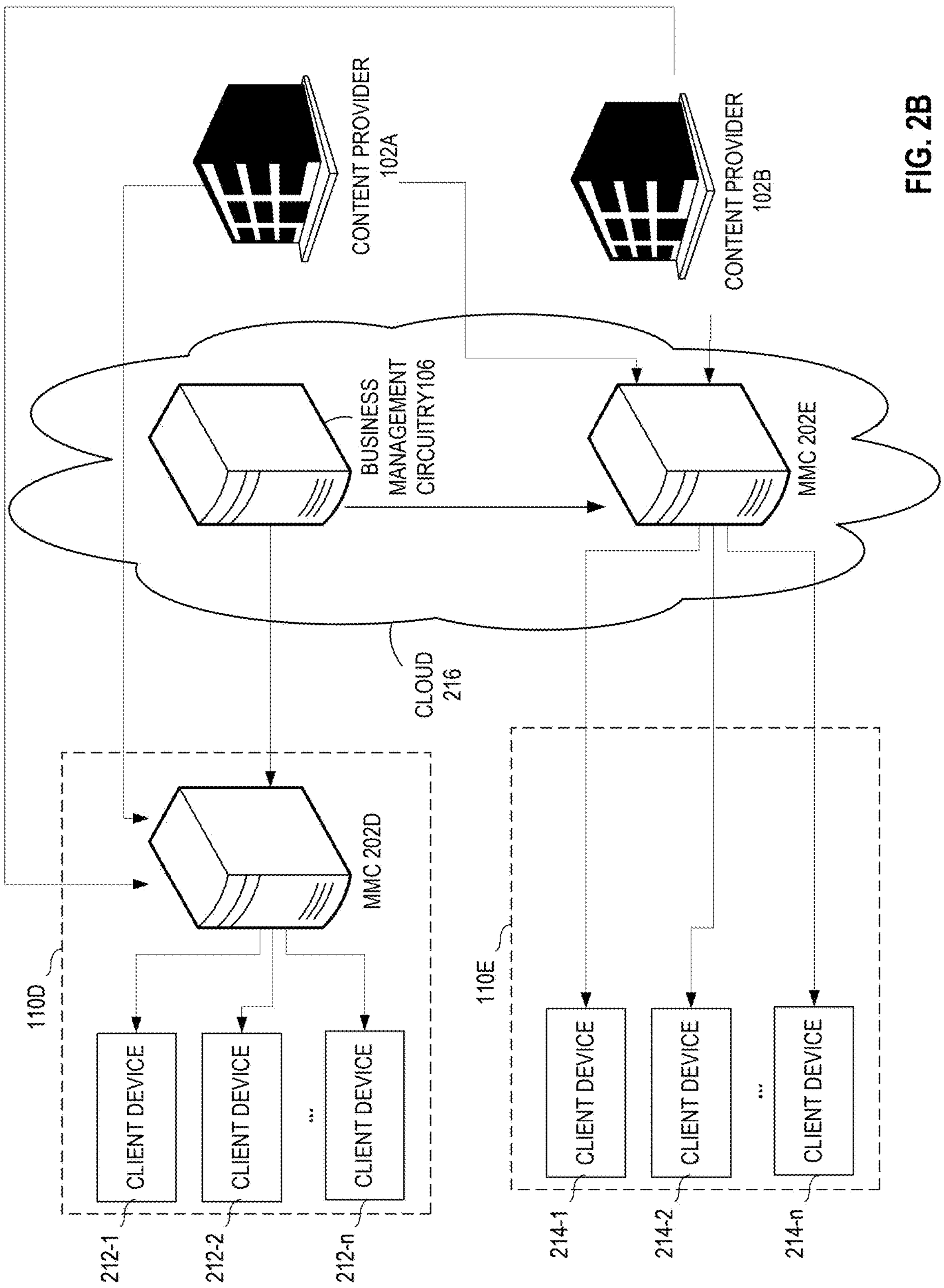
FIG. 2B is a block diagram of a second example implementation of a streaming environment of FIG. 1.

FIG. 2B is a block diagram of a second example implementation of streaming environments as described in FIG. 1. The example of FIG. 2B shows the content providers 102A and 102B and the business management circuitry 106 of FIG. 1, example streaming environments 110D and 110E, example media manager circuits (MMCs) 202D and 202E, example client devices 212-1, 212-2, . . . , 212-*n* (collectively referred to as client devices 212), and example client devices 214-1, 214-2, . . . , 214-*n* (collectively referred to as client devices 214).

The streaming environments 110D and 110E contain the client devices 212 and 214, respectively. The client devices 212 and 214 are example implementations of the client devices 204 as described in FIG. 2A. Similarly, the MMCs 202D and 202E of FIG. 2B are example implementations of the MMC 202A of FIG. 2. Thus, the client devices 212 receive a subset of the EPG data from the content providers 102A and 102B based on EPG filtering operations performed by the MMC 202D. Similarly, the client devices 212 receive a subset of the EPG data from the content providers 102A and 102B based on EPG filtering operations performed by the MMC 202E. In turn, both MMCs 202D and 202E perform their respective filtering operations based on instructions received from the business management circuitry 106.

In the example of FIG. 2B, the MMC 202D is implemented (e.g., physically located) within the streaming environment 110D while the MMC 202E is implemented in the cloud 216 with the business management circuitry. More generally, a given MMC can be implemented either on-premise within, or remotely from, a streaming environment managed by said MMC. By supporting remote MMCs, a management organization that generates business logic to control a streaming environment has the option to implement the MMC by renting cloud resources rather than owning, storing, and maintaining compute resources (e.g., a server) within the streaming environment.

The examples of FIGS. 2A and 2B describe architectures with one MMC per streaming environment. In other examples, a given MMC provides EPG data to client devices spread across multiple different streaming environments. Such an MMC performs EPG filtering operations based on business logic that may or may not be specific to a particular streaming environment. Furthermore, the multiple streaming environments services by a single MMC may or may not be managed by the same organization. For example, in some architectures, an MMC and the business management circuitry 106 are implemented as a remote cloud service by a third party. In such examples, multiple organizations can subscribe to the third party service and submit their own business logic. In return, one or more streaming environments managed by the organizations receive filtered EPG data from the MMC based on the business logic.

Figure 3:
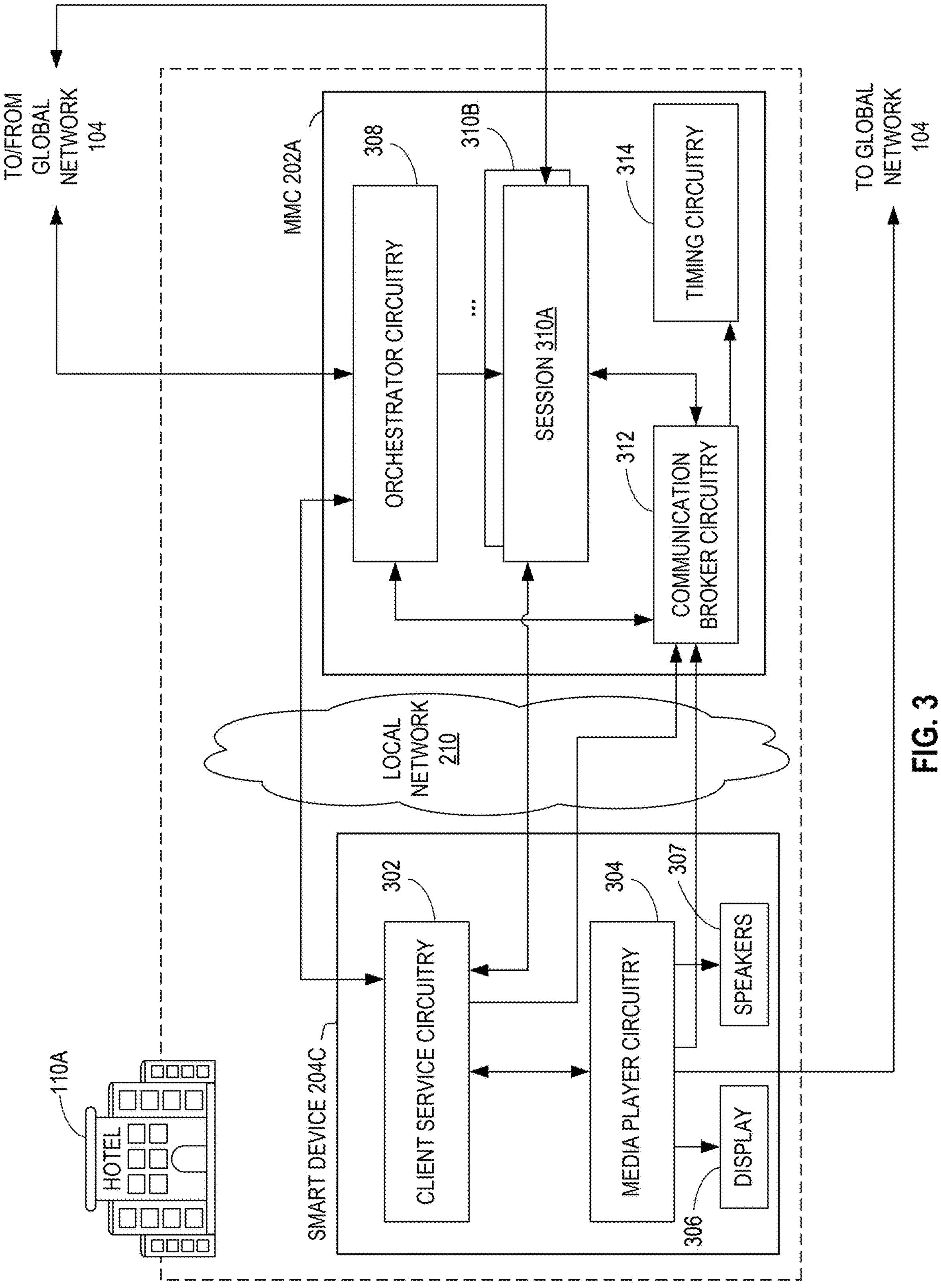
FIG. 3 is a block diagram of an example implementation of the smart device and media manager circuitry (MMC) of FIG. 2A.

FIG. 3 is a block diagram of an example implementation of a client device and the MMC of FIG. 2A to stream media. The client devices 204 and MMC 202A may be instantiated (e.g., creating an instance of, bring into being for any length of time, materialize, implement, etc.) by programmable circuitry such as a Central Processor Unit (CPU) executing first instructions. Additionally or alternatively, the client devices 204 and the MMC 202A of FIG. 2A may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. Some or all of the circuitry of FIG. 3 may, thus, be instantiated at the same or different times. Some or all of the circuitry of FIG. 3 may be instantiated, for example, in one or more threads executing concurrently on hardware and/or in series on hardware. Moreover, in some examples, some or all of the circuitry of FIG. 3 may be implemented by microprocessor circuitry executing instructions and/or FPGA circuitry performing operations to implement one or more virtual machines and/or containers.

The example of FIG. 3 includes the smart device 204C, the local network 210, and the MMC 202A. The example of FIG. 3 shows the smart device 204C includes client service circuitry 302, media player circuitry 304, a display 306, and speaker devices 307. The example of FIG. 3 also shows the MMC 202A includes orchestrator circuitry 308, sessions 310A, 310B, . . . (collectively referred to as sessions 310), communication broker circuitry 312, and timing circuitry 314.

Within the smart device 204C, the client service circuitry 302 communicates with the MMC 202A to obtain media streams. For example, the client service circuitry 302 self-registers with the orchestrator circuitry 308, requests a media stream from the orchestrator circuitry 308, and receives media stream data from one of the sessions 310. The client service circuitry 302 also forwards the media stream data to the media player circuitry and provides stream metrics to the communication broker circuitry 312. In this example, the stream metrics generally include metadata that describe the state of communications between the client service circuitry 302 and the MMC 202A. Accordingly, stream metrics generated by the client service circuitry 302 may include but is not limited to a description of whether any of its requests for media streams have failed, the number of media stream segments that have been received, etc. In some examples, the client service circuitry 302 is instantiated by programmable circuitry executing client service instructions and/or configured to perform operations such as those represented by the flowchart(s) of FIGS. 9A-9B.

The media player circuitry 304 presents the media stream data it receives from the client service circuitry 302 by providing video data to the display 306 and audio data to one or more speakers 307. The media player circuitry 304 may perform any type of reformatting or decapsulation operations necessary to convert the media stream data into an output that is interpretable by the display 306 and speakers 307. For example, the media player circuitry 304 determines individual Red, Green and Blue (RGB) values for pixels on the display 306 based on image frames within the media stream data. The media player circuitry 304 also reports stream metrics to the communication broker circuitry 312. In this example, the stream metrics generally refer to information that describes the media playback. Accordingly, stream metrics generated by the media player circuitry 304 include but are not limited to a description of whether the media player is buffering, idle, tuning between different media streams, etc.

The media player circuitry 304 also provides Digital Rights Management (DRM) data to the content providers 102 via the global network 104. Unlike the video and audio data that is requested and received through the MMC 202A, the individual client devices 204 provide DRM data to the content providers 102. In some examples, the media player circuitry 304 is instantiated by programmable circuitry executing media player instructions and/or configured to perform operations such as those represented by the flowchart(s) of FIGS. 9A-12.

Within the MMC 202A, the orchestrator circuitry 308 controls the streaming activity of all client devices 204 within the streaming environment 110A, including but not limited to the smart device 204C. For example, the orchestrator circuitry 308 broadcasts metadata to new client devices 204 that join the streaming environment 110A to self-register. Advantageously, the orchestrator circuitry 308 also filters EPG data given to the client devices 204 to determine what media streams a given client device 204C can access. The orchestrator circuitry 308 performs filtering operations based on instructions provided by the business management circuitry 106 via the global network 104. Such remote control provides customizability and scalability for organizations that manage multiple streaming environments, e.g., the hotel chain with streaming environments 110A and 110B. In some examples, the orchestrator circuitry 308 is instantiated by programmable circuitry executing orchestrator instructions and/or configured to perform operations such as those represented by the flowchart(s) of FIGS. 9A-12. The orchestrator circuitry 308 is described further in connection with FIGS. 4 and 5.

The sessions 310 represent software modules that obtain media stream data from the content providers 102 and distribute the media stream data to one or more client devices 204. The sessions 310 are opened and closed by the orchestrator circuitry 308 so that there is one session open per unique media title that is currently being requested by the client devices 204. For example, suppose the set top box 204A requests a news channel stream and the laptop 204B requests a home improvement channel stream at the same time. In response, the orchestrator circuitry 308 opens session 310A and provides instructions for the session 310A to obtain and distribute news channel stream data. The orchestrator circuitry 308 also opens session 310B and provides instructions for the session 310B to obtain and distribute home improvement channel stream data. If a user then tunes the smart device 204C to the home improvement channel while the laptop 204B is still streaming the same media, the orchestrator circuitry 308 forwards the request from the smart device 204C to the session 310B instead of opening a new session. Thus, a single session 310B can support multiple client devices 204 that are simultaneously requesting data from the same media stream. The example FIG. 3 shows two active sessions 310A and 310B. More generally, the orchestrator circuitry 308 may instantiate any number of concurrently active sessions 310. In some examples, the sessions 310 are instantiated by programmable circuitry executing session instructions and/or configured to perform operations such as those represented by the flowchart(s) of FIGS. 9A-12. The sessions 310 are described further in connection with FIG. 7.

The communication broker circuitry 312 provides an interface to enable the exchange of data both internally between components of the MMC 202A and externally with the client devices 204. To do so, the communication broker circuitry 312 receives and forwards data to various components in FIG. 3 using a communication protocol. The communication protocol used may be any suitable machine-to-machine network protocol, including but not limited to Message Queue Telemetry Transport (MQTT).

The communication broker circuitry 312 may receive and forward any type of data to support the operations of the streaming environment 110A. For example, the client service circuitry 302 or media player circuitry 304 may send event messages to the communication broker circuitry 312 via the local network 210. The event messages may include but are not limited to information describing stream properties, client device configuration properties, whether the media stream is buffering, etc. The communication broker circuitry 312 then forwards the event messages to the timing circuitry 314.

The timing circuitry 314 affixes timestamps to obtained streaming metrics and distributes the results to one or more of the orchestrator circuitry 308 or business management circuitry 106. The timing circuitry 314 may use any suitable technique to store and receive time series data. Such techniques include but are not limited to software applications such as InfluxDB. In some examples, the timing circuitry 314 is instantiated by programmable circuitry executing timing instructions and/or configured to perform operations such as those represented by the flowchart(s) of FIGS. 9A-12.

As type of communications facilitated by the communication broker circuitry 312 are internal messages within the MMC 202A. For example, initialization of the sessions 310 requires operations that may occur independently of the orchestrator circuitry 308. Once the session 310A is initialized, it sends the communication broker circuitry 312 a message indicating the session 310A is ready to proceed. The communication broker circuitry 312 forwards the message to the orchestrator circuitry 308. In turn, the orchestrator circuitry provides configuration data that is forwarded back to the session 310A via the communication broker circuitry 312. The configuration data may include instructions to obtain and distribute stream data from a particular content provider, e.g., a network that broadcasts the news channel discussed above. In some examples, the communication broker circuitry 312 is instantiated by programmable circuitry executing communication broker instructions and/or configured to perform operations such as those represented by the flowchart(s) of FIGS. 9A-12.

Figure 4:
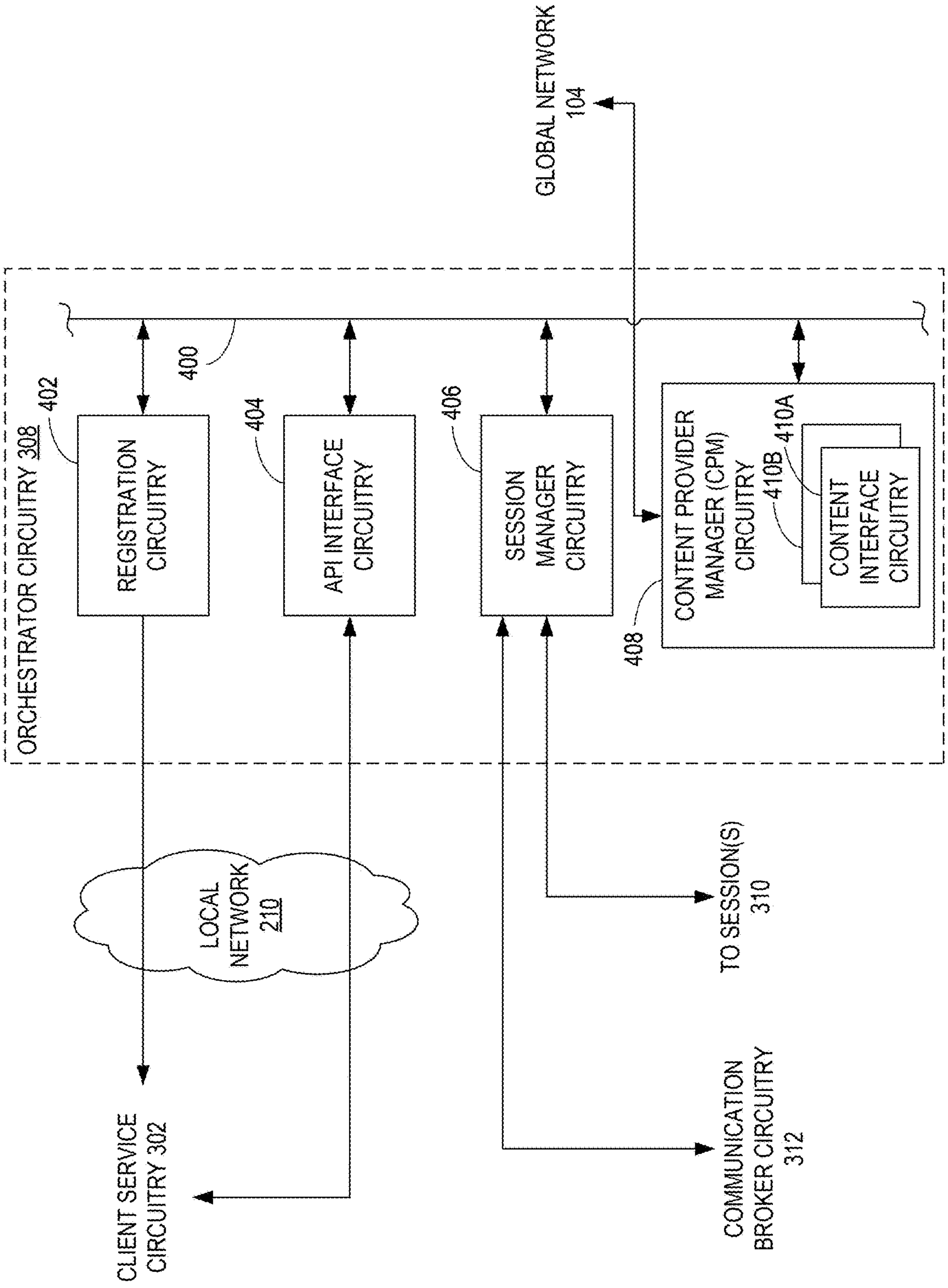
FIG. 4 is a block diagram of an example implementation of the orchestrator circuitry of FIG. 3.

FIG. 4 is a block diagram of an example implementation of the orchestrator circuitry of FIG. 3. The example of FIG. 4 shows the orchestrator circuitry 308 includes a bus 400, registration circuitry 402, application program interface (API) interface circuitry 404, session manager circuitry 406, and content provider manager (CPM) circuitry 408. The CPM circuitry 408 includes content interface circuitry 410A, 410B, . . . (collectively referred to as content interface circuits 410).

The bus 400 refers to one or more physical connections (e.g., an interconnect, copper trace, etc.) that enables communication between the registration circuitry 402, the API interface circuitry 404, the session manager circuitry 406, and the CPM circuitry 408. The bus 400 may be implemented using one or more communication systems that meet pre-determined threshold power and latency requirements.

The registration circuitry 402 broadcasts configuration messages over the local network 210 for any device on the network to obtain. The broadcasts contain data that enables new client devices 204 that join the streaming environment 110A to self-register with the orchestrator circuitry 308. Accordingly, a configuration message may include information including but not limited to an Internet Protocol (IP) address and/or a Media Access Control (MAC) address of the orchestrator circuitry 308, a description of the roles and/or authorizations of the orchestrator circuitry 308, encryption data, the operating mode of the MMC 202A (e.g., HTTP or HTTPS), etc. In some examples, the registration circuitry 402 is instantiated by programmable circuitry executing registration instructions and/or configured to perform operations such as those represented by the flowchart(s) of FIGS. 9A-12.

The API interface circuitry 404 manages an API that is used by the client service circuitry 302 and various components of the orchestrator circuitry 308 to communicate over the local network 210 as shown in FIG. 4 or, in some examples, the global network 104. For example, the API interface circuitry 404 receives self-registration data from client service circuitry 302. The self-registration data may include but is not limited to certificate files, usernames, and passwords, etc. The self-registration data is transmitted by the client service circuitry 302 in a specific format, e.g. using a particular function call, which is interpretable by the API interface circuitry 404. The API interface circuitry 404 then forwards the registration information to the registration circuitry 402, which determines whether to admit or deny the client device 204. Once the client device is admitted, the CPM circuitry 408 uses the API interface circuitry 404 to transmit Electronic Program Guide (EPG) data to the client service circuitry 302. The client service circuitry 302 also uses the APIs to request manifest files for various media streams described within the EPG data. The API interface circuitry 404 forwards such requests to the session manager circuitry 406, which determines how to respond. In some examples, the API interface circuitry 404 converts data from a first format into a different format supported by an API function call, or vice versa. In some examples, the API interface circuitry 404 is instantiated by programmable circuitry executing API interface instructions and/or configured to perform operations such as those represented by the flowchart(s) of FIGS. 9A-12.

The session manager circuitry 406 opens and closes the sessions 310 based on the requests that are received from the client devices 204 within the streaming environment 110A. The session manager circuitry 406 also provides configuration instructions to the various sessions 310. In some examples, the session manager circuitry 406 is instantiated by programmable circuitry executing session manager instructions and/or configured to perform operations such as those represented by the flowchart(s) of FIGS. 9A-12.

The CPM circuitry 408 provides the client service circuitry 302, via the API interface circuitry 404, with EPG data that describes various media streams. Within the CPM circuitry 408, the content interface circuits 410 communicate with the respective content providers 102 to obtain the EPG data. The example of FIG. 4 includes two content interface circuits 410A and 410B. More generally, the CPM circuitry 408 may include any number of content interface circuits 410 as described further in connection with FIG. 5.

The CPM circuitry 408 also filters the amount of data it receives from the content providers 102 so that a given client device 204 receives EPG data with only the media streams that the managing organization authorizes. The managing organization may authorize all media streams available to the client device 204 or, alternatively, authorize only a subset of the available media streams. The CPM circuitry 408 determines which combinations of client devices 204 and content providers 102 to filter based on instructions from the business management circuitry 106. Examples of such EPG filtering operations are described further in connection with FIGS. 5-6F. In some examples, the CPM circuitry 408 is instantiated by programmable circuitry executing CPM instructions and/or configured to perform operations such as those represented by the flowchart(s) of FIGS. 9A-12.

Figure 5:
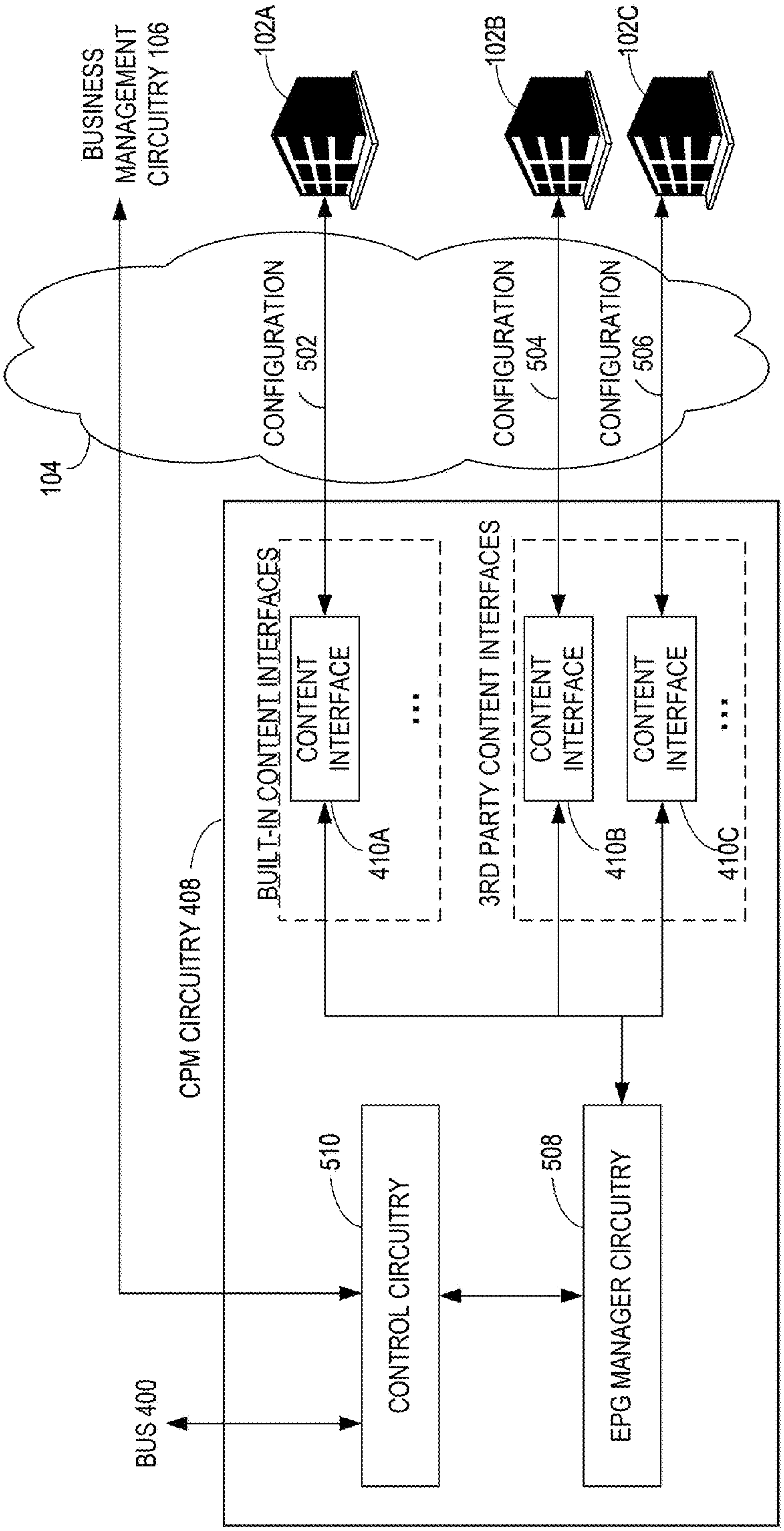
FIG. 5 is a block diagram of an example implementation of the content provider manager (CPM) circuitry of FIG. 4.

FIG. 5 is a block diagram of an example implementation of the CPM circuitry 408 of FIG. 4. The example of FIG. 5 shows the CPM circuitry 408 includes the content interface circuits 410, configurations 502, 504, and 506, EPG manager circuitry 508, and control circuitry 510.

The content providers 102 may provide any type of media streams as described above. For example, the content provider 102A may provide one or more linear television channels, content provider 102B may provide one or more VOD streams corresponding to a particular streaming platform, content provider 102C may provide footage from a security camera affixed to the hotel 110A, etc. Furthermore, some content providers 102 may be managed by a content distribution platform that provides multiple media streams, while other content providers 102 correspond to a network that produces a specific media stream. As such, the content providers 102 generally enforce different configurations from one another. As used in the context of FIG. 5, a configuration may refer to any combination of rules, protocols, procedures, APIs, data formats, etc. that a given content provider 102A uses to communicate with external devices. In the example of FIG. 5, the content provider 102A uses the configuration 502 for communication, the content provider 102B uses the configuration 504 for communication, and the content provider 102C uses the configuration 506 for communication.

In other media delivery architectures, an STB includes only one content interface circuit that communicates with one content provider. In some such examples, the content provider may correspond to the same organization that manufactures the STB, e.g., DirecTV®. Thus, while the STB in such an example provides media streams offered by DirecTV®, a user wishing to view media streams from other sources, e.g., PlutoTV®, Netflix®, Hulu®, etc., cannot use the STB to obtain said media. Instead, a user that participates in such a media delivery architecture must install third-party software applications on an Internet-capable device such as a tablet, laptop, smart TV, etc. The third-party software application then uses a particular configuration to communicate with its corresponding content provider and present media. While third-party software usage can be acceptable in contexts where the user owns the Internet-capable devices, such software usage can lead to security and scalability concerns in business contexts such as the streaming environment 110A. For example, an owner of a chain of hotels may have licensing agreements to provide content from certain content providers, and to exclude content from other content providers, in every hotel room television. Allowing hotel guests to install third-party software may lead to the streaming of unauthorized content, thereby breaking the licensing agreement. Furthermore, content that is streamed through third-party software applications cannot be managed by the hotel organization and therefore may consume a disproportionate amount of bandwidth, thereby decreasing the streaming quality for other client devices on the local network.

Advantageously, the CPM circuitry 408 in examples described herein includes one content interface circuit 410 per content provider 102 that is accessible to the orchestrator circuitry 308. The CPM circuitry 408 includes both content interface circuitry 410A that communicate with pre-approved content providers, e.g., DirecTV®, and content interface circuits 410B and 410C that communicate with third-party content providers, e.g., PlutoTV® and Netflix®. Thus, client devices 204 in examples described herein can present third-party content without installing the corresponding third-party software. Such an architecture provides additional security and scalability than other media delivery architectures.

The EPG manager circuitry 508 receives EPG data from the content interfaces 410 in different formats that correspond to the different configurations 502, 504, 506. The EPG manager circuitry 508 then normalizes the various EPG data so that the client devices 204 can use a single, standardized protocol from the API interface circuitry 404 to request and obtain the EPG data. Such normalization operations include but are not limited to changing file types, reorganizing data fields, concatenating or zero-padding data fields, adding certain metadata, removing certain metadata, and/or, more generally, mapping multiple unique data structures in which EPG data is received to a single data structure for use within the streaming environment 110A.

The EPG manager circuitry 508 also acts as a filter by providing the control circuitry 510 with standardized EPG data from some but not all of the content providers 102. The EPG manager circuitry 508 provides data from the specific content providers 102 requested by the control circuitry 510, which can request different sets of EPG data for different client devices 204. The control circuitry 510 determines which filters to apply based on instructions from the business management circuitry 106. Such instructions are described further in connection with FIGS. 6A-6F.

FIGS. 6A-6E are illustrative examples of EPG data distributed to various client devices by the CPM circuitry 408 of FIG. 4. The example of FIGS. 6A-6E include smart devices 602A, 602B, . . . (collectively referred to as smart devices 602), smart devices 604A, 604B, . . . (collectively referred to as smart devices 604), smart devices 606A, 606B, . . . (collectively referred to as smart devices 606), and smart devices 608A, 608B, . . . (collectively referred to as smart devices 608).

Figure 6A:
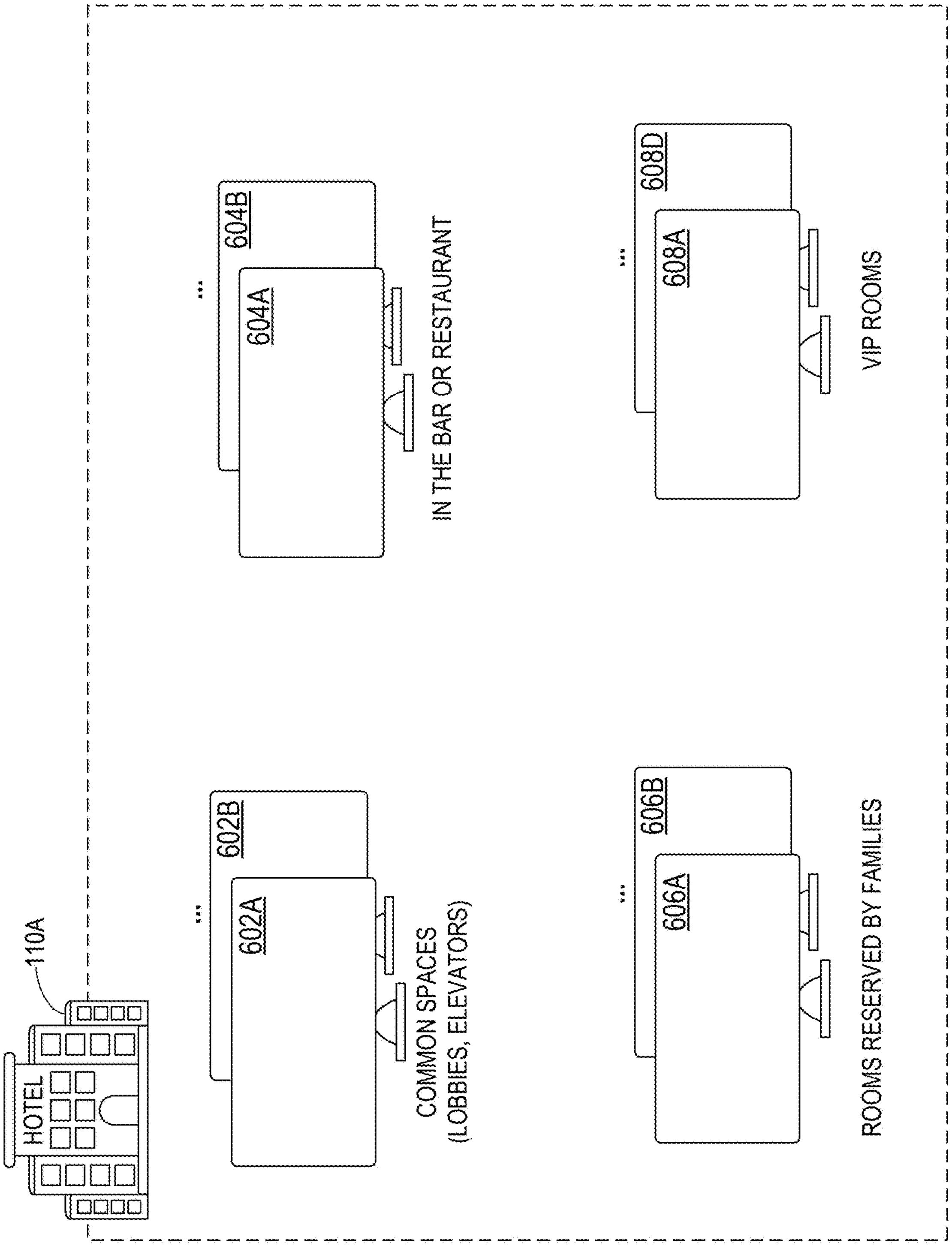
FIG. 6A-6E are illustrative examples of EPG data distributed to various client devices by the CPM circuitry of FIG. 4.

The smart devices 602-608 are all example implementations of the client devices 204 of FIG. 2A. That is, the smart devices 602-608 request media streams based on user input. In this example, the smart devices 602-608 are owned and managed by the hotel management organization (as opposed to being personal devices brought into the hotel 110A by guests or employees). Accordingly, the smart devices 602-608 are implemented in specific locations and used for specific purposes determined by the hotel management organization. For example, FIG. 6A shows the smart devices 602 are located within common spaces of the hotel 110A such as lobbies, elevators, etc. The smart devices 604 are located within bars and/or restaurants implemented within the hotel 110A. The smart devices 606 are located within hotel rooms that are currently reserved by families. The smart devices 608 are located within VIP rooms that host different clientele than the rooms where the smart devices 606 are located (e.g., couples on vacation, businesspersons on travel, etc.). The example of FIG. 6A shows four groups of client devices within the hotel 110A. More generally, a management organization may organize the client devices within a streaming environment into any number of groups. Client device groupings are described further in connection with FIG. 6F.

Figure 6B:
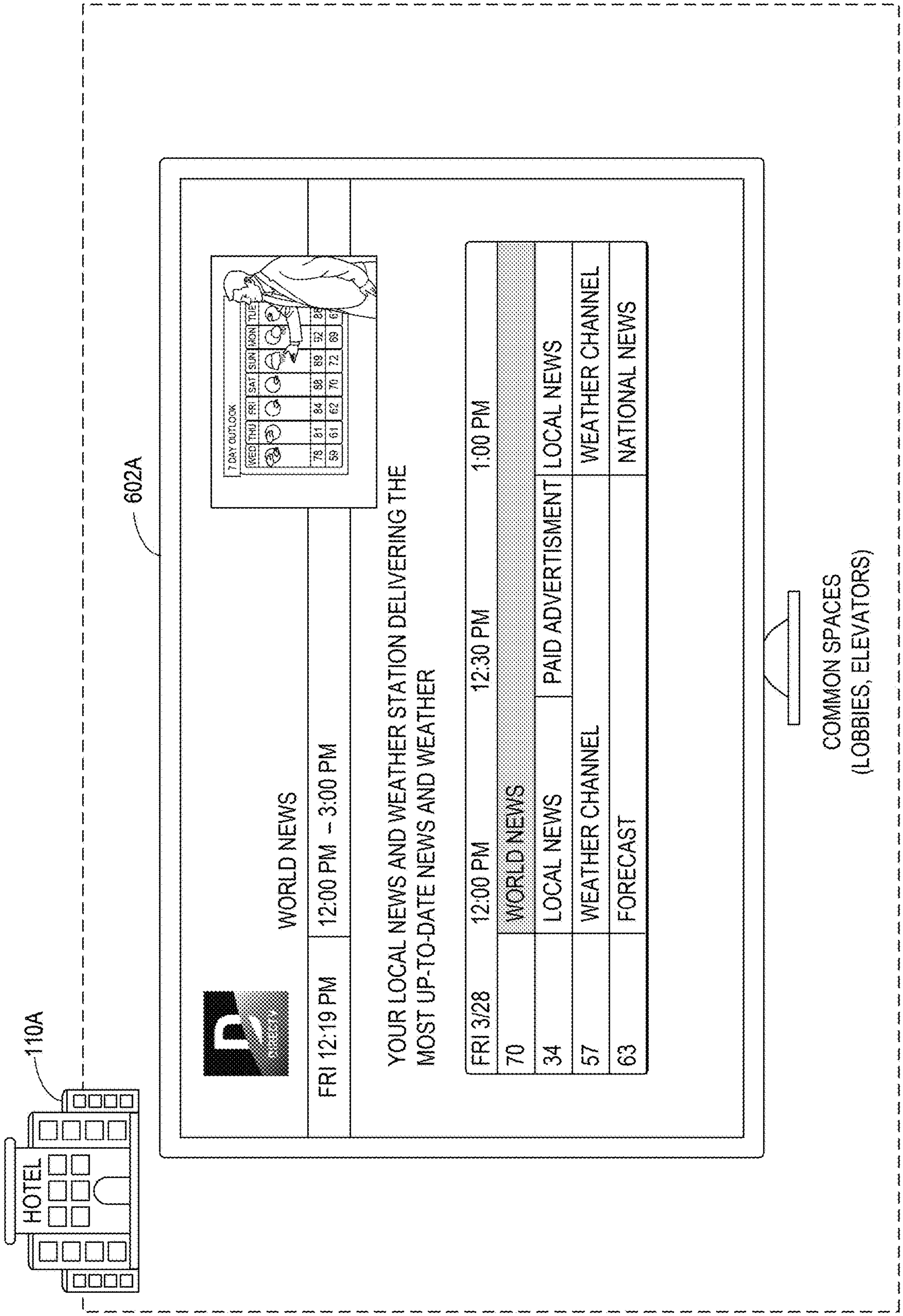

The examples described herein enable the EPG manager circuitry 508 and control circuitry 510 of FIG. 5 to remove duplicative media streams from the smart devices 602-608, remove unique media streams from the smart devices 602-608, and determine the order of remaining media streams displayed on the smart devices 602-608, based on the needs of the hotel 110A. For instance, FIG. 6B is an example user interface (UI) shown on the smart devices 602 of FIG. 6A. In general, viewers (guests, employees, etc.) do not spend extended periods of time watching television in lobbies or elevators. Thus, the hotel management organization has no need to consider the individual preferences of any one person when determining what media to show on the smart devices 602. Instead, client devices in such common spaces generally aim to quickly present information that a viewer can comprehend before leaving (e.g., walking out of the lobby or exiting an elevator).

In the example of FIG. 6B, the hotel management organization achieves the foregoing content-related business objectives by instructing the EPG manager circuitry 508 to provide only four channels (two news channels and two weather channels) to the smart devices 602. Thus, when performing filtering operations for the smart devices 602, the EPG manager circuitry 508 removes numerous unique media streams (e.g., media streams that show content not available on another media stream) that correspond to any content besides news and weather.

The EPG manager circuitry 508 also implements content-related business objectives by determining the order in which the smart devices 602 display EPG data. For example, the UIs of FIGS. 6B-6E each show grids in the leftmost column that represent channel indices. If a client device in the same geographic region of the hotel 110A was used for personal reasons, said client device would a) obtain all EPG data available within the geographic region and b) display the EPG data on its UI in order based on channel index (e.g., channel index 1 would be at the top of the grid, followed by channel index 2 at the subsequent row, etc.). Advantageously, the examples described herein enable businesses to reorganize the EPG data based on their specific needs. Thus, in the example of FIG. 6B, the hotel management organization placed the media stream at channel index 70 in front of the media stream at channel index 34 based on a determination that viewers in common spaces are most likely travelers more interested in world news than local news.

The order in which media streams are displayed on a UI is dynamic and can change at any time. For example, suppose the hotel management organization positions the news channels in front of the weather channels in the example of FIG. 6B because the example shows the smart device 602A at midday. In such examples, the hotel management organization may additionally provide business logic that instructs the EPG manager circuitry 508 to position the weather channels in front of the news channels for the smart devices 602 in the morning, when guests are more likely preparing to leave (to check out, to attend a business meetings or vacation excursion, etc.) and therefore would like to know the weather outside. The business logic then instructs the EPG manager circuitry 508 to reorder the channels to what is shown in FIG. 6B at a specific time. Such business logic can be provided for any reason, including but not limited to a determination by the hotel management organization that, after such time, their viewers would find the news more relevant than the weather.

The EPG manager circuitry 508 may also perform EPG filtering operations based on technical restraints. Such technical restraints may be inherent within the hardware capabilities of the client devices. For example, displays within elevators are generally small screens and may be therefore unable to support higher video resolutions. Technical restraints can also be imposed artificially using business logic. For example, the hotel management organization may determine that any of the smart devices 602 presenting media at 1080p video resolution is an inefficient use of bandwidth consumption in the local network 210 because viewers generally do not pay significant attention to the picture quality of screens in common spaces. Thus, in the example of FIG. 6B, the hotel management organization instructs the EPG manager circuitry 508 to only provide the smart devices 602 with EPG data that corresponds to media streams at 720p video resolution or lower (even though some of the smart devices 602, such as those in lobbies with larger screens, can support 1080p video resolution). To implement such instructions, the EPG manager circuitry 508 may remove duplicative media streams that correspond to the higher quality video resolution. For example, if a content provider 102 that corresponds to channel index 70 provides a first linear television stream at 720p and a second linear television stream of the same content at 1080p to the MMC 202A, the EPG manager circuitry 508 ensures the smart devices 602 only receive EPG data corresponding to the 720p variant. The EPG manager circuitry 508 may also implement the foregoing instructions by removing unique media streams that correspond to the higher quality video resolution. For example, if a content provider 102 provides a channel index 35 media stream with local news from a competitor network, but the media stream is only available in 4K, the example of FIG. 6B shows the EPG manager circuitry 508 prevents the smart devices 602 from receiving or displaying the EPG data for said media stream.

Like content-based filtering operations, the EPG manager circuitry 508 can dynamically adjust its technical-based filtering operations at any time. For example, the hotel management organization may make an exception to its foregoing rules when the total traffic across the local network 210 is sufficiently low for a threshold amount of time. The hotel management organization in the example of FIG. 6B instructs the EPG manager circuitry 508 to provide 1080p video resolution EPG data, only during such periods and only to smart devices 602 that support 1080p, because there are not currently any higher priority uses for the extra bandwidth.

Figure 6C:
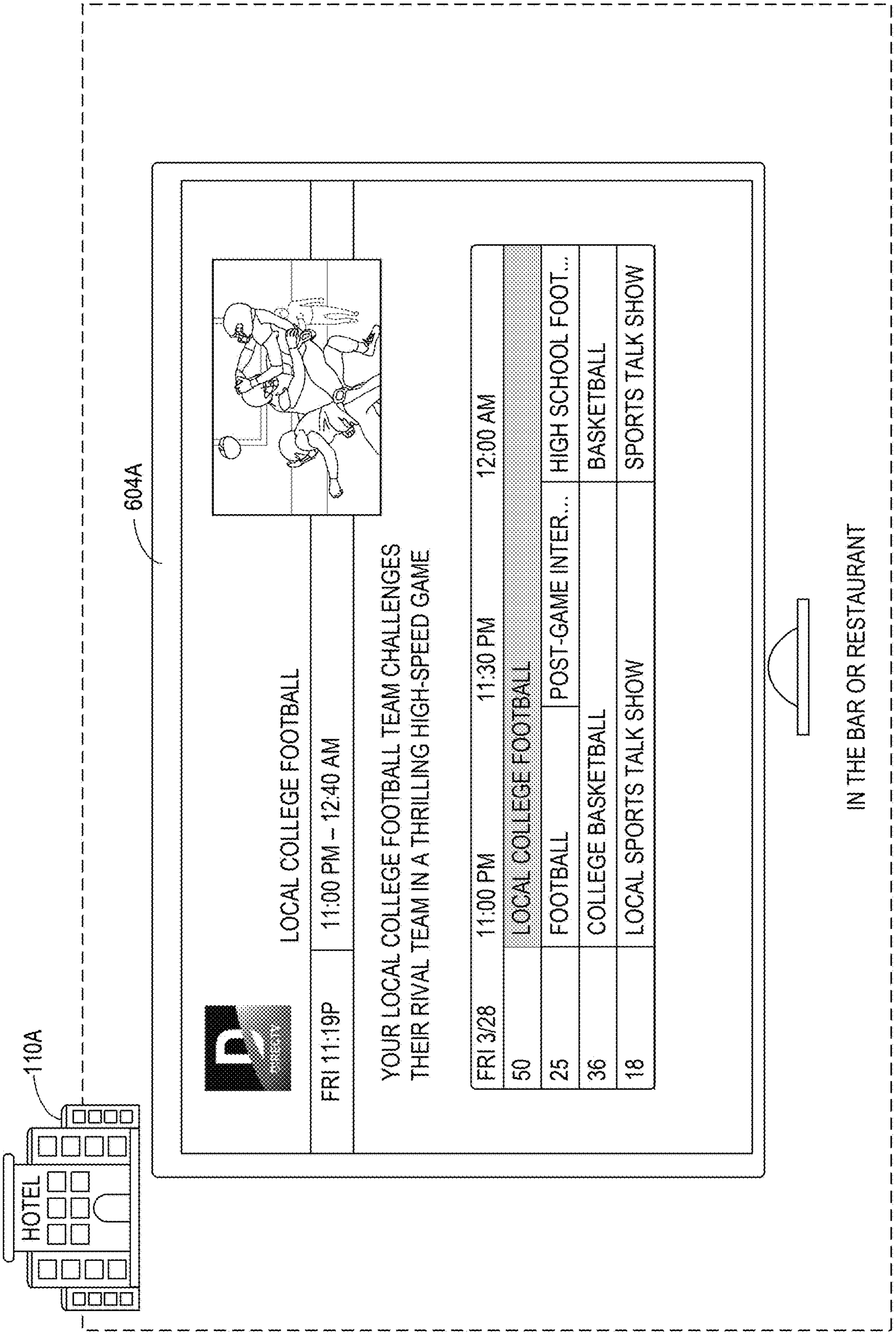

FIG. 6C is an example user interface (UI) shown on the smart devices 604 of FIG. 6A. Like the smart devices 602 in common spaces, the hotel management organization does not need to consider the individual preferences of any one person when determining what media to show within the bars or restaurants where the smart devices 604 are implemented. Instead, the example of FIG. 6C shows the hotel management organization instructs the EPG manager circuitry 508 to only provide the smart devices 604 with EPG data for media streams that are currently showing sports content. Thus, in this example, the smart devices 604 are provided only four media streams at the end of the evening. However, by dynamically applying business logic and updating filtering operations accordingly, the EPG manager circuitry 508 provided the smart devices 604 with a greater number of media streams earlier in the evening (e.g., during primetime) because a greater number of content providers 102 were presenting sports content at such time.

The EPG manager circuitry 508 also dynamically updates channel ordering in the example FIG. 6C. In general, the hotel management organization instructs the EPG manager circuitry 508 to position channels showing live sporting events in front of channels showing other sports content (such as the local sports talk show on channel 18). The hotel management organization also provides instructions for the EPG manager circuitry 508 to prioritize local sporting events over other sporting events when such media is available. Thus, the example UI in FIG. 6C shows the local college football game on channel 50 in front of the nationally televised football game on channel 25. However, the EPG manager circuitry 508 may move channel 50 down the list on the UI, may remove channel 50 entirely from the list of media streams available to the smart devices 604, or take no new filtering action, after the local college football game ends. The specific filtering action (or lack thereof) to channel 50 depends on the type of media presented on channel 50 after the game and the business rules provided to the EPG manager circuitry 508.

Figure 6D:
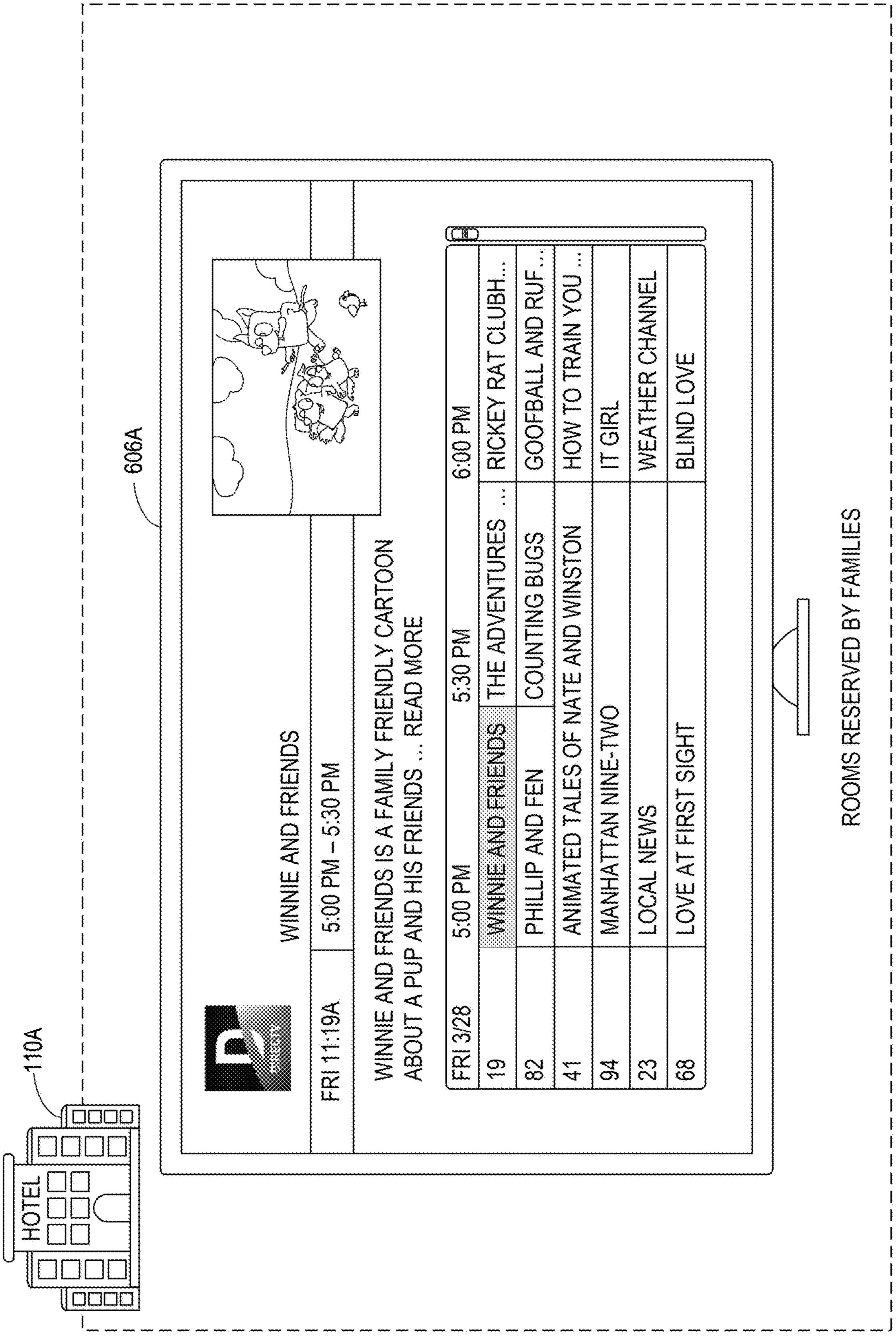

FIG. 6D is an example user interface (UI) shown on the smart device 606A of FIG. 6A. Unlike the common spaces, restaurants, and bars in the hotel 110A, the smart devices 606 are in private spaces (hotel rooms). Thus, the hotel management organization instructs the EPG manager circuitry 508 to maintain at least one copy of each unique media stream available to the MMC 202A, provided such media is authorized for public viewing. For example, the EPG manager circuitry 508 may provide the smart devices 606 with at least one set of EPG data for each movie, television show, documentary, news broadcast, sporting event, etc. available from the content providers 102 (thereby requiring the UI in the smart device 606 to include a scroll bar). Doing so enables the hotel management organization to support any media preferences a particular guest may have. However, the EPG manager circuitry 508 may ensure none of the smart devices 602-608 have EPG data of a video feed generated by a security camera within the hotel 110A, despite the video feed being available at the MMC 202A, because only employees of the hotel management organization are authorized to view the security video feed.

In some examples, the hotel management organization improves user experience by a) predicting which types of media particular users are interested in and b) instructing the EPG manager circuitry 508 to reorder EPG data based on the predictions. For instance, the example of FIG. 6D shows the hotel management organization instructed the smart device 606A (via the EPG manager circuitry 508) to position channels with animated shows and comedy shows towards the front of the list on the UI in anticipation that a family staying in the corresponding room would have the most interest in those channels.

In some examples, the EPG manager circuitry 508 changes filtering operations for the smart device 606A based on a determination that the room that corresponds to the smart device 606A is no longer reserved by a family. To change filtering operations, the EPG manager circuitry 508 may move the smart device 606A to a different client device group so that the foregoing business logic (e.g., provide all unique and authorized EPG data, organize family friendly content to the front of the UI) can still be used to filter EPG data for other smart devices 606B that are still being watched by families. Client device groupings are described further in FIG. 6F.

Figure 6E:
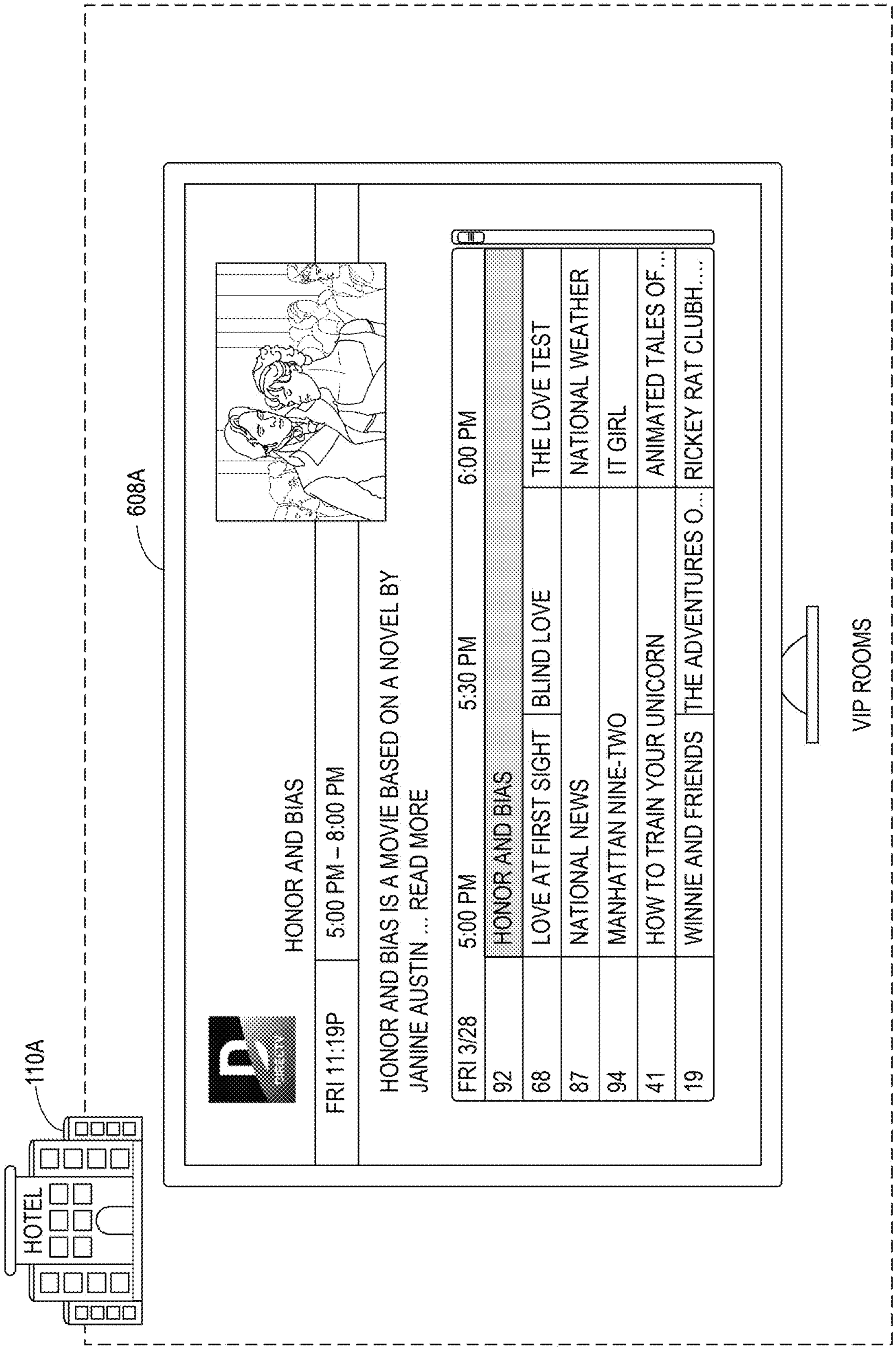

FIG. 6E is an example user interface (UI) shown on the smart devices 608 of FIG. 6A. Like the smart devices 606, the smart devices 608 are located within hotel rooms. Thus, the hotel management organization instructs the EPG manager circuitry 508 to maintain at least one copy of each unique media stream available to the MMC 202A (provided such media is authorized for public viewing) to support a wide variety of user content preferences. However, the smart devices 608 are located within rooms that have Very Important Perso (VIP) status. VIP rooms are generally more expensive than other rooms in a hotel and are less likely to be reserved by families. Accordingly, in the example of FIG. 6E, the hotel management organization instructs the smart devices 608 (via the EPG manager circuitry 508) to position channels showing romance movies and shows at the top of their UIs, followed by the comedy shows (channel index 94), followed by the animated shows (channel indices 41 and 19). In other examples, the hotel management organization instructs the EPG manager circuitry 508 to use different business logic when determining the order in which the smart devices 608 present EPG data.

In some hotels, the extra cost of VIP rooms also comes with extra perks. For example, the hotel management organization may provide business logic that prioritizes the video quality of the smart devices 602-608 in the following order: smart devices 608 have the highest video quality because they are in the VIP rooms, followed by smart devices 606 because they are watched by individual guests, and smart devices 602 and 604 have the lowest prioritization because they are generally playing in the background and not where people are focusing. To implement such a prioritization scheme, the EPG manager circuitry 508 may provide EPG data for higher quality stream variants to the smart devices 608 whenever a content provider 102 provides duplicative media streams. For example, suppose the content provider that supports channel 94 provides two media streams for the same channel: one media stream enables "Manhattan Nine-Two" to be streamed in 4K video resolution, while the other media stream enables "Manhattan Nine-Two" to be streamed in 1080p. In the examples of FIGS. 6A-6E, the EPG manager circuitry 508 implements the prioritization scheme by providing EPG data for the 4K video stream to the smart devices 608, by providing EPG data for the 1080p video stream to the smart devices 606, and by not providing any EPG data for channel 94 to the smart devices 602 and 604 as shown above.

FIG. 6F is an illustrative example of pseudocode used by the CPM circuitry to distribute EPG data as shown in FIGS. 6A-6E. The pseudocode 610 shown in the example of FIG. 6F shows an example maximum bandwidth value 612 and example client group definitions 614, 616, 618, 620, 622. While the following description of FIG. 6 refers to linear television channels, the EPG manager circuitry 508 may perform EPG filtering operations on any type of media stream as described above.

The pseudocode 610 is an example implementation of business logic provided by the business management circuitry 106 to the EPG manager circuitry 508. The pseudocode 610 may correspond to any programming language. In some examples, the business management circuitry 106 provides business logic in a different format. The business management circuitry 106 may also provide business logic for operations other than EPG filtering. The business management circuitry 106 is described further in connection with FIG. 8.

The maximum bandwidth value 612 represents a performance metric of the local network 210 that is used by the EPG manager circuitry 508 to interpret the client group definitions 614-622. For example, if the EPG manager circuitry 508 determines the bandwidth consumed by the client devices 204 exceeds the maximum bandwidth 612, the EPG manager circuitry 508 lowers the streaming quality of one or more client devices 204 in view of the .CHANNEL_QUALITY( ) prioritization information within the client group definitions 614-622. In other examples, the EPG manager circuitry 508 interprets the client group definitions 614-622 based on different performance metrics of the local network 210.

The client group definitions 614-622 refer to business logic that describes how the EPG manager circuitry 508 filters EPG data for the client devices within a particular client group. For example, within the client group definition 614, the line "CLIENT_GROUP_614.ASSIGN( )" shows that client group "A" currently includes the smart devices 602. Similarly, the client group definition 616 describes a client group that currently includes the smart devices 604, etc. As used above and herein, a client group refers to one or more client devices that receive the same filtered EPG data from the EPG manager circuitry 508. Thus, in the foregoing examples, all of the smart devices 602 present the same UI shown in FIG. 6B, all of the smart devices 604 present the same UI shown in FIG. 6C, etc.

In general, a management organization assigns client devices to various client groups so that all client devices within a given client group share at least one common property. For example, in FIGS. 6A-6F, all the smart devices 602 are located within a common space and thus assigned to client group "A", all the smart devices 604 are located within a bar or restaurant and thus assigned to client group "B", etc.

Notably, FIG. 6F shows initial assignments based on the client devices 204 that are present in the local network 210 at the time the business management circuitry 106 provides the pseudocode 610 to the EPG manager circuitry 508. If the conditions of the local network 210 change (e.g., existing client devices 204 are removed from the network, new client devices 204 are added to the network, the number or type of media currently being streamed by the client devices 204 changes, etc.), the EPG manager circuitry 508 can use additional instructions from the business management circuitry 106 to dynamically adjust the client group assignments. Such adjustments include but are not limited to creating new client groups, changing the composition of one or more existing client groups, and removing existing client groups.

In the pseudocode 610, the client group definition 618 satisfies the object property ".ISDEFAULT( )" with the binary value TRUE, which designates client group "C" as the default group. The business management circuitry 106 assigns one client group as a default per local network 210. In the example of FIG. 6F, all of the smart devices 606 are currently assigned to client group "C" as described above. In other examples, the default client group definition has an object property ".ASSIGN( )" that is satisfied with an empty data structure (e.g., "< >") because the business management circuitry 106 does not need to explicitly assign client devices to the default group in the pseudocode 610. Rather, the EPG manager circuitry 508 automatically adds client devices to the default group when they are not explicitly part of any other group. Similarly, the EPG manager circuitry 508 automatically removes a client device from the default group when said client device is explicitly added to any other group.

The business management circuitry 106 selects one client group to be the default group per streaming environment 110A, 110B, etc. Thus, in the client group definitions 614, 616, 620 of FIG. 6F where the object property ".ISDEFAULT( )" is not explicitly defined, the EPG manager circuitry 508 presumes the object property to be satisfied with the binary value FALSE. That is, the EPG manager circuitry 508 presumes a given client group is not the default group unless the business logic provided by the business management circuitry 106 explicitly indicates otherwise.

As mentioned above, the EPG manager circuitry 508 and/or business management circuitry 106 may change the client group assignments at any time and for any reason. Such reasons include but are not limited to a change in the designation of some client devices 204 (e.g., the hotel management organization changes some standard rooms to VIP rooms). In such examples, the business may choose to change the client group assignments in view of the changing client device designations. Additional reasons for changing client group assignments include but are not limited to connectivity changes. For example, if some client devices 204 were initially streaming media over Wi-Fi but are then upgraded to stream media over Ethernet, the management organization may want to switch those client devices to a higher quality group.

Within the client group definitions 614-622, the object property ".NUM_CHANNELS( )" designates a given client group having either a fixed or variable number of channels (and/or, more generally, a fixed or variable number of media streams). If the business management circuitry 106 designates a client group as fixed, the MMC 202A is forbidden from editing the number of channels provided to said client group. Thus, in this example, the client group definition 614 shows that the smart devices 602 are permanently set to the four channels shown in FIG. 6B.

The business management circuitry 106 may assign a fixed number of channels to a client group for any reason, including but not limited to the role of the client group within the business, the performance of the local network 210, etc. For example, by setting "CLIENT_GROUP_A.NUM_CHANNELS( )=4;" in the client group definition 614 and guaranteeing that the smart devices 602 collectively request no more than four unique media streams at any time, the hotel management organization can place an upper limit on how much of the maximum bandwidth 612 is consumed to service the common spaces of the hotel 110A. Furthermore, the instantaneous bandwidth consumed by the smart devices 602 is less likely to change (and is therefore easier to plan for) than the instantaneous bandwidth consumed by a client group whose devices could request any number of unique media streams at a given time.

Within the client group definitions 614-622, the object property ".CHANNEL_SELECT( )" describes business logic that indicates which media streams are kept (e.g., provided to the client group) and which media streams are removed (e.g., not provided to the client group) when the EPG manager circuitry 508 performs filtering operations. In examples where NUM_CHANNELS( ) is fixed, such as the client group definition 614, the business management circuitry 106 may satisfy the "CHANNEL_SELECT( )" function call by explicitly defining which media streams to provide to the client groups.

In other examples where NUM_CHANNELS( ) is variable, the business management circuitry 106 satisfies the ".CHANNEL_SELECT( )" object property by providing business logic whose output may dynamically change. For example, the client group definition 616 indicates the EPG manager circuitry 508 only provides sports-related media to client group "B". Thus, the specific media streams provided to the client group "B" can change based on what content is showing on available linear television channels when the EPG manager circuitry 508 performs EPG filtering operations. The business logic provided with the ".CHANNEL_SELECT( )" can also include technical restraints that are inherent within the client device hardware or artificially imposed by the business management circuitry 106, as described above.

In still other examples (such as the client group definitions 618 and 620), business management circuitry 106 satisfies the ".CHANNEL_SELECT( )" object property by providing an "ALL_UNIQUE" variable. As used in the example of FIG. 6F, the EPG manager circuitry 508 interprets the variable "ALL_UNIQUE" by providing a corresponding client group with at least one copy of each unique media stream available to the MMC 202A (provided such media is authorized for public viewing as discussed above).

The EPG manager circuitry 508 may remove duplicative media streams when performing EPG filtering operations for a client group, regardless of whether the ".CHANNEL_SELECT( )" object property is satisfied with explicitly encoded channel selections, dynamically changing business logic, or the "ALL_UNIQUE" variable. For example, in FIGS. 6D and 6E, the content provider associated with channel 94 provided two media streams of the same "Manhattan Nine-Two" episode at different video resolutions, but the EPG manager circuitry 508 provides only one media stream corresponding to channel 94 to each of the smart devices 606 and 608. In FIG. 6F, the EPG manager circuitry 508 determines which duplicative media stream to remove for a given client group by prioritizing some client groups over others based on the object property ".CHANNEL_QUALITY( )". Accordingly, the smart devices 608 received the 4K version of the episode because the ".CHANNEL_QUALITY( )" property of the client group "D" is set to "HIGH", while the smart devices 606 received the 1080p version of the episode because the ".CHANNEL_QUALITY( )" property of the client group "D" is set to "LOW". In other examples, the EPG manager circuitry 508 uses a different technique to remove duplicative media streams.

As used above and herein, two media streams are considered duplicative if the content (e.g., the video and audio presented at playback) in the media streams are identical. Notably, two media streams with identical content can still have differences including but not limited to format, source, cost, video resolution, bandwidth consumption, latency, etc. In some examples, the business management circuitry 106 instructs the EPG manager circuitry 508 to remove duplicative media streams based on one or more of the foregoing factors. Such EPG filtering operations are described further in connection with FIG. 10C.

As mentioned above, filtering operations performed by the EPG manager circuitry 508 are not limited to linear television channels. For example, suppose the client devices 204 include a feature where users can search for any piece of content, and the UI of the client devices 204 returns a list of VOD services (e.g., Netflix®, PlutoTV®, YouTube®, etc.) where said content can be streamed on demand. In such an example, the EPG manager circuitry 508 may perform filter EPG data such that one or more of the VOD services do not appear in the search results despite having the duplicative content on their platform. Furthermore, the EPG manager circuitry 508 may remove a VOD service from the search results even if said VOD service is the only platform where a particular piece of content is available. In still other examples, the EPG manager circuitry 508 provides a client group with access to a VOD service in general but prevents the client group from streaming specific titles from the VOD service by filtering out the corresponding EPG data. The EPG manager circuitry 508 may remove specific pieces of content and/or remove entire media platforms (such as linear television channels, VOD services, etc.) for any reason as described further in FIG. 10C.

Figure 7:
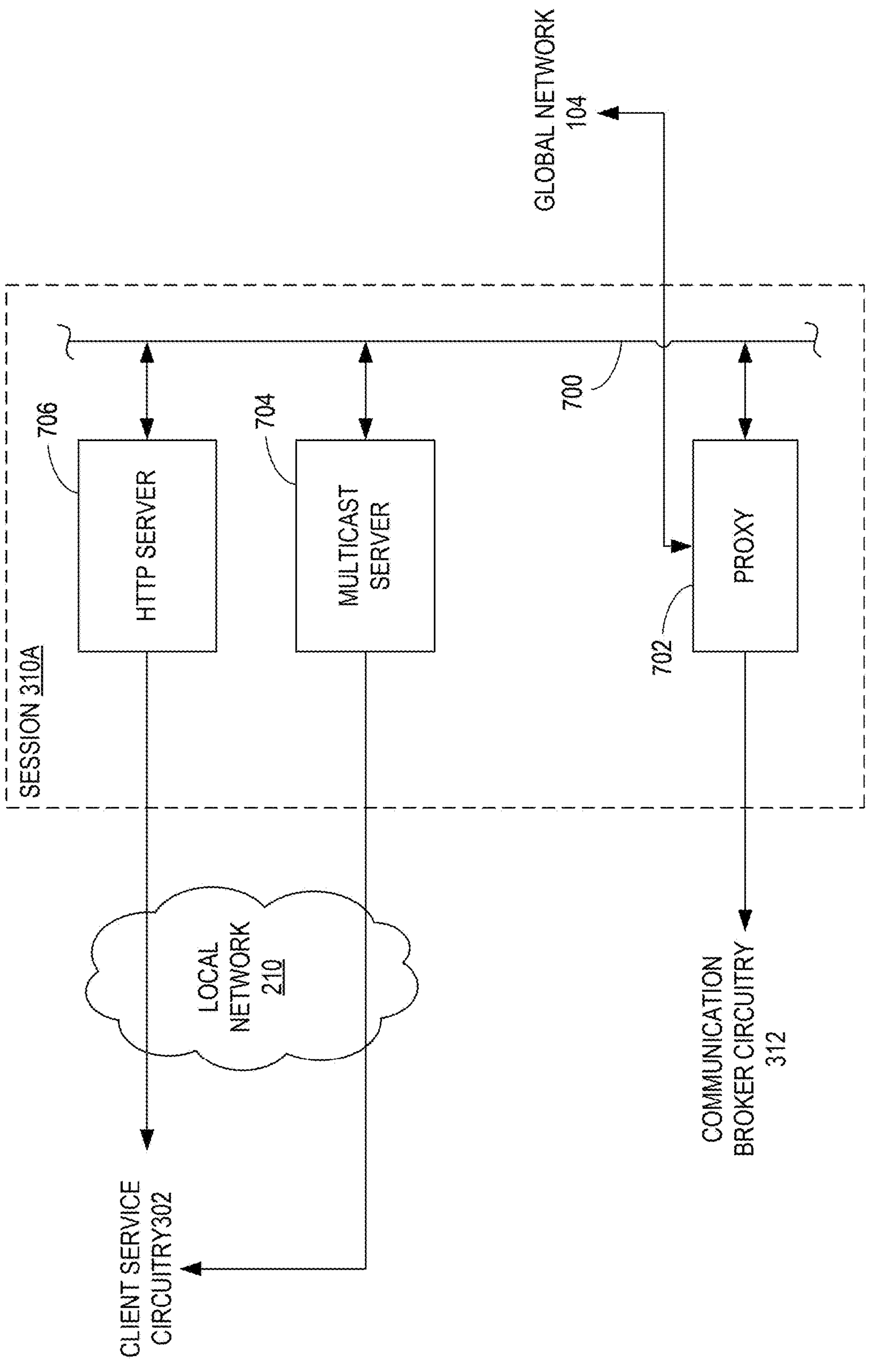
FIG. 7 is a block diagram of an example implementation of a session of FIG. 3.

FIG. 7 is a block diagram of an example implementation of a session of FIG. 3. The example of FIG. 7 shows that the session 310A includes a bus 700, a proxy 702, a multicast server 704, and an HTTP server 706.

The bus 700 refers to one or more logical connections that enables communication between the proxy 702, multicast server 704, and HTTP server 706. In some examples, the bus 700 is implemented using a shared memory resource that is accessible by the various threads, processes, or programmable circuits that instantiate the session 310A. The bus 700 may be implemented using one or more communication systems that meet pre-determined threshold power and latency requirements.

The proxy 702 communicates with the session manager circuitry 406 via the communication broker circuitry 312. The proxy 702 may communicate with the session manager circuitry 406 for any purpose, including but not limited to reporting that initialization is complete, obtaining configuration instructions, obtaining instructions to start or stop servicing client devices, provide session metrics, etc. The proxy 702 also receives a request for a manifest file from the client service circuitry 302 via the communication broker circuitry 312. In some examples, the proxy 702 edits the manifest file to remove extra video resolutions and/or audio resolutions, thereby preventing the client devices 204 from performing ABR. Removing these ABR abilities from the client devices 204 and performing EPG filtering operations as described herein both help to ensure the business management organization (via the business management circuitry 106 and the MMC 202A) control how the local network 210 is utilized.

A given proxy 702 also communicates with a single content provider 102A via the global network 104 to obtain the actual stream data, e.g., video and audio data that form a television show, movie, livestream, etc. In some examples, the stream data obtained by the proxy 702 is referred to as a payload, while the manifest file and the EPG data are referred to as metadata that correspond to the payload.

The proxy 702 obtains a given segment of a media stream in response to a HTTP request from the client service circuitry 302 of a client device. In the example of FIG. 6, the HTTP request is obtained by the HTTP server 706 (using a manifest file that may be edited as described above) and forwarded to the proxy 702 via the bus 700. In other examples, the HTTP server 706 is a component of the proxy 702.

The proxy 702 also transmits HTTP requests to the content provider 102A and receives corresponding media segments as HTTP packets. However, while HTTP requests are comparatively small amounts of data that do not generally stress the local network 210, HTTP packets containing stream data are comparatively large amounts of data that can stress the local network 210 if duplicate copies are sent to each requesting client device.

Advantageously, the proxy 702 instructs the HTTP server 706 to forward copies of the HTTP packets to only those requesting devices that have registered for HTTP stream delivery, e.g., those that do not support multicast. The proxy 702 also instructs the multicast server 704 to convert the HTTP packet into UDP datagrams and/or QAM data chunks based on the multicast protocols supported by the other requesting client devices. The multicast server 704 and HTTP server 706 then transmits the stream data using their respective protocols to the client service circuitry 302 of one or more requesting client devices 204. The stream data transmissions may occur over the local network 210, as shown in the example of FIG. 7, and/or over the global network 104.

Figure 8:
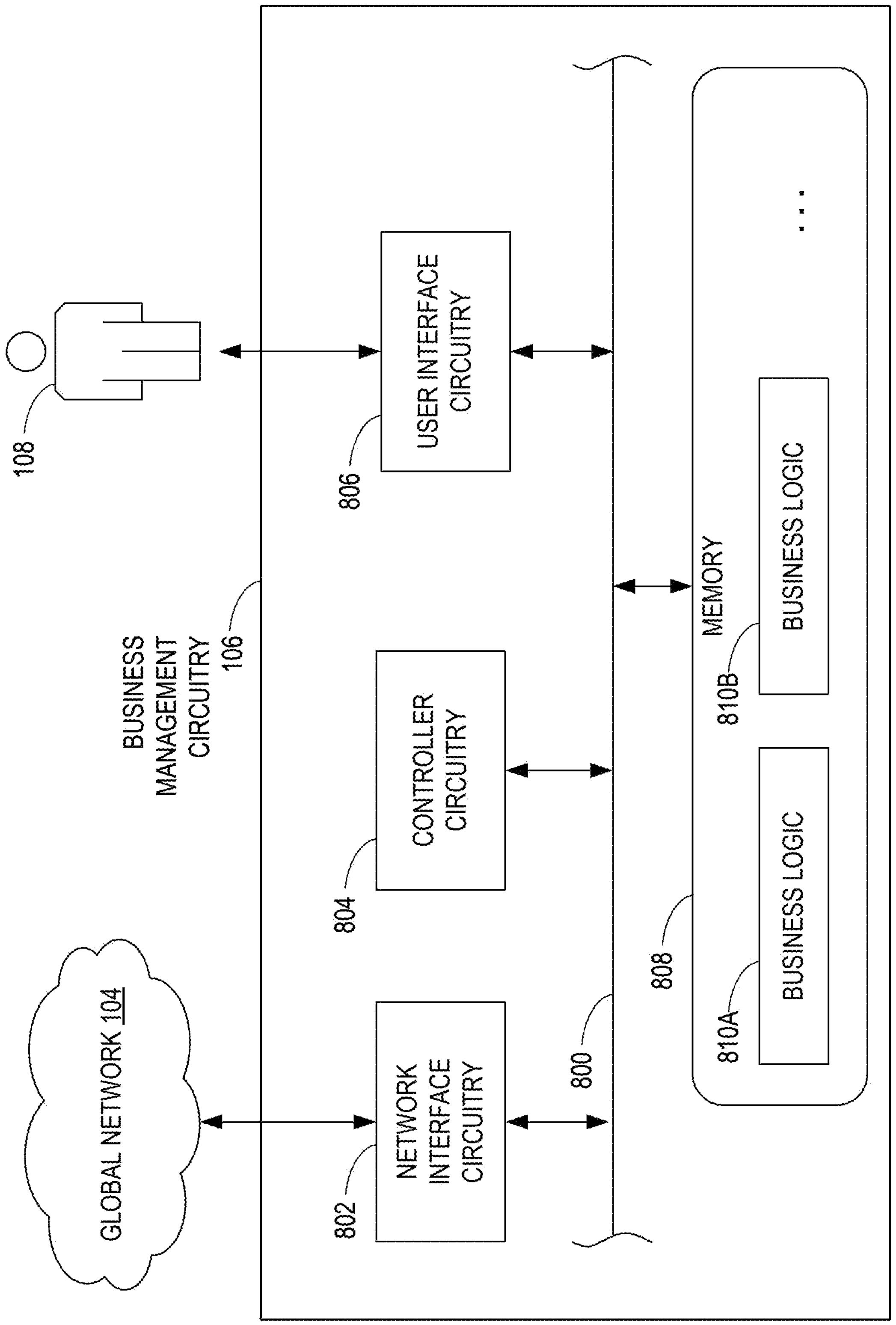
FIG. 8 is a block diagram of the business management circuitry of FIG. 1.

FIG. 8 is a block diagram of the business management circuitry 106 of FIG. 1. The example of FIG. 8 shows the business management circuitry 106 includes a bus 800, network interface circuitry 802, controller circuitry 804, user interface circuitry 806, and memory 808. The memory 808 includes business logic 810A, 810B, . . . (collectively referred to as business logic 810).

The bus 800 refers to one or more physical connections (e.g., an interconnect, copper trace, etc.) that enables communication between the network interface circuitry 802, the controller circuitry 804, the user interface circuitry 806, and the memory 808. The bus 800 may be implemented using one or more communication systems that meet pre-determined threshold power and latency requirements.

The network interface circuitry 802 enables the other components of the business management circuitry 106 to communicate with external devices using the global network 104. The network interface circuitry 802 includes one or more transceivers, antennas, and/or other hardware components required to facilitate such communication. Similarly, the network interface circuitry 802 may implement any suitable communication protocols to send and receive data over the global network 104. Such communication protocols include but are not limited to those used to implement the network and data link layers of the Open Systems Interconnection (OSI) model.

The controller circuitry 804 manages the operations of the other components of the business management circuitry 106. In the example of FIG. 8, the controller circuitry 804 controls the user interface circuitry 806 to provide stream data to the user 108 and obtain instructions from the user 108. The user interface circuitry 806 may include a display, keyboard, mouse, touchscreen, or other computer input/output hardware components required to facilitate such communication with the user 108. In some examples, the controller circuitry 804 additionally or alternatively provides stream data to and obtains instructions from a remote user via an external device via the global network.

The controller circuitry 804 interprets and organizes the user instructions into business logic 810, then stores the business logic in the memory 808. The controller circuitry 804 also provides instructions, via the global network 104, to MMCs 202 within one or more streaming environments 110 based on the business logic 810 stored in memory 808. In some examples, the controller circuitry 804 is instantiated by programmable circuitry executing controller instructions and/or configured to perform operations such as those represented by the flowchart(s) of FIG. 9A-12.

Within the memory 808, a given unit of business logic 810 refers to data that describes how a managing organization controls the operations of client devices 204 within their streaming environments. Thus, in the foregoing examples, business logic 810A controls the operations of devices in both the hotel 110A and the hotel 110B and is therefore editable by the hotel chain owner. Similarly, in the same examples, business logic 810B controls the operation of the sports bar 110C and is therefore editable by the owner of the sports bar.

In the examples of FIGS. 1 and 8, the managing organizations provide, add, or edit their business logic 810 through an employee, e.g., the user 108. In some examples, an external device such as a server adds or edits a unit of business logic 810A on behalf of a managing organization. A managing organization may view, add, or edit their unit business logic 810A at any time. Thus, some portions of the business logic 810A can be pre-determined before being applied to a device, while other portions of the business logic 810A are changed or introduced after some amount initial instructions have been sent to the one or more MMCs. Edits to a unit of business logic 810A may occur for any reason, including but not limited to a change in the number or type of client devices 204 in a particular local network 210, the addition or subtraction of a streaming environment 110 from the control of the managing organization (e.g. if a new hotel opens or an old hotel closes in the chain), feedback from customers, changes in the finances of the managing organization, etc.

A given unit of business logic 810A includes policies and client device groupings that are used to filter EPG data and improve efficiency of the local network 210 as described above in connection with FIG. 5-6F. The unit of business logic 810A also characterizes the ABR removal policy implemented by the proxy 702 as described above in FIG. 5. Notably, a managing organization may edit any portion of their unit business logic 810A to apply to any combination of the streaming environments 110 they control. For example, a chain of hotels with one hundred locations may have some business logic that applies to all hundred locations, some business logic that applies to fifty of the locations, some business logic that applies only to one location, etc. In some examples, a given unit of business logic 810A includes other information corresponding to the client devices 204, local networks 210, and/or MMCs 202 in addition to the policies, rules, and filter data described above.

The memory 808 may be implemented as any type of memory. For example, the memory 808 may be a volatile memory or a non-volatile memory. The volatile memory may be implemented by Synchronous Dynamic Random Access Memory (SDRAM), Dynamic Random Access Memory (DRAM), and/or any other type of RAM device. The non-volatile memory may be implemented by flash memory and/or any other desired type of memory device.

The memory 808 and/or any other data storage devices described herein may be implemented by any number and/or type(s) of memories. In some examples, some or all of the memory 808 is implemented as a database. Such a database can be implemented by any memory, storage device and/or storage disc for storing data such as, for example, flash memory, magnetic media, optical media, solid state memory, hard drive(s), thumb drive(s), etc. Furthermore, the data stored in the database may be in any data format such as, for example, binary data, comma delimited data, tab delimited data, structured query language (SQL) structures, etc.

While an example manner of implementing the streaming environment 110A of FIG. 1 is illustrated in FIGS. 1 and 2, one or more of the elements, processes, and/or devices illustrated in FIGS. 1 and 2 may be combined, divided, re-arranged, omitted, eliminated, and/or implemented in any other way. Further, the content providers 102, the business management circuitry 106, the MMC 202A, the client devices 204, and/or, more generally, the example streaming environment 110A of FIG. 1, may be implemented by hardware alone or by hardware in combination with software and/or firmware. Thus, for example, any of the content providers 102, the business management circuitry 106, the MMC 202A, the client devices 204, and/or, more generally, the example streaming environment 110A of FIG. 1, could be implemented by programmable circuitry, processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), vision processing units (VPUs), and/or field programmable logic device(s) (FPLD(s)) such as FPGAs in combination with machine readable instructions (e.g., firmware or software). Further still, one or more of the business management circuitry 106, the MMC 202A, or the client device 204 of FIGS. 1 and 2 may include one or more elements, processes, and/or devices in addition to, or instead of, those illustrated in FIGS. 1 and 2, and/or may include more than one of any or all of the illustrated elements, processes and devices.

Flowchart(s) representative of example machine readable instructions, which may be executed by programmable circuitry to implement and/or instantiate the one or more of the business management circuitry 106, the MMC 202A, or the client device 204 of FIGS. 1 and 2 and/or representative of example operations which may be performed by programmable circuitry to implement and/or instantiate the one or more of the business management circuitry 106, the MMC 202A, or the client device 204 of FIG. 1 and, are shown in FIGS. 9A-12. The machine readable instructions may be one or more executable programs or portion(s) of one or more executable programs for execution by programmable circuitry such as the programmable circuitry 1312 shown in the example programmable circuitry platform 1300 discussed below in connection with FIG. 13 and/or may be one or more function(s) or portion(s) of functions to be performed by the example programmable circuitry (e.g., an FPGA) discussed below in connection with FIGS. 14 and/or 15. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer-readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer-readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer-readable storage medium may include one or more mediums. Further, although the example program is described with reference to the flowchart(s) illustrated in FIGS. 9A-12, many other methods of implementing one or more of the business management circuitry 106, the MMC 202A, or the client device 204 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). As used herein, programmable circuitry includes any type(s) of circuitry that may be programmed to perform a desired function such as, for example, a CPU, a GPU, a VPU, and/or an FPGA. The programmable circuitry may include one or more CPUs, one or more GPUs, one or more VPUs, and/or one or more FPGAs located in the same package (e.g., the same integrated circuit (IC) package or in two or more separate housings), one or more CPUs, GPUs, VPUs, and/or one or more FPGAs in a single machine, multiple CPUs, GPUs, VPUs, and/or FPGAs distributed across multiple servers of a server rack, and/or multiple CPUs, GPUs, VPUs, and/or FPGAs distributed across one or more server racks. Additionally or alternatively, programmable circuitry may include a programmable logic device (PLD), a generic array logic (GAL) device, a programmable array logic (PAL) device, a complex programmable logic device (CPLD), a simple programmable logic device (SPLD), a microcontroller (MCU), a programmable system on chip (PSoC), etc., and/or any combination(s) thereof in any of the contexts explained above.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer-readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C-Sharp, Perl, Python, JavaScript, HyperText Markup Language (HTML), Structured Query Language (SQL), Swift, etc.

As mentioned above, the example operations of FIGS. 9A-12 may be implemented using executable instructions (e.g., computer-readable and/or machine readable instructions) stored on one or more non-transitory computer-readable and/or machine readable media. As used herein, the terms non-transitory computer-readable medium, non-transitory computer-readable storage medium, non-transitory machine readable medium, and/or non-transitory machine readable storage medium are expressly defined to include any type of computer-readable storage device and/or storage disk and to exclude propagating signals and to exclude transmission media. Examples of such non-transitory computer-readable medium, non-transitory computer-readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer-readable storage device" and "non-transitory machine readable storage device" are defined to include any physical (mechanical, magnetic and/or electrical) hardware to retain information for a time period, but to exclude propagating signals and to exclude transmission media. Examples of non-transitory computer-readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer-readable instructions, machine readable instructions, etc., and/or manufactured to execute computer-readable instructions, machine-readable instructions, etc.

Figure 9A:
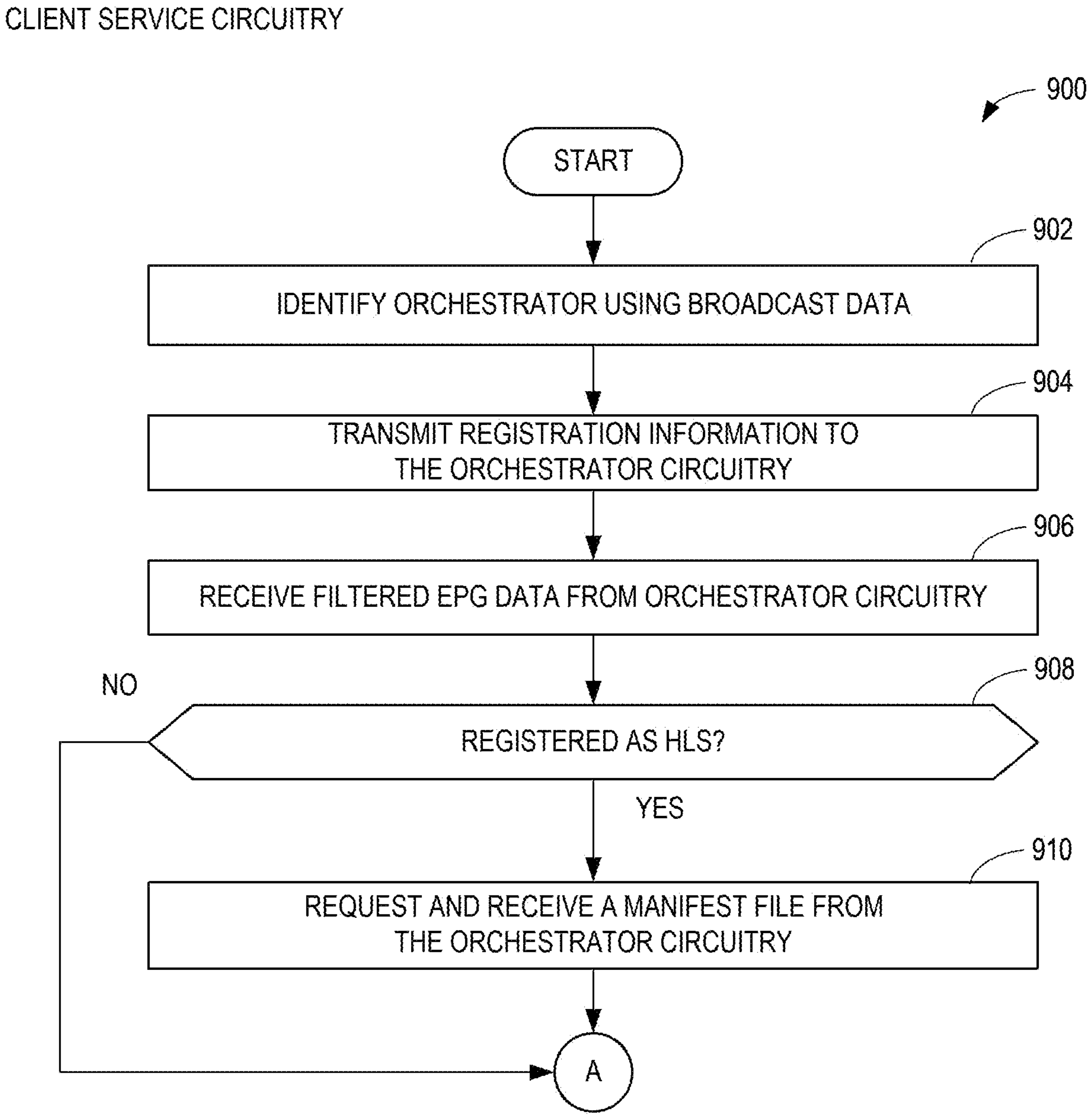
FIGS. 9A-9B is a flowchart representative of example machine-readable instructions and/or example operations that may be executed, instantiated, and/or performed by example programmable circuitry to implement the client service circuitry of FIG. 3.
Figure 9B:
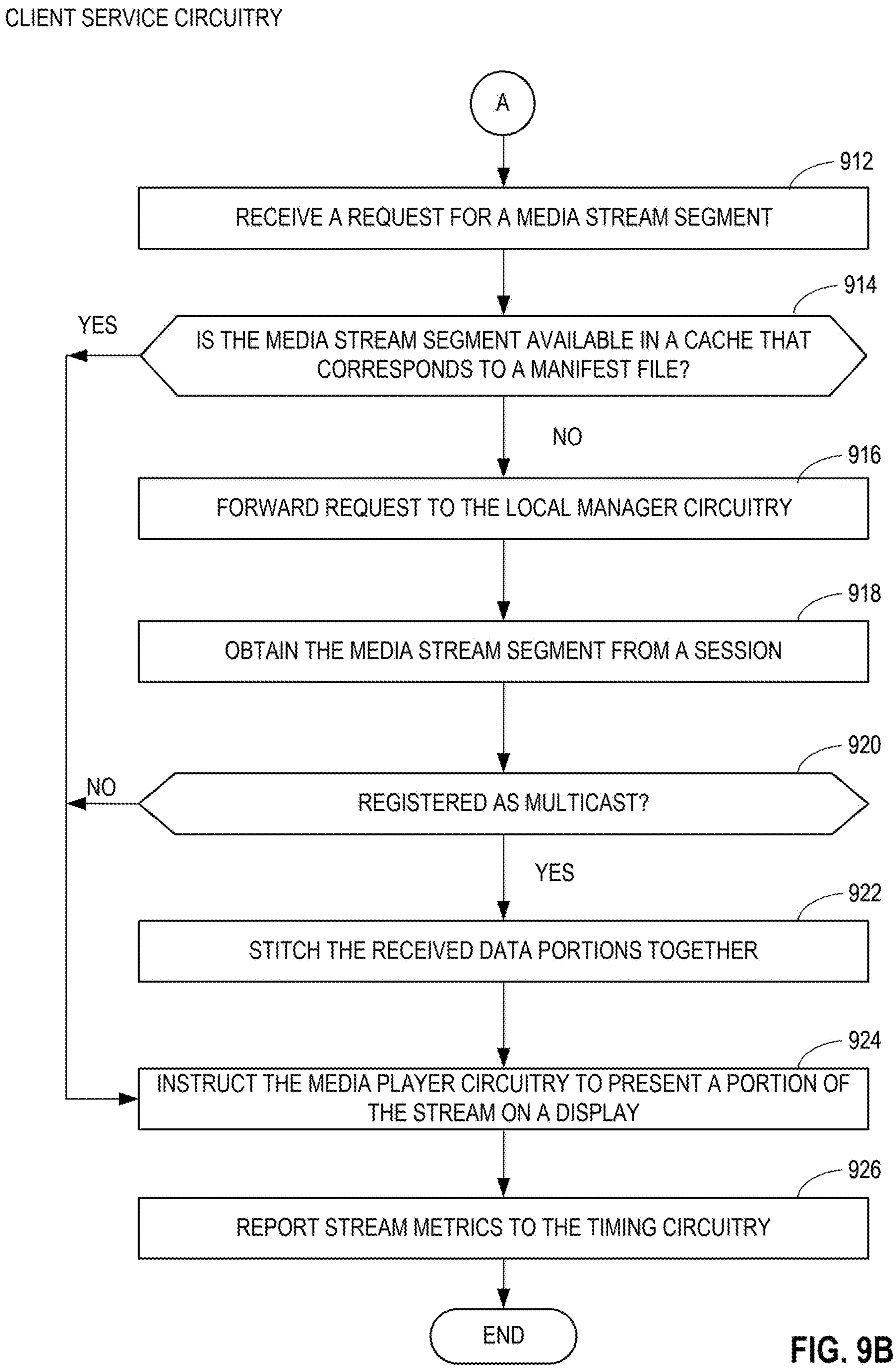

FIGS. 9A-9B are flowcharts representative of example machine-readable instructions and/or example operations 900 that may be executed, instantiated, and/or performed by programmable circuitry to implement the client service circuitry 302 within one of the client devices 204. While the examples of FIGS. 9A-12 are described with reference to the smart device 204C, the machine-readable instructions and/or operations described in examples herein may be implemented by any of the client devices 204. Similarly, while the examples of FIGS. 9A-12 refer only to HLS, UDP, or QAM as options for streaming media, the machine-readable instructions and/or operations described in examples herein may apply to other unicast or multicast protocols supported by a streaming environment.

The example flowchart of FIG. 9A begins when the client service circuitry 302 identifies the orchestrator circuitry 308 using broadcast data. (Block 902). In the examples described above, the broadcast data is a configuration message that provides one or more addresses, roles, authorization, or encryption data structures associated with the orchestrator circuitry 308. In other examples, the broadcast data includes different types of information used to identify the orchestrator circuitry 308. The client service circuitry 302 may obtain the broadcast data over the local network 210 or global network 104 using any suitable broadcast communication protocol.

The client service circuitry 302 transmits registration information to the orchestrator circuitry 308. (Block 904). The registration information includes whether the smart device 204C supports stream delivery using HLS over unicast, UDP over multicast, or QAM over multicast. In some examples, the registration information additionally includes one or more addresses, roles, authorization, or encryption data structures associated with the smart device 204C.

The client service circuitry 302 receives filtered EPG data from the orchestrator circuitry 308. (Block 906). The filtered EPG data includes a list of media streams accessible by the smart device 204C and corresponding metadata including but not limited to the examples provided above. The EPG data is considered filtered because, in some examples, the data at block 906 is only a portion of a larger set of EPG data that is obtainable by the orchestrator circuitry 308 as described above. In some examples, the filtered EPG data of block 906 also includes instructions that cause the smart device 204C to present the EPG data on a display in a specific order.

If the smart device 204C registered at block 904 as supporting only HLS (Block 908: Yes), the client service circuitry 302 requests and subsequently receives a manifest file from the proxy 702. (Block 910). In some examples, the received manifest file is edited to prevent the client service circuitry 302 from performing ABR. The manifest file corresponds to a selection of content by a user and corresponds to a particular session 310A that provides media streams of said content. A user may select any content at block 910 that is described by the filtered EPG data of block 906.

After block 910, or if the smart device 204C registered at block 904 as supporting one of the unicast protocols (Block 908: No), control proceeds to FIG. 9B where the client service circuitry 302 receives a request for a media stream segment. (Block 912). The media stream segment is generated by the media player circuitry 304 and refers to a specific portion of a media stream (e.g., data that corresponds to six continuous seconds of video).

The client service circuitry 302 determines whether the requested media stream segment is available in a cache that corresponds to a manifest file. (Block 914). In some examples, client devices 204 that support HLS include a corresponding cache to store media stream segments. In such examples, a client device may receive a media stream segment and store it in the cache without submitting a request for the media stream segment. Such use cases are described further in connection with block 1116 of FIG. 11A.

If the smart device 204C already has the media segment available in a cache that corresponds to a manifest file (Block 914: Yes), control proceeds to block 924. Alternatively, if the media segment is not stored in the cache or if the smart device 204C is not registered using HLS (Block 914: No), the client service circuitry 302 forwards the request for the media stream segment to the MMC 202A. (Block 916). If the smart device 204C is registered with HLS, the client service circuitry 302 uses the manifest file to request the media stream segment at the pre-determined video and audio resolution. If the smart device 204C is instead registered with UDP or QAM, the smart device 204C uses a different technique to request the media stream segment.

The client service circuitry 302 obtains the media stream segment from a session 310A. (Block 918). The obtained media segment of block 918 is formatted using the communication protocol identified in block 904 because the session 310A used said protocol for transmission. Thus, if the smart device 204C is registered as supporting one of the multicast protocols (Block 920: Yes), the media segment arrives at the smart device 204C as a series of data portions. In such examples, the client service circuitry 302 stitches the received data portions together to form the media stream segment. (Block 922). Advantageously, the individual data portions are formatted in a manner that avoids sending duplicated data over the local network 210 and enables stitching with as little information as possible. Accordingly, the client service circuitry 302 executes block 922 with a stitching technique that is based on the format of the individual data portions. If the smart device 204C is registered as supporting only HLS (Block 920: No), such stitching is not necessary because the requested media segment arrives in a single HTTP response.

After execution of block 924, or if the smart device 204C is registered as supporting only HLS (Block 920: No), or if the media stream segment was already stored in the smart device 204C when the media player circuitry 304 requested the media segment (Block 914: Yes), the client service circuitry 302 instructs the media player circuitry 304 to present a portion of the media stream on a display. (Block 924). In some examples, the client service circuitry 302 implements blocks 912-922 multiple times before implementing block 924 in order to queue a threshold number of media stream segments and avoid buffering. Similarly, the client service circuitry 302 may iteratively implement blocks 912-922 in parallel with execution of blocks 924 and/or 926.

The client service circuitry 302 reports stream metrics to the timing circuitry 314 within the MMC 202A. (Block 926). Stream metrics may refer to any data that characterizes the network utilization associated with blocks 912-918. Such metrics include but are not limited to a description of whether any requests for media streams have failed, the number of media stream segments that have been received, etc. as described above. In some examples, the media player circuitry 304 also reports stream metrics during block 926.

The machine-readable instructions and/or operations 900 end after block 926 in the example of FIGS. 9A-9B. In other examples, the client service circuitry 302 continues implementing one or more of blocks 906-926 until a user decides to stop watching media on the smart device 204C.

FIGS. 10A-10D are flowcharts representative of example machine-readable instructions and/or example operations that may be executed, instantiated, and/or performed by example orchestrator circuitry 308 to implement the client service circuitry of FIG. 3. A given flowchart within the examples of FIGS. 10A-10D represent a set of machine-readable instructions and/or operations that may be implemented in parallel with other sets of machine-readable instructions and/or operations. Accordingly, the orchestrator circuitry 308 may implement one or more of FIGS. 10A, 10B, 10C, and 10D concurrently with one another.

Figure 10A:
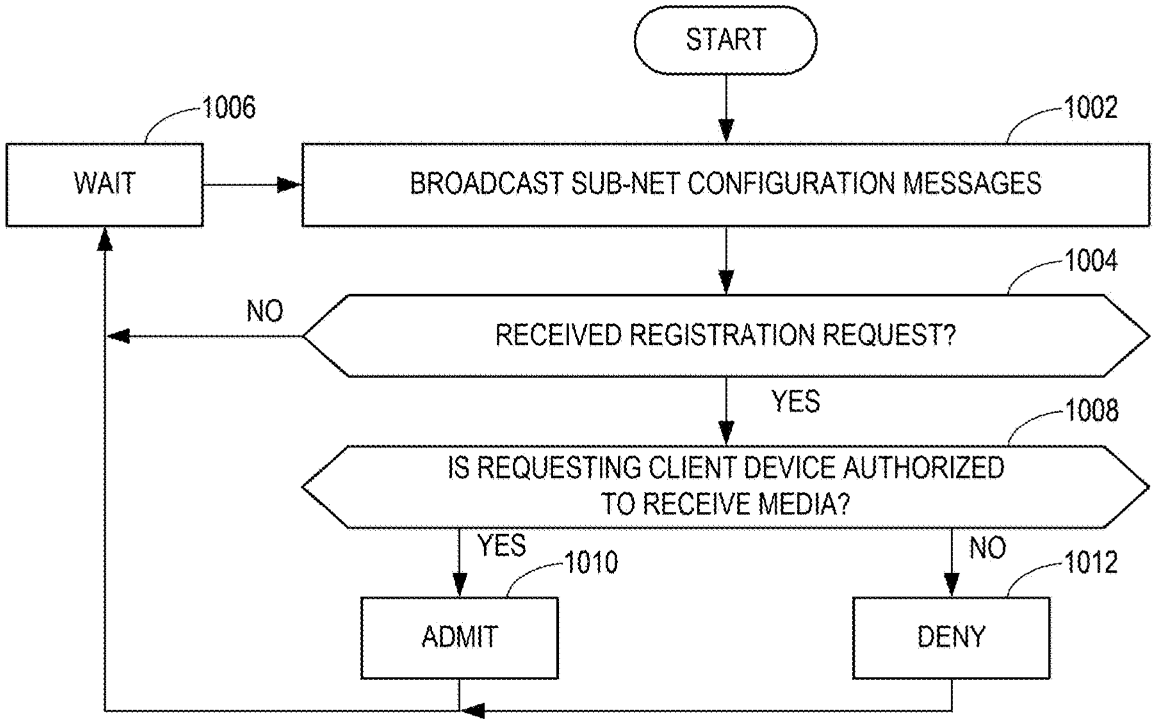
FIGS. 10A-10E are flowcharts representative of example machine-readable instructions and/or example operations that may be executed, instantiated, and/or performed by example orchestrator circuitry of FIG. 3.

In the example of FIG. 10A, the registration circuitry 402 broadcasts configuration messages. (Block 1002). The broadcasts contain data that enables new client devices 204 that join the streaming environment 110A to self-register as described above.

The registration circuitry 402 determines whether it has received a registration request. (Block 1004). If the registration circuitry 402 has not received a registration request (Block 1004: No), the registration circuitry 402 waits an amount of time (Block 1006) before re-executing block 1002.

If a registration request has been received (Block 1004: Yes), the registration circuitry 402 determines whether the requesting client device, e.g., smart device 204C, is authorized to receive media. (Block 1008). The registration circuitry 402 may perform any suitable combination of handshake, authentication, or encryption operations to perform the determination of block 1008.

If the smart device 204C is authorized to receive media (Block 1008: Yes), the registration circuitry 402 admits the smart device 204C to a list of trusted devices. (Block 1010). In the example of FIG. 10, admission onto the list of trusted devices enables the other components of the MMC 202A to communicate with the smart device 204C. The registration circuitry 402 also stores the registration information in a memory of the MMC 202A at block 1010. Control returns to block 1006 after block 1010.

Alternatively, if the smart device 204C is not authorized to receive media (Block 1008: No), the registration circuitry 402 denies the smart device 204C from the list of trusted devices. (Block 1012). In such examples the smart device 204C does not participate in any operations described in FIGS. 9A-12 that occur after block 1012. Such excluded operations include the requesting or presenting media stream data as described above in connection with FIG. 9. Control returns to block 1006 after block 1010.

Figure 10B:
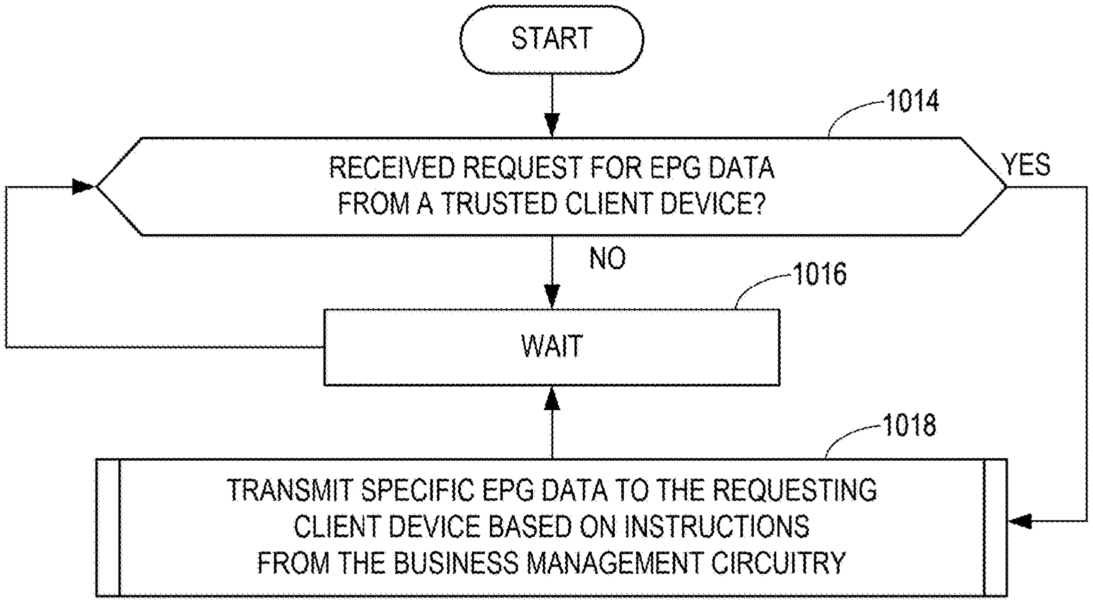

Within the example of FIG. 10B, and optionally in parallel with the execution of FIG. 10A, the CPM circuitry 408 determines whether the orchestrator circuitry 308 has received a request for EPG data from a trusted client device. (Block 1014). As used herein, a trusted client device refers to any device that has been successfully admitted at block 1010.

If a request for EPG data from a trusted client device has not been received (Block 1014: No), the CPM circuitry 408 waits for an amount of time (Block 1016) before re-executing block 1014. Alternatively, if a request for EPG data has been received from a trusted client device (Block 1014: Yes), the CPM circuitry 408 transmits specific EPG data to the requesting client device based on instructions from the business management circuitry 106. (Block 1018). Execution of block 1018 is described further in connection with FIG. 10C. Control returns to block 1016 once the operations of block 1018 are completed.

In some examples, the EPG data available for transmission at block 1018 changes over time based on updates performed by the CPM circuitry 408 on a periodic basis. In such examples, the update period of the CPM circuitry 408 is separate and independent of the wait period of block 1016. Thus, the CPM circuitry 408 responds to a request at block 1014 in substantially real time by providing the client device 204 with any EPG data that is both available at the time and authorized for transmission by the managing organization.

Figure 10C:
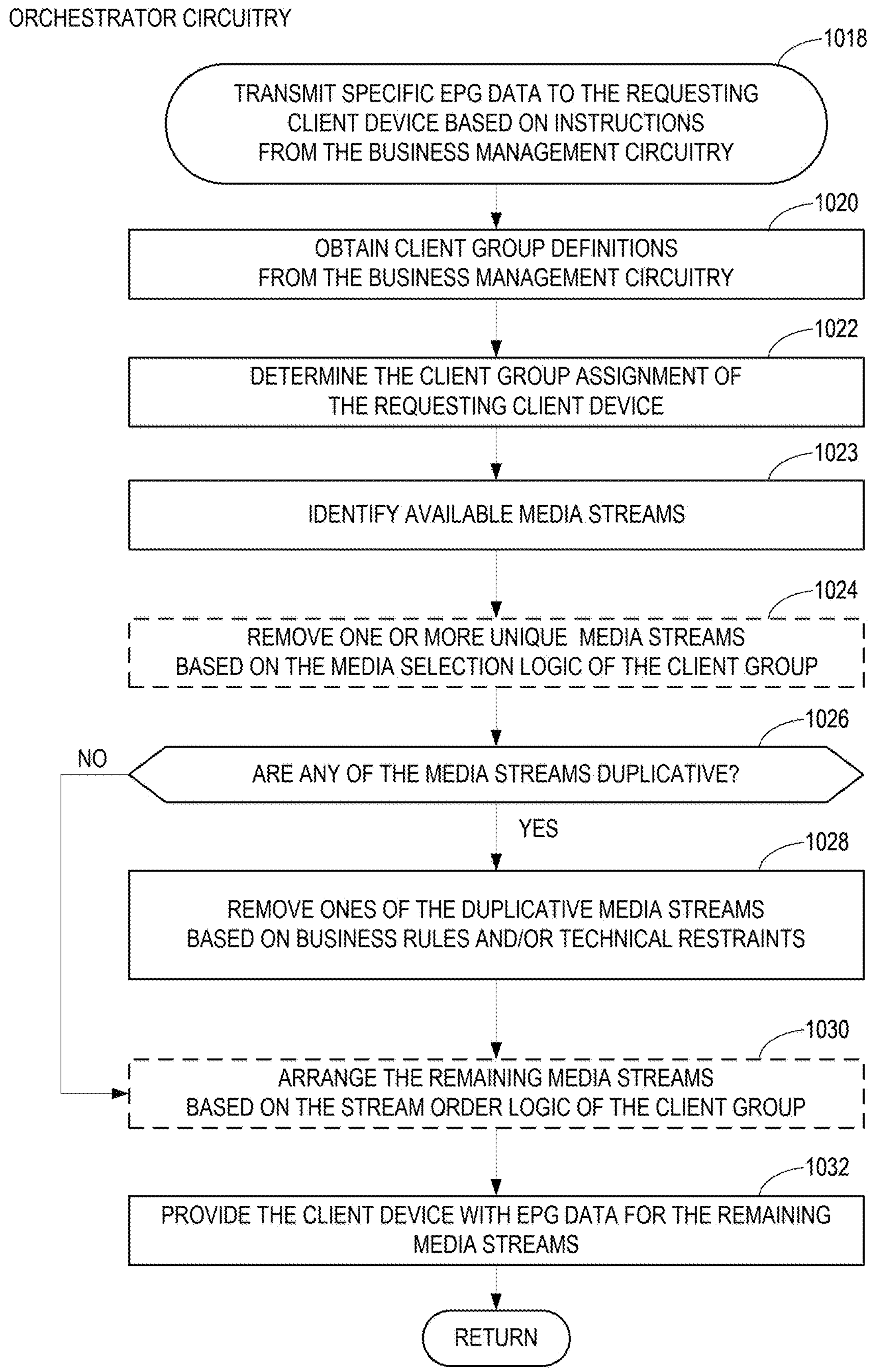

FIG. 10C is a flowchart of machine-readable instructions and/or operations that may be implemented by the CPM circuitry 408 to transmit specific EPG data to the requesting client device based on instructions from the business management circuitry 106. In particular, FIG. 10C is an example implementation of block 1018 of FIG. 10B.

Execution of block 1018 begins when the controller circuitry 510 within the CPM circuitry 408 obtains client group definitions from the business management circuitry 106. (Block 1020). The client group definitions are a portion of the business logic 810A provided by the business management circuitry 106 to control the operations of hotel 110A. More generally, the client group definitions of block 906 may be specific to a particular streaming environment or may apply to any number of streaming environments that are managed by the same business. In some examples, the business management circuitry 106 provides the client group definitions to the controller circuitry 510 using machine readable instructions as represented by the pseudocode 610 of block FIG. 6F.

The EPG manager circuitry 508 determines the client group assignment of the requesting client device. (Block 1022). A given client device 204 in a streaming environment belongs to one client group at a time. However, the EPG manager circuitry 508 can also change which client group a given client device is assigned to at any time. Thus, the EPG manager circuitry 508 may implement block 1022 by a) referencing the business logic 810A to determine initial client group assignments and/or b) referencing an internal memory of the MMC 202A to determine what subsequent changes to the client group assignments have been made (if any).

The EPG manager circuitry 508 identifies available media streams. (Block 1023). A media stream is available if the MMC 202A is capable of obtaining EPG data for a media stream and provide it to the requesting client device. For example, if the received signal strength (RSS) of a linear television channel is below a threshold value, then the MMC 202A may be incapable of obtaining EPG data for the channel. Accordingly, the availability of a given media stream is dependent on the network infrastructure of the hotel 110A. For example, a new antenna on the roof of the hotel 110A may increase the number available linear television channels. Similarly, a transition from COAX to Ethernet cabling within the hotel 110A may increase the number of available media streams that are provided over the Internet.

The EPG manager circuitry 508 optionally removes one or more unique media streams based on the media selection logic of the client group identified at block 1022. (Block 1024). As used above and herein, a media stream is removed if it is available to the MMC 202A at block 1023 but not provided to the requesting client device at block 1032. As used above and herein, a media stream is considered unique if the content in the media stream is not provided in any of the other media streams available to the MMC 202A.

The media selection logic of block 1024 may include any combination of business rules and/or technical restrictions. As a first example, in FIGS. 6A-6F, business rules within the client selection logic cause the EPG manager circuitry 508 to remove all channels except for news and weather in the smart devices 602, remove all channels except for sports related content in the smart devices 604, etc. More generally, business rules within media selection logic can cause the EPG manager circuitry 508 to remove a media stream at block 1024 based on a comparison of a) the type of content offered by the media stream and b) the role of the client group within the business organization.

Because some media streams (e.g., linear television channels) offer different content at different times, the EPG manager circuitry 508 may add or remove certain channels for the smart devices 604 in the foregoing first example. More generally, the EPG manager circuitry 508 may change which media streams are removed at block 1024 based on any number of factors. Such factors include but are not limited to the conditions of the local network 210, the content available within a media stream, the time of day, difference in price, etc.

As a second example, if some of the client devices 204 are connected using comparatively slow WiFi and other client devices are connected using comparatively fast Ethernet, the EPG manager circuitry 508 may remove some high traffic media streams (e.g. 4K-only media streams) from the client devices 204 that are connected over WiFi. More generally, technical restraints within media selection logic can cause the EPG manager circuitry 508 to remove a media stream at block 1024 based on the topology (e.g., the hardware infrastructure) of the local network 210.

As a third example, in FIGS. 6A-6F, the EPG manager circuitry 508 reserves some higher quality (e.g., more bandwidth-intensive) media streams for the smart devices 608 in the VIP rooms and removes said media streams for the remaining smart devices 602-606. More generally, media selection logic can cause the EPG manager circuitry 508 to remove a media stream at block 1024 based on artificial technical restraints that are driven by business rules. Media selection logic can also cause the EPG manager circuitry 508 to remove a media stream at block 1024 based on a genre of the content, a time of day, or a property shared across a client group as described above, etc.

As the foregoing examples show, media selection logic may include both static rules (where the EPG manager circuitry 508 removes the same media streams each time block 1024 is executed) and dynamic rules (where the EPG manager circuitry 508 removes different media streams at different iterations of block 1024). Both static rules and dynamic rules in the media selection logic may be composed of any combination of business rules and/or technical constraints.

The operations of block 1024 are optional because in some examples, the media selection logic instructs the EPG manager circuitry 508 to provide the requesting client device with all unique media streams that are available (provided the client device is authorized to view the corresponding content as described above).

After the filtering operations of block 1024, the EPG manager circuitry 508 determines whether any of the media streams are duplicative. (Block 1026). As described above, duplicative media streams have identical content but may exhibit other differences. Such differences include but are not limited to format, source, cost, video resolution, bandwidth consumption, latency, etc. In some examples, the EPG manager circuitry 508 identifies two media streams as duplicative at block 1026 because they share the same identifier value (or multiple pieces of data that together form an identification data structure) that is common across all content providers.

The duplicative status of some media streams may change over time. For example, suppose two media streams carry two different linear television channels, and that both channels show the same rerun episode of a sitcom during a particular half hour time slot. In such an example, the two media streams are considered duplicative during the half hour but time slot but are considered unique once the episode ends and the networks once again show different content. As another example, two SVOD media streams may be considered duplicative while both SVOD platforms carry the same seasons of the sitcom on their platforms. However, if a change in licensing agreements forces one of the SVOD platforms to stop carrying the sitcom, the remaining media stream from the other SVOD platform would no longer be considered duplicative. In a variant of the foregoing example, suppose both SVOD platforms still carry the sitcom but a change in agreements between the hotel organization and one of the SVOD platforms causes the hotel organization to remove support for said SVOD platform in the client devices 204. In such an example, the remaining media stream from the other SVOD platform would no longer be considered duplicative because it is the only source of the content available to the MMC 202A (despite the content still being available to the public on both SVOD platforms). Control proceeds to block 1032 if none of the remaining channels are duplicative (Block 1026: No).

Alternatively, if two or more of the media streams are duplicative of one another (Block 1026: Yes), the EPG manager circuitry 508 removes ones of the duplicative media streams based on business rules and/or technical restraints. (Block 1028). As a first example, if two content providers 102A and 102B provide media streams with the same linear television channel, but the MMC 202A has a better link (more bandwidth) with the content providers 102A, then the EPG manager circuitry 508 removes the media stream from the content provider 102B. More generally, the technical restraints of block 1028 may include external network parameters (e.g., of the global network 104) such as bandwidth and latency.

As a second example, suppose the content provider 102A streams a channel in 720p and 1080p and that the content provider 102B streams the same channel in 1080p and 4K. If the hotel 110A only has client devices 204 that can playback media at 720p, the EPG manager circuitry 508 selects the media streams from content provider 102B for removal. Alternatively, if the client devices 204 include some devices that can only playback media at 720p and some devices that can playback media at 4K, the EPG manager circuitry 508 provides media streams from content provider 102A for the first category of devices and media streams from content provider 102B for the second category. More generally, the technical restraints of block 1028 may include the capabilities of the client devices 204 and/or the media streams.

As a third example, suppose both content providers 102A and 102B offer media streams with the same channel but that the content provider 102B charges more for traffic (e.g., a price per HTTP request to the content provider 102B is higher than a price per HTTP request to the content provider 102A). In such an example, the EPG manager circuitry 508 generally provides the media stream from content provider 102A to all client devices 204 (thereby removing the stream from content provider 102B at block 1028). The EPG manager circuitry 508 may only switch to the media stream from the content provider 102B if the media stream from the content provider 102A fails. More generally, the business rules of block 1028 may cause the EPG manager circuitry 508 to compare costs of the duplicative media streams.

As a fourth example, in FIGS. 6A-6F, the EPG manager circuitry 508 provides only the 4K video resolution variant of “Manhattan Nine-Two” to the smart devices 608 in the VIP rooms, provides only the 1080p video resolution variant of “Manhattan Nine-Two” to the smart devices 606 in the other VIP rooms, and does not provide either media stream to the smart devices 602 and 604 in the common spaces, bars, and restaurants. More generally, the business rules of block 1028 may cause the EPG manager circuitry 508 to consider both stream quality logic and stream selection logic found within the client group definitions of block 1022.

As a fifth example, in FIGS. 6A-6F, the EPG manager circuitry 508 executes block 1024 for the smart devices 602 located in common spaces by first measuring the total traffic across the local network 210. If the total traffic across the local network 210 is lower than a threshold value for a threshold amount of time, the EPG manager circuitry 508 provides 1080p video resolution variants of the news and weather media streams to the smart devices 602. Alternatively, if the total traffic across the local network 210 does not stay below the threshold value for the threshold amount of time, the EPG manager circuitry 508 removes the 1080p media streams at block 1024 (thereby providing the smart devices 602 with media streams at only 720p video resolution or lower).

In a fifth example, the EPG manager circuitry 508 implements rules at block 1028 to perform load-balancing of traffic from two or more content providers 102. The EPG manager circuitry 508 may keep track of bitrates, throughput and other statistics, and choose the source of each media stream in such a way that the traffic is approximately balanced between all content providers. Accordingly, the business rules and/or technical restraints of block 1028 may be combined to form both static rules (where the EPG manager circuitry 508 removes the same media streams each time block 1028 is executed) and dynamic rules (where the EPG manager circuitry 508 removes different media streams at different iterations of block 1028). The EPG manager circuitry 508 may repeatedly implement block 1028 to change which duplicative media streams are kept of filtered out based on changing network conditions.

After removing ones of the duplicative streams at block 1028, or if none of the streams were duplicative (Block 1026: No), the EPG manager circuitry 508 optionally arranges the remaining media streams based on the stream order logic of the client group definition. (Block 1030). For example, in FIGS. 6A-6F, the EPG manager circuitry 508 instructs the smart devices 606 to place family friendly content at the top of their UI. The EPG manager circuitry 508 also instructs the smart devices 608 to place romance movies and shows at the top of their UI. More generally, the channel order logic of block 1030 instructs the EPG manager circuitry 508 to arrange the media streams based on which content the management organization predicts is most relevant to the users associated with a particular client group.

Like the channel selection logic and channel quality logic within the client group definitions, the channel order logic of block 1030 can cause the EPG manager circuitry 508 to arrange media streams based on both static rules (where some channels are always positioned in front or behind of other channels in the UI) and dynamic rules (where the relative order of some channels changes over time). For example, in FIGS. 6A-6F, the EPG manager circuitry 508 instructs (based on the channel selection logic) the smart devices 602 to arrange the weather channels in front of the news channels during the morning, then to swap the order at a certain time of day. The EPG manager circuitry 508 also instructs (based on the channel selection logic) the smart devices 604 to position channels currently showing live sporting events and local sporting events on top of the UI, thereby moving other types of sports-related content to the bottom of the UI.

Block 1030 is optional because, in some examples, the EPG manager circuitry 508 instructs (based on the client selection logic or lack thereof within a particular client group definition) the client devices in a client group to present the remaining media streams in the default order/default format that the STB organization determines for the public. For example, when presenting linear television channels, the default order may cause a client device to position the remaining channels within the UI by ascending channel index.

After the filtering operations of one or more of blocks 1024, block 1028, and/or 1030, the orchestrator circuitry 308 provides the filtered EPG data to the requesting client device. (Block 1032). To do so, the control circuitry 510 provides the filtered EPG data to the API interface circuitry 404 via the bus 400. In some examples, the orchestrator circuitry 308 provides EPG data at block 1032 in a specific order any media stream arrangement operations that occurred at block 1030. In other examples, the orchestrator circuitry 308 provides the requesting client device with a) the EPG data itself and b) separate instructions that describe how the requesting client device positions the EPG data within the UI. Control returns to block 1016 of FIG. 10B after execution of block 1032 of FIG. 10C. In some examples, media streams described by the subset of EPG data provided to the requesting client device at block 1032 are collectively referred to as a lineup.

In the example of FIG. 10C, the EPG manager circuitry 508 does not obtain EPG data from content providers 102 until after block 1028. In doing so, the EPG manager circuitry 508 only obtains EPG data that will be subsequently forwarded across the local network 210 (as opposed to wasting bandwidth by obtaining EPG data that is then disregarded at block 1024 or block 1028). Accordingly, as used above and herein, the term "EPG filtering operations" refers to removing media streams from the set of all available media streams at block 1023, then obtaining and providing EPG data at block 1032 for the media streams that remain. Similarly, the terms "media selection logic", "media stream order logic", "media quality logic", "client group definitions", "business rules", "technical restraints", and "business logic" as used above may be individually or collectively referred to as one or more EPG filtering policies set by a management organization of a private network. For example, the hotel management organization manages the local network 210 and therefore sets the EPG filtering policies described in FIGS. 6A-6F.

When the smart device 204C wishes to join a session 310A (e.g., tunes to a specific channel), the smart device 204C issues a request for a manifest file directly to the session 310A (via the local network 210). However, if the request is issued to a session that does not currently exist, the communication broker circuitry 312 receives the request instead and forwards it to the session manager circuitry 406. Thus, within the example of FIG. 10D, and optionally in parallel with the execution of one or more of FIGS. 10A-10C, the session manager circuitry 406 determines whether the orchestrator circuitry 308 has received a request corresponding to a session that does not currently exist. (Block 1036).

If the orchestrator circuitry 308 has received a request for a non-existent session (Block 1036: Yes), the session manager circuitry 406 opens a new session. (Block 1038). Such opening operations may include but are not limited to executing a function call to instantiate new instance of a session, e.g., a 'session' object in Object Oriented Design programming. In some examples, the session manager circuitry 406 additionally waits for the session to initialize, then provides the session with initial configuration data to assign the session to a particular media title. The session manager circuitry 406 then forwards the request to the new session (Block 1040). Control returns to block 1036 after block 1040. Alternatively, if the session manager circuitry 406 has not received a request for a non-existent session (Block 1036: No), the session manager circuitry 406 waits an amount of time (Block 1042) before re-executing block 1036.

Figure 10D:
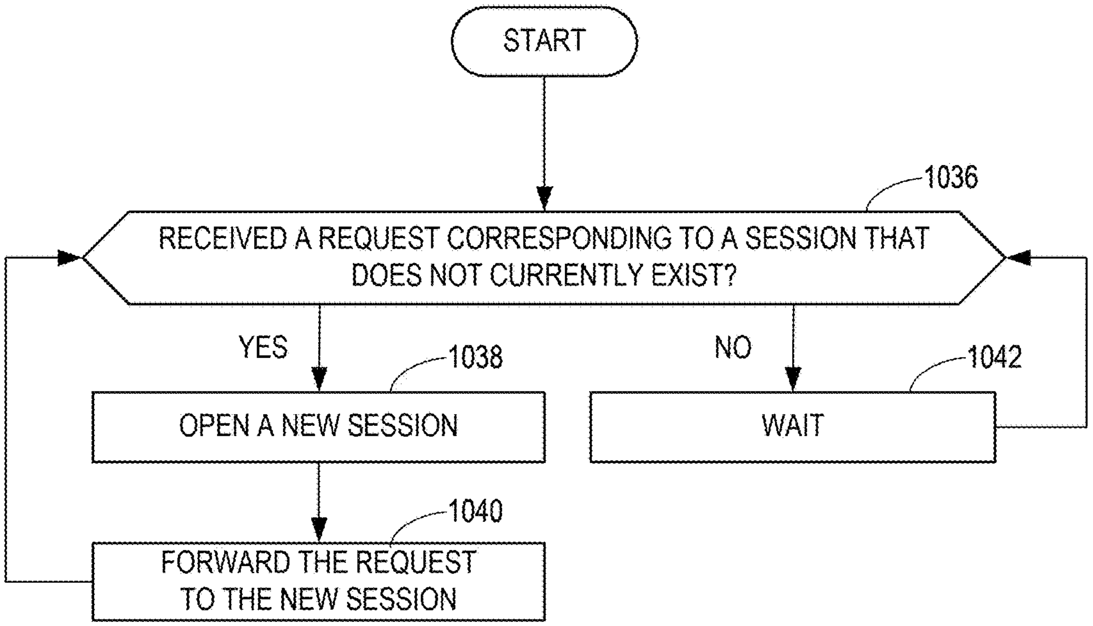

The example flowchart of FIG. 10D describes how the orchestrator circuitry 308 creates a session 310C on-demand based on a request for a manifest file from a device that has self-registered as supporting HLS. In examples where the smart device 204C instead self-registers as supporting one of the multicast protocols, the orchestrator circuitry 308 creates a session 310C on-demand based on a request that the smart device 204C transmits using the back-channel communication described above in connection with FIG. 2A.

Figure 10E:
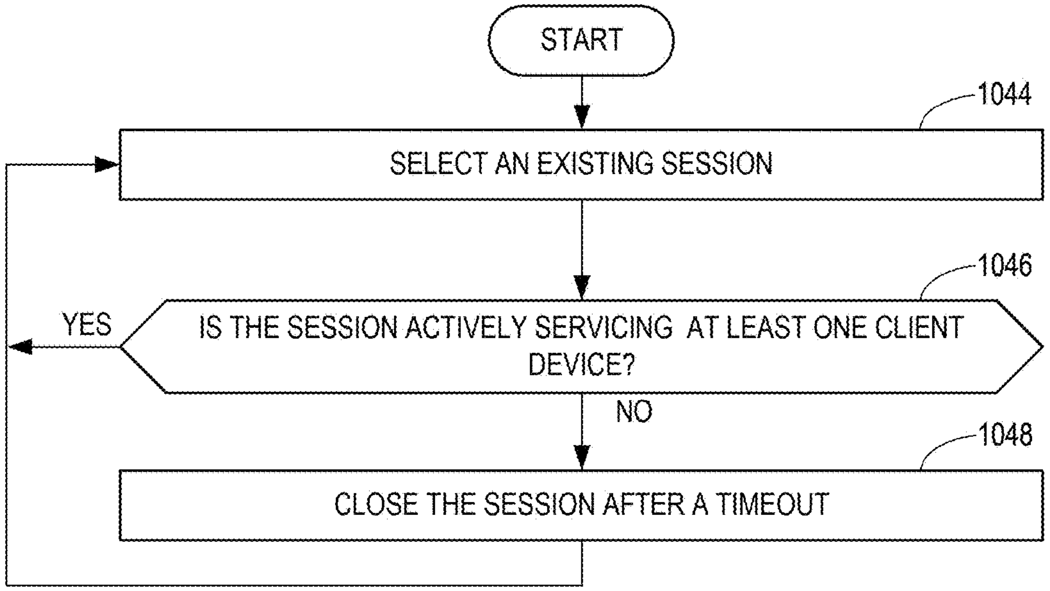

Within the example of FIG. 10E, and optionally in parallel with the execution of one or more of FIGS. 10A-10D, the session manager circuitry 406 selects an existing session. (Block 1044). The session manager circuitry 406 then determines whether the session is actively servicing at least one client device. (Block 1046). A session is actively servicing a client device if it is providing stream data to a client device using any suitable technique, e.g., HLS, QAM, UDP, etc.

If the session is actively servicing at least one client device (Block 1046: Yes), control returns to block 1044 where the session manager circuitry 406 selects another existing session. Alternatively, if the session is not actively servicing at least one client device (Block 1046: No), the session manager circuitry 406 closes the session after a timeout period. (Block 1048). Control then returns to block 1044 after block 1048.

Figure 11A:
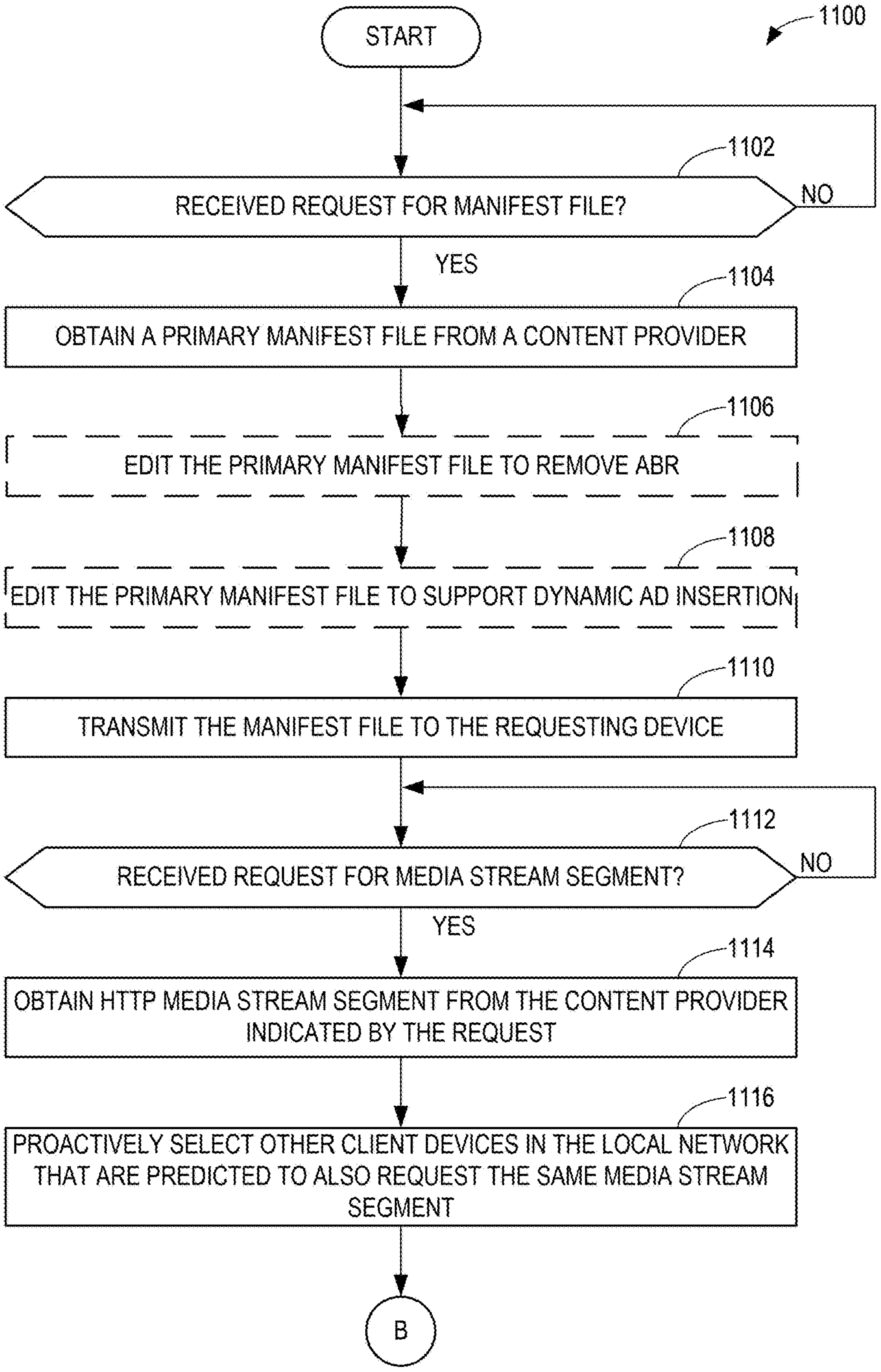
FIGS. 11A-11B are flowcharts representative of example machine-readable instructions and/or example operations that may be executed, instantiated, and/or performed by orchestrator circuitry to implement the session of FIG. 3.

FIGS. 11A-11E are flowcharts representative of example machine-readable instructions and/or example operations that may be executed, instantiated, and/or performed by MMC 202A to implement the session of FIG. 7. In FIG. 11A, the machine-readable instructions and/or operations 1100 begin when proxy 702 determines whether it has received a request for a manifest file. (Block 1102). Such requests may be sent directly from the client devices 204 or may be forwarded to the session 310A by the session manager circuitry 406. If the session 310A has not received a request for a manifest file (Block 1102: No), the session 310 re-implements block 1102 after an amount of time.

Alternatively, if the session 310A has received a request for a manifest file (Block 1102: Yes), the proxy 702 obtains a primary manifest file. (Block 1104). As used herein, a primary manifest file refers to an original version of a manifest file that is unedited by the proxy 702 and obtained from a content provider 102 via the global network 104. In some examples, a primary manifest file provides ABR support by including data that corresponds to multiple video and/or audio resolutions.

The proxy 702 optionally edits the primary manifest file to remove support for ABR. (Block 1106). ABR removal techniques are described in U.S. patent application Ser. No. 19/022,793, which is incorporated by reference in its entirety. The proxy 702 may also edit the primary manifest file to support DAI. (Block 1108).

The HTTP server 706 transmits the manifest file to the requesting client device. (Block 1110). In the examples described above, the edited manifest file is transmitted across the local network 210. In other examples, the edited manifest file is transmitted across the global network 104.

The proxy 702 receives a request for a media stream segment. (Block 1112). Because client devices 204 that self-register as only supporting HLS use manifest files to form such requests, block 1112 is implemented in chronologically after blocks 1102-1110 for such devices. However, in some examples, the proxy 702 may receive a request without having previously implemented blocks 1102-1110 because the client device transmitting the request self-registered as supporting a multicast protocol.

If the proxy 702 has not received a request for a media stream segment (Block 1112: No), control returns to block 1112 after a period of time so the proxy 702 can perform another check for requests. Alternatively, if the proxy 702 has received a request for a media stream segment (Block 1112: Yes), the proxy 702 obtains a media stream segment from the content provider indicated by the request. (Block 1114). In the example of FIG. 10, the proxy 702 uses HLS to communicate with the content provider at block 1114, regardless of which protocol the requesting device selected during self-registration. The use of HLS occurs because the global network 104 includes third-party devices not associated with the entities shown in FIG. 1, which therefore prevents transmission with less secure protocols such as UDP. In other examples, the proxy 702 uses a different protocol to communicate with content providers 102 over the network.

The proxy 702 proactively selects other client devices in the local network that are predicted to also request the same chunk. (Block 1116). In some examples, the prediction technique used in block 1116 is described in U.S. Pat. No. 12,034,790, which is incorporated herein by reference in its entirety.

Figure 11B:
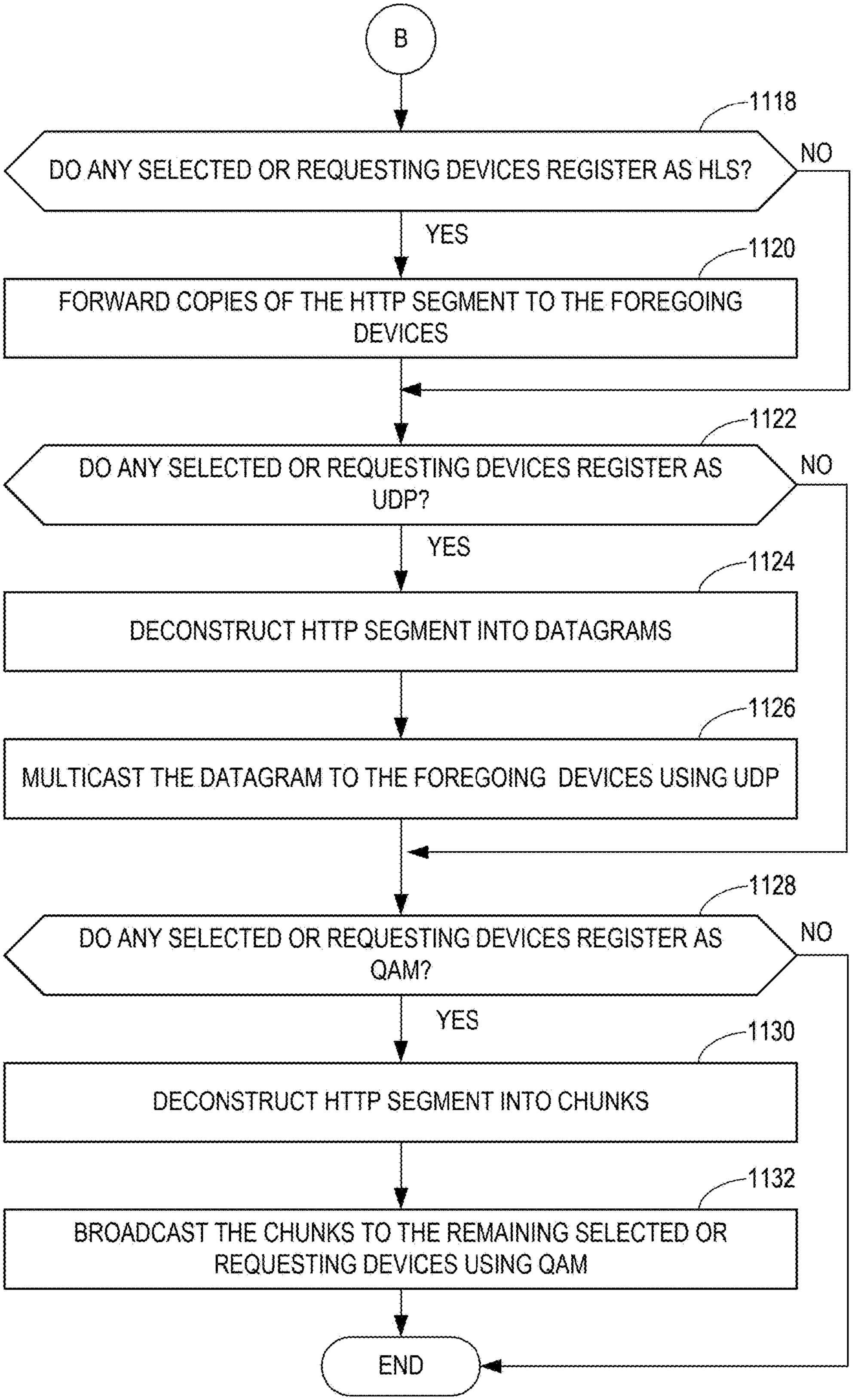

After implementation of block 1116, control flows to FIG. 11B where the proxy 702 determines whether any of the selected or requesting client devices 204 have self-registered as using HLS to receive media streams. (Block 1118). If one or more of the selected or requesting client devices 204 have self-registered as using HLS to receive media streams (Block 1118: Yes), the HTTP server 706 forwards copies of the HTTP segment to those devices. (Block 1120). The HTTP server 706 forwards the HTTP segments using HLS and unicast.

After block 1120, or if none of the selected or requesting client devices 204 have self-registered as using HLS (Block 1118: No), the proxy 702 determines whether any of the selected or requesting devices self-register using UDP. (Block 1122). If one or more of the selected or requesting client devices 204 have self-registered as using UDP to receive media streams (Block 1122: Yes), the multicast server 704 deconstructs the HTTP segment into datagrams. (Block 1124). Advantageously, the proxy 702 deconstructs the HTTP segment and formats the resulting datagrams in a manner that avoids sending duplicated data over the local network 210. The deconstruction of block 1124 also enables client service circuitry 302 to perform stitching at block 916 with as little information as possible. The multicast server 704 then multicasts the datagrams to the one or more selected or requesting devices that self-registered using UDP. (Block 1126).

After block 1126, or if none of the selected or requesting client devices 204 have self-registered as using UDP (Block 1122: No), the proxy 702 determines whether any of the selected or requesting devices self-register using QAM. (Block 1128). If one or more of the selected or requesting client devices 204 have self-registered as using QAM to receive media streams (Block 1128: Yes), the multicast server 704 deconstructs the HTTP segment into data chunks. (Block 1130). Like block 1124, the multicast server 704 deconstructs the HTTP segment and formats the resulting data chunks at block 1130 in a manner that avoids sending duplicated data over the local network 210. The multicast server 704 then multicasts the data chunks to the one or more selected or requesting devices that self-registered using QAM. (Block 1132). The machine-readable instructions and/or operations of FIGS. 11A and 11B end after block 1132 or if none of the selected or requesting client devices 204 have self-registered as using QAM (Block 1128: No).

Figure 12:
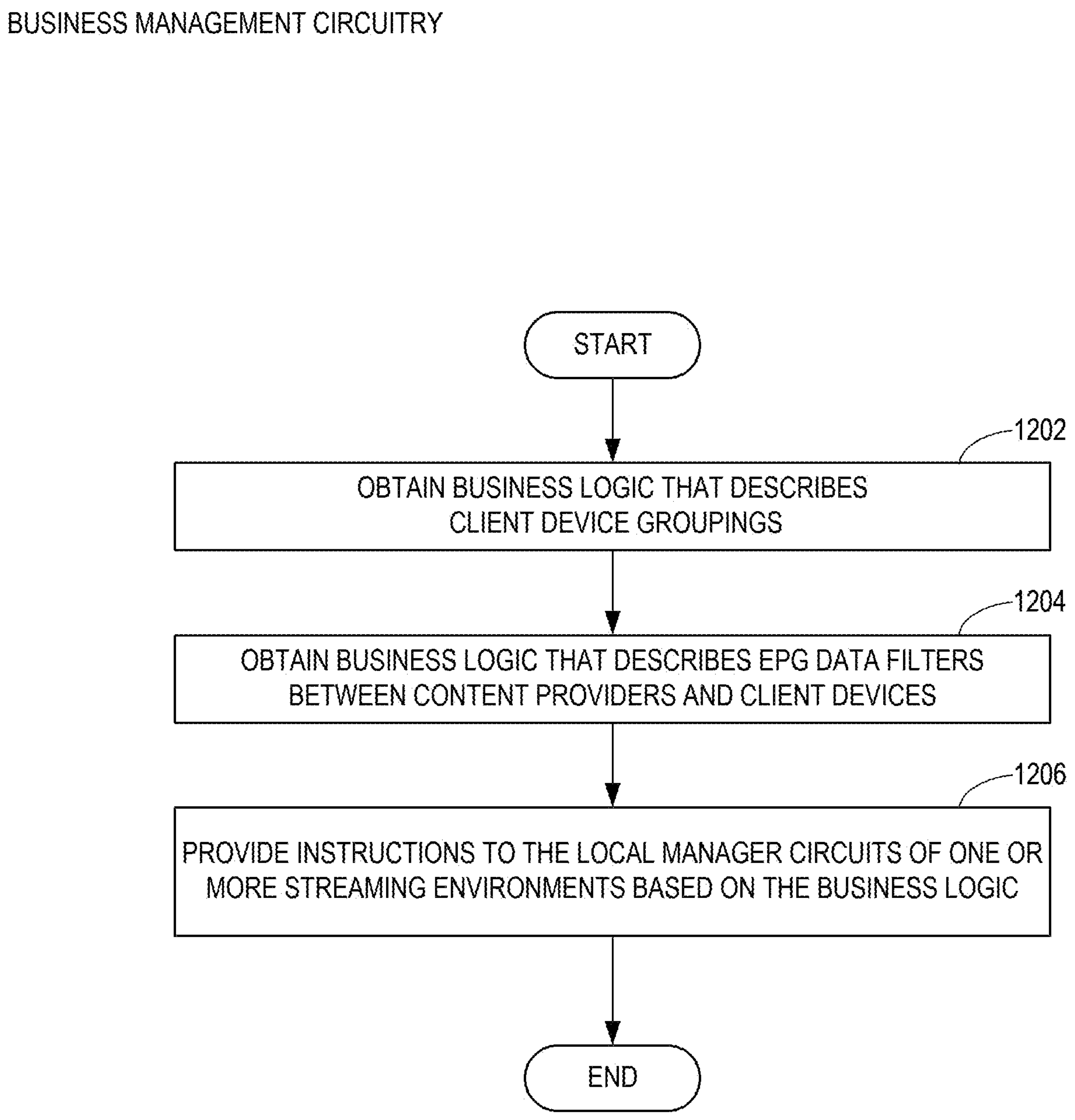
FIG. 12 is a flowchart representative of example machine-readable instructions and/or example operations that may be executed, instantiated, and/or performed to implement the business management circuitry of FIG. 1.

FIG. 12 is a flowchart representative of example machine-readable instructions and/or example operations that may be executed, instantiated, and/or performed to implement the business management circuitry 106 of FIG. 1. The machine-readable instructions and/or operations of FIG. 12 begin when the controller circuitry 804 obtains business logic 810A that describes client device groupings. (Block 1202). In some examples, the business logic at block 1202 also includes additional rules (e.g., ABR removal policies). The controller circuitry 804 may obtain the business logic 810A from an employee via the user interface circuitry 806, from a remote employee via the network interface circuitry 802, or the business logic 810A may be pre-recorded in memory 808.

The controller circuitry 804 obtains business logic 810A that describes EPG data filters between the content providers 102 and the client devices 204. (Block 1204). The controller circuitry 804 may obtain the business logic 810A from an employee via the user interface circuitry 806, from a remote employee via the network interface circuitry 802, or the business logic 810A may be pre-recorded in memory 808.

The controller circuitry 804 provides, via the network interface circuitry 802, instructions to the MMCs 202 of one or more streaming environments 110 based on the business logic 810A. (Block 1206). In some examples, the business logic 810A applies to a single streaming environment 110A. In other examples, the business logic 810A applies to any number of streaming environments that are controlled by the same managing organization (e.g., the owner of the hotel chain). The machine-readable instructions and/or operations of FIG. 12 end after block 1206.

Figure 13:
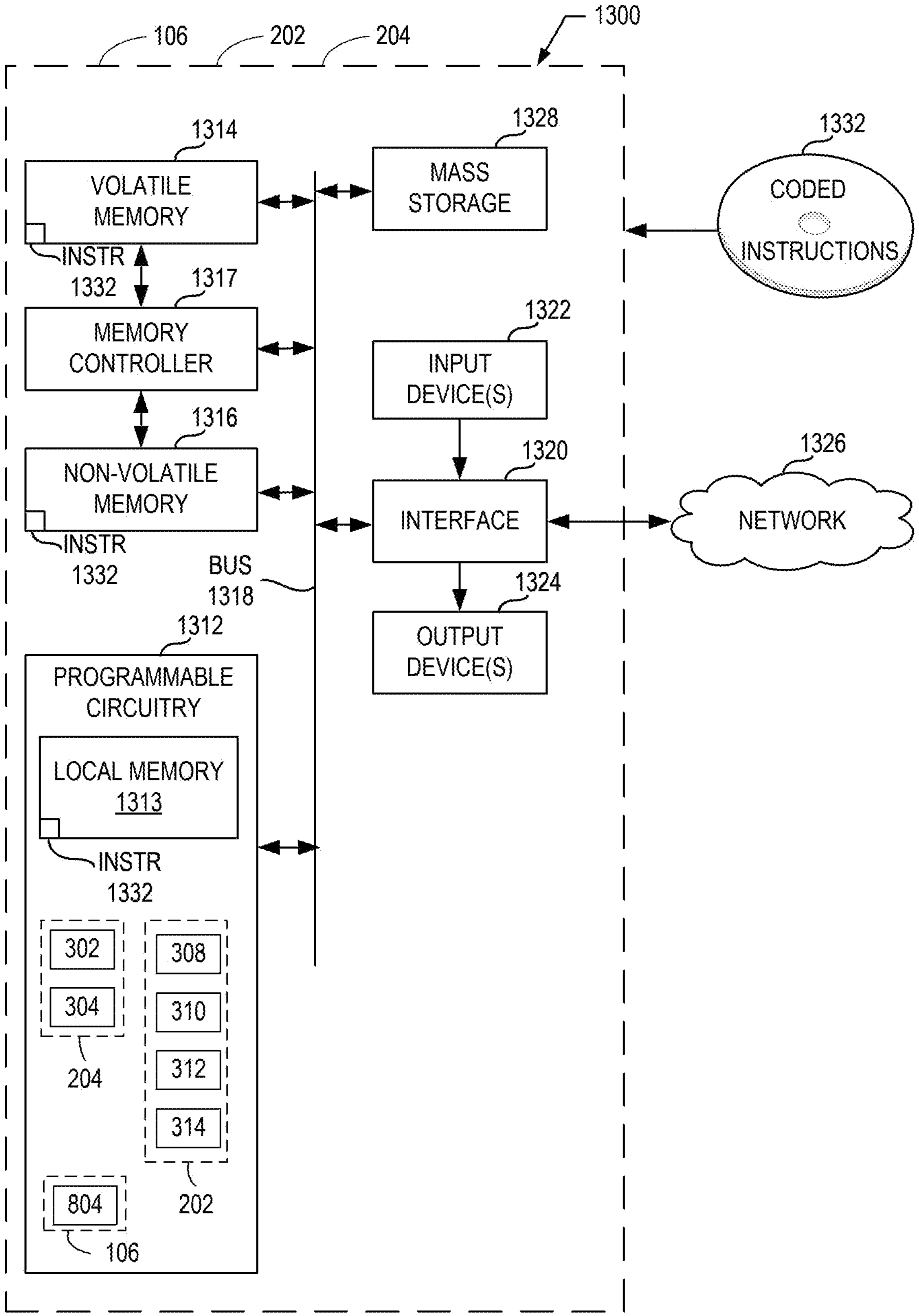
FIG. 13 is a block diagram of an example processing platform including programmable circuitry structured to execute, instantiate, and/or perform the example machine-readable instructions and/or perform the example operations of FIGS. 9A-12 to implement one or more of the business management circuitry 106, the MMC 202A, or the client device 204 of FIGS. 1 and 2.

FIG. 13 is a block diagram of an example programmable circuitry platform 1300 structured to execute and/or instantiate the example machine-readable instructions and/or the example operations of FIGS. 9A-12 to implement one or more of the business management circuitry 106, the MMC 202A, or the client device 204 of FIGS. 1 and 2. The programmable circuitry platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 1300 of the illustrated example includes programmable circuitry 1312. The programmable circuitry 1312 of the illustrated example is hardware. For example, the programmable circuitry 1312 can be implemented by one or more integrated circuits, logic circuits, FPGAs, microprocessors, CPUs, GPUs, DSPs, and/or microcontrollers from any desired family or manufacturer. The programmable circuitry 1312 may be implemented by one or more semiconductor based (e.g., silicon based) devices. In this example, the programmable circuitry 1312 implements one or more of the client service circuitry 302, the media player circuitry 304, the orchestrator circuitry 308, the sessions 310, the timing circuitry 314, and the controller circuitry 804.

The programmable circuitry 1312 of the illustrated example includes a local memory 1313 (e.g., a cache, registers, etc.). The programmable circuitry 1312 of the illustrated example is in communication with main memory 1314, 1316, which includes a volatile memory 1314 and a non-volatile memory 1316, by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317. In some examples, the memory controller 1317 may be implemented by one or more integrated circuits, logic circuits, microcontrollers from any desired family or manufacturer, or any other type of circuitry to manage the flow of data going to and from the main memory 1314, 1316.

The programmable circuitry platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1322 are connected to the interface circuitry 1320. The input device(s) 1322 permit(s) a user (e.g., a human user, a machine user, etc.) to enter data and/or commands into the programmable circuitry 1312. The input device(s) 1322 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1324 are also connected to the interface circuitry 1320 of the illustrated example. The output device(s) 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU. In this example, the output devices 1324 include the display 306 and the speakers 307.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1300 of the illustrated example also includes one or more mass storage discs or devices 1328 to store firmware, software, and/or data. Examples of such mass storage discs or devices 1328 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine-readable instructions 1332, which may be implemented by the machine-readable instructions of FIGS. 9A-12, may be stored in the mass storage device 1328, in the volatile memory 1314, in the non-volatile memory 1316, and/or on at least one non-transitory computer-readable storage medium such as a CD or DVD which may be removable.

Figure 14:
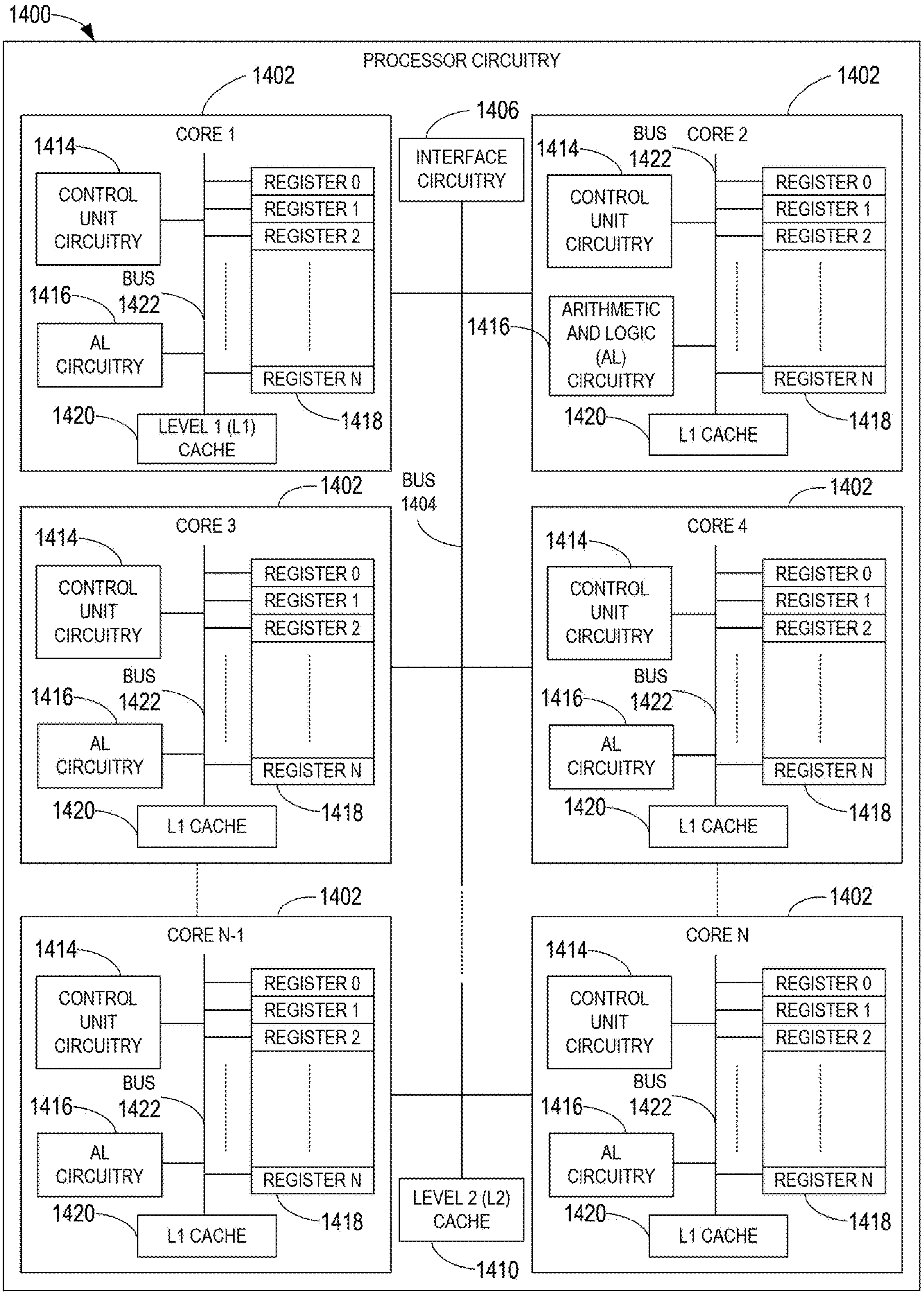
FIG. 14 is a block diagram of an example implementation of the programmable circuitry of FIG. 13.

FIG. 14 is a block diagram of an example implementation of the programmable circuitry 1312 of FIG. 13. In this example, the programmable circuitry 1312 of FIG. 13 is implemented by a microprocessor 1400. For example, the microprocessor 1400 may be a general-purpose microprocessor (e.g., general-purpose microprocessor circuitry). The microprocessor 1400 executes some or all of the machine-readable instructions of the flowcharts of FIGS. 9A-12 to effectively instantiate the circuitry of FIG. 2A as logic circuits to perform operations corresponding to those machine-readable instructions. In some such examples, the circuitry of FIGS. 1 and 2 is instantiated by the hardware circuits of the microprocessor 1400 in combination with the machine-readable instructions. For example, the microprocessor 1400 may be implemented by multi-core hardware circuitry such as a CPU, a DSP, a GPU, an XPU, etc. Although it may include any number of example cores 1402 (e.g., 1 core), the microprocessor 1400 of this example is a multi-core semiconductor device including N cores. The cores 1402 of the microprocessor 1400 may operate independently or may cooperate to execute machine-readable instructions. For example, machine code corresponding to a firmware program, an embedded software program, or a software program may be executed by one of the cores 1402 or may be executed by multiple ones of the cores 1402 at the same or different times. In some examples, the machine code corresponding to the firmware program, the embedded software program, or the software program is split into threads and executed in parallel by two or more of the cores 1402. The software program may correspond to a portion or all of the machine-readable instructions and/or operations represented by the flowcharts of FIGS. 9A-12.

The cores 1402 may communicate by a first example bus 1404. In some examples, the first bus 1404 may be implemented by a communication bus to effectuate communication associated with one(s) of the cores 1402. For example, the first bus 1404 may be implemented by at least one of an Inter-Integrated Circuit (I2C) bus, a Serial Peripheral Interface (SPI) bus, a PCI bus, or a PCIe bus. Additionally or alternatively, the first bus 1404 may be implemented by any other type of computing or electrical bus. The cores 1402 may obtain data, instructions, and/or signals from one or more external devices by example interface circuitry 1406. The cores 1402 may output data, instructions, and/or signals to the one or more external devices by the interface circuitry 1406. Although the cores 1402 of this example include example local memory 1420 (e.g., Level 1 (L1) cache that may be split into an L1 data cache and an L1 instruction cache), the microprocessor 1400 also includes example shared memory 1410 that may be shared by the cores (e.g., Level 2 (L2 cache)) for high-speed access to data and/or instructions. Data and/or instructions may be transferred (e.g., shared) by writing to and/or reading from the shared memory 1410. The local memory 1420 of each of the cores 1402 and the shared memory 1410 may be part of a hierarchy of storage devices including multiple levels of cache memory and the main memory (e.g., the main memory 1314, 1316 of FIG. 13). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1402 may be referred to as a CPU, DSP, GPU, etc., or any other type of hardware circuitry. Each core 1402 includes control unit circuitry 1414, arithmetic and logic (AL) circuitry (sometimes referred to as an ALU) 1416, a plurality of registers 1418, the local memory 1420, and a second example bus 1422. Other structures may be present. For example, each core 1402 may include vector unit circuitry, single instruction multiple data (SIMD) unit circuitry, load/store unit (LSU) circuitry, branch/jump unit circuitry, floating-point unit (FPU) circuitry, etc. The control unit circuitry 1414 includes semiconductor-based circuits structured to control (e.g., coordinate) data movement within the corresponding core 1402. The AL circuitry 1416 includes semiconductor-based circuits structured to perform one or more mathematic and/or logic operations on the data within the corresponding core 1402. The AL circuitry 1416 of some examples performs integer-based operations. In other examples, the AL circuitry 1416 also performs floating-point operations. In yet other examples, the AL circuitry 1416 may include first AL circuitry that performs integer-based operations and second AL circuitry that performs floating-point operations. In some examples, the AL circuitry 1416 may be referred to as an Arithmetic Logic Unit (ALU).

The registers 1418 are semiconductor-based structures to store data and/or instructions such as results of one or more of the operations performed by the AL circuitry 1416 of the corresponding core 1402. For example, the registers 1418 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1418 may be arranged in a bank as shown in FIG. 14. Alternatively, the registers 1418 may be organized in any other arrangement, format, or structure, such as by being distributed throughout the core 1402 to shorten access time. The second bus 1422 may be implemented by at least one of an I2C bus, a SPI bus, a PCI bus, or a PCIe bus.

Each core 1402 and/or, more generally, the microprocessor 1400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1400 is a semiconductor device fabricated to include many transistors interconnected to implement the structures described above in one or more integrated circuits (ICs) contained in one or more packages.

The microprocessor 1400 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1400, in the same chip package as the microprocessor 1400 and/or in one or more separate packages from the microprocessor 1400.

Figure 15:
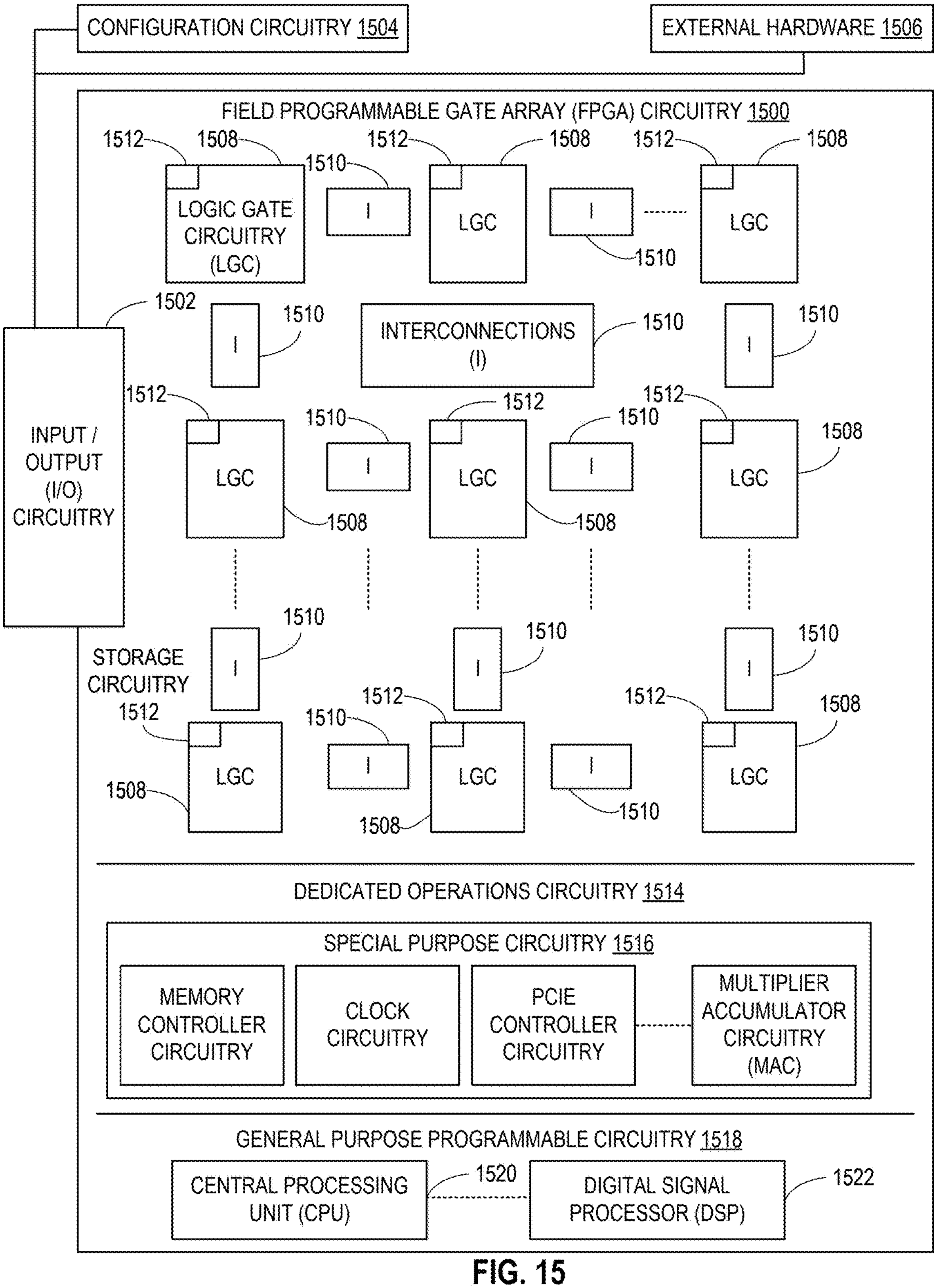
FIG. 15 is a block diagram of another example implementation of the programmable circuitry of FIG. 13.

FIG. 15 is a block diagram of another example implementation of the programmable circuitry 1312 of FIG. 13. In this example, the programmable circuitry 1312 is implemented by FPGA circuitry 1500. For example, the FPGA circuitry 1500 may be implemented by an FPGA. The FPGA circuitry 1500 can be used, for example, to perform operations that could otherwise be performed by the example microprocessor 1400 of FIG. 14 executing corresponding machine-readable instructions. However, once configured, the FPGA circuitry 1500 instantiates the operations and/or functions corresponding to the machine-readable instructions in hardware and, thus, can often execute the operations/functions faster than they could be performed by a general-purpose microprocessor executing the corresponding software.

More specifically, in contrast to the microprocessor 1400 of FIG. 14 described above (which is a general purpose device that may be programmed to execute some or all of the machine-readable instructions represented by the flowchart(s) of FIGS. 9A-12 but whose interconnections and logic circuitry are fixed once fabricated), the FPGA circuitry 1500 of the example of FIG. 15 includes interconnections and logic circuitry that may be configured, structured, programmed, and/or interconnected in different ways after fabrication to instantiate, for example, some or all of the operations/functions corresponding to the machine-readable instructions represented by the flowchart(s) of FIGS. 9A-12. In particular, the FPGA circuitry 1500 may be thought of as an array of logic gates, interconnections, and switches. The switches can be programmed to change how the logic gates are interconnected by the interconnections, effectively forming one or more dedicated logic circuits (unless and until the FPGA circuitry 1500 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 9A-12. As such, the FPGA circuitry 1500 may be configured and/or structured to effectively instantiate some or all of the operations/functions corresponding to the machine-readable instructions of the flowchart(s) of FIGS. 9A-12 as dedicated logic circuits to perform the operations/functions corresponding to those software instructions in a dedicated manner analogous to an ASIC. Therefore, the FPGA circuitry 1500 may perform the operations/functions corresponding to the some or all of the machine-readable instructions of FIGS. 9A-12 faster than the general-purpose microprocessor can execute the same.

In the example of FIG. 15, the FPGA circuitry 1500 is configured and/or structured in response to being programmed (and/or reprogrammed one or more times) based on a binary file. In some examples, the binary file may be compiled and/or generated based on instructions in a hardware description language (HDL) such as Lucid, Very High-Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1500 of FIG. 15 may access and/or load the binary file to cause the FPGA circuitry 1500 of FIG. 15 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1500 of FIG. 15 to cause configuration and/or structuring of the FPGA circuitry 1500 of FIG. 15, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1500 of FIG. 15 may access and/or load the binary file to cause the FPGA circuitry 1500 of FIG. 15 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1500 of FIG. 15 to cause configuration and/or structuring of the FPGA circuitry 1500 of FIG. 15, or portion(s) thereof.

The FPGA circuitry 1500 of FIG. 15, includes example input/output (I/O) circuitry 1502 to obtain and/or output data to/from example configuration circuitry 1504 and/or external hardware 1506. For example, the configuration circuitry 1504 may be implemented by interface circuitry that may obtain a binary file, which may be implemented by a bit stream, data, and/or machine-readable instructions, to configure the FPGA circuitry 1500, or portion(s) thereof. In some such examples, the configuration circuitry 1504 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1506 may be implemented by external hardware circuitry. For example, the external hardware 1506 may be implemented by the microprocessor 1400 of FIG. 14.

The FPGA circuitry 1500 also includes an array of example logic gate circuitry 1508, a plurality of example configurable interconnections 1510, and example storage circuitry 1512. The logic gate circuitry 1508 and the configurable interconnections 1510 are configurable to instantiate one or more operations/functions that may correspond to at least some of the machine-readable instructions of FIGS. 9A-12 and/or other desired operations. The logic gate circuitry 1508 shown in FIG. 15 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1508 to enable configuration of the electrical structures and/or the logic gates to form circuits to perform desired operations/functions. The logic gate circuitry 1508 may include other electrical structures such as look-up tables (LUTs), registers (e.g., flip-flops or latches), multiplexers, etc.

The configurable interconnections 1510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1508 to program desired logic circuits.

The storage circuitry 1512 of the illustrated example is structured to store result(s) of the one or more of the operations performed by corresponding logic gates. The storage circuitry 1512 may be implemented by registers or the like. In the illustrated example, the storage circuitry 1512 is distributed amongst the logic gate circuitry 1508 to facilitate access and increase execution speed.

The example FPGA circuitry 1500 of FIG. 15 also includes example dedicated operations circuitry 1514. In this example, the dedicated operations circuitry 1514 includes special purpose circuitry 1516 that may be invoked to implement commonly used functions to avoid the need to program those functions in the field. Examples of such special purpose circuitry 1516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1500 may also include example general purpose programmable circuitry 1518 such as an example CPU 1520 and/or an example DSP 1522. Other general purpose programmable circuitry 1518 may additionally or alternatively be present such as a GPU, an XPU, etc., that can be programmed to perform other operations.

Although FIGS. 14 and 15 illustrate two example implementations of the programmable circuitry 1312 of FIG. 13, many other approaches are contemplated. For example, FPGA circuitry may include an on-board CPU, such as one or more of the example CPU 1520 of FIG. 14. Therefore, the programmable circuitry 1312 of FIG. 13 may additionally be implemented by combining at least the example microprocessor 1400 of FIG. 14 and the example FPGA circuitry 1500 of FIG. 15. In some such hybrid examples, one or more cores 1402 of FIG. 14 may execute a first portion of the machine-readable instructions represented by the flowchart(s) of FIGS. 9A-12 to perform first operation(s)/function(s), the FPGA circuitry 1500 of FIG. 15 may be configured and/or structured to perform second operation(s)/function(s) corresponding to a second portion of the machine-readable instructions represented by the flowcharts of FIGS. 9A-12, and/or an ASIC may be configured and/or structured to perform third operation(s)/function(s) corresponding to a third portion of the machine-readable instructions represented by the flowcharts of FIGS. 9A-12.

Some or all of the circuitry of FIGS. 1 and 2 may, thus, be instantiated at the same or different times. For example, same and/or different portion(s) of the microprocessor 1400 of FIG. 14 may be programmed to execute portion(s) of machine-readable instructions at the same and/or different times. In some examples, same and/or different portion(s) of the FPGA circuitry 1500 of FIG. 15 may be configured and/or structured to perform operations/functions corresponding to portion(s) of machine-readable instructions at the same and/or different times.

In some examples, some or all of the circuitry of FIGS. 1 and 2 may be instantiated, for example, in one or more threads executing concurrently and/or in series. For example, the microprocessor 1400 of FIG. 14 may execute machine-readable instructions in one or more threads executing concurrently and/or in series. In some examples, the FPGA circuitry 1500 of FIG. 15 may be configured and/or structured to carry out operations/functions concurrently and/or in series. Moreover, in some examples, some or all of the circuitry of FIGS. 1 and 2 may be implemented within one or more virtual machines and/or containers executing on the microprocessor 1400 of FIG. 14.

In some examples, the programmable circuitry 1312 of FIG. 13 may be in one or more packages. For example, the microprocessor 1400 of FIG. 14 and/or the FPGA circuitry 1500 of FIG. 15 may be in one or more packages. In some examples, an XPU may be implemented by the programmable circuitry 1312 of FIG. 13, which may be in one or more packages. For example, the XPU may include a CPU (e.g., the microprocessor 1400 of FIG. 14, the CPU 1520 of FIG. 15, etc.) in one package, a DSP (e.g., the DSP 1522 of FIG. 15) in another package, a GPU in yet another package, and an FPGA (e.g., the FPGA circuitry 1500 of FIG. 15) in still yet another package.

Figure 16:
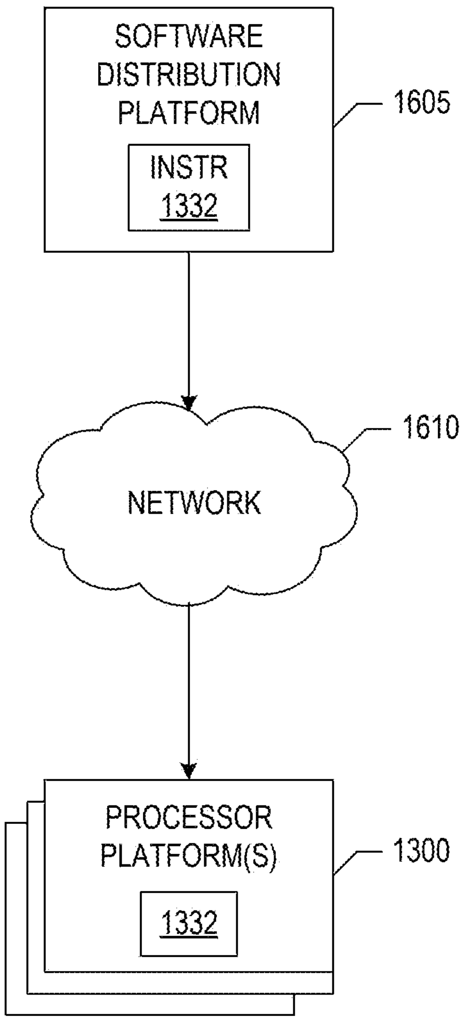
FIG. 16 is a block diagram of an example software/firmware/instructions distribution platform (e.g., one or more servers) to distribute software, instructions, and/or firmware (e.g., corresponding to the example machine-readable instructions of FIGS. 9A-12) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1605 to distribute software such as the example machine-readable instructions 1332 of FIG. 13 to other hardware devices (e.g., hardware devices owned and/or operated by third parties from the owner and/or operator of the software distribution platform) is illustrated in FIG. 16. The example software distribution platform 1605 may be implemented by any computer server, data facility, cloud service, etc., capable of storing and transmitting software to other computing devices. The third parties may be customers of the entity owning and/or operating the software distribution platform 1605. For example, the entity that owns and/or operates the software distribution platform 1605 may be a developer, a seller, and/or a licensor of software such as the example machine-readable instructions 1332 of FIG. 13. The third parties may be consumers, users, retailers, OEMs, etc., who purchase and/or license the software for use and/or re-sale and/or sub-licensing. In the illustrated example, the software distribution platform 1605 includes one or more servers and one or more storage devices. The storage devices store the machine-readable instructions 1332, which may correspond to the example machine-readable instructions of FIGS. 9A-12, as described above. The one or more servers of the example software distribution platform 1605 are in communication with an example network 1610, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third-party payment entity. The servers enable purchasers and/or licensors to download the machine-readable instructions 1332 from the software distribution platform 1605. For example, the software, which may correspond to the example machine-readable instructions of FIGS. 9A-12, may be downloaded to the example programmable circuitry platform 1300, which is to execute the machine-readable instructions 1332 to implement one or more of the business management circuitry 106, the MMC 202A, or the client device 204. In some examples, one or more servers of the software distribution platform 1605 periodically offer, transmit, and/or force updates to the software (e.g., the example machine-readable instructions 1332 of FIG. 13) to ensure improvements, patches, updates, etc., are distributed and applied to the software at the end user devices. Although referred to as software above, the distributed "software" could alternatively be firmware.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real-world imperfections as will be understood by persons of ordinary skill in the art. For example, "approximately" and "about" may indicate such dimensions may be within a tolerance range of +/−11% unless otherwise specified herein.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein, integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that improve the quality of media streams in a streaming environment by performing local network operations based on global business logic. Disclosed systems, apparatus, articles of manufacture, and methods improve the efficiency of using a computing device by using business logic to apply various policies and client device groupings to disable ABR, deconstruct and reformat HTTP segments into multicast data, and filter Electronic Program Guide data to remove certain client devices from accessing media from certain content providers. Disclosed systems, apparatus, articles of manufacture, and methods are accordingly directed to one or more improvement(s) in the operation of a machine such as a computer or other electronic and/or mechanical device.

Example methods, apparatus, systems, and articles of manufacture to provide EPG data are disclosed herein. Further examples and combinations thereof include the following.

Example 1 includes an apparatus to provide electronic programming guide (EPG) data, the apparatus located within a private network and comprising interface circuitry, machine readable instructions, and programmable circuitry to at least one of instantiate or execute the machine readable instructions to obtain a request for EPG data from a client device within the private network, identify a first media stream corresponding to a first copy of content and second media stream corresponding to a second copy of the same content, and provide, in response to the request, EPG data of the first media stream but not the second media stream to the client device, the providing based on one or more EPG filtering policies set by a management organization of the private network.

Example 2 includes the apparatus of example 1, wherein the request is a first request from the client device, and wherein the programmable circuitry is to provide the EPG data of the first media stream to the client device in response to the first request, detect a change in a total bandwidth consumed within the private network, and provide EPG data of the second media stream but not the first media stream in response to a second request from the client device and based on the detected change.

Example 3 includes the apparatus of one or more of examples 1-2, wherein the request is a first request, the client device is a first client device, and the programmable circuitry is to provide the EPG data of the first media stream to the first client device in response to the first request, obtain a second request for EPG data from a second client device within the private network, and provide EPG data for the second media stream but not the first media stream to the second client device in response to the second request.

Example 4 includes the apparatus of one or more of examples 1-3, wherein the first media stream corresponds to a first content provider located outside the private network, the second media stream corresponds to a second content provider located outside the private network, and the programmable circuitry is to provide the EPG data of the first media stream but not the second media stream to the client device based on a connection between the programmable circuitry and the first content provider having a larger bandwidth than a connection between the programmable circuitry and the second content provider.

Example 5 includes the apparatus of one or more of examples 1-4, wherein the first media stream corresponds to a first content provider located outside the private network, the second media stream corresponds to a second content provider located outside the private network, and the programmable circuitry is to provide the EPG data of the first media stream but not the second media stream to the client device based on a difference in price between the first content provider and the second content provider.

Example 6 includes the apparatus of one or more of examples 1-5, wherein the first media stream corresponds to a first video resolution and the second media stream correspond to a second video resolution that is different than the first video resolution.

Example 7 includes the apparatus of one or more of examples 1-6, wherein the programmable circuitry is to provide the EPG data of the first media stream but not the second media stream to the client device because the client device does not support media playback at the second video resolution.

Example 8 includes the apparatus of one or more of examples 1-7, wherein the media stream is a linear television channel.

Example 9 includes the apparatus of example one or more of examples 1-8, wherein the programmable circuitry is to identify a plurality of media streams, remove a media stream whose corresponding content is not available on another media steam in the plurality, and provide EPG data of the remaining media streams to the client device.

Example 10 includes the apparatus of one or more of examples 1-9, wherein the programmable circuitry is to remove the media stream based on one or more of a genre of the content, a time of day, and a property shared across a group of client devices within the private network, the group to include the client device.

Example 11 includes the apparatus of one or more of examples 1-10, wherein the programmable circuitry is to provide EPG data corresponding to a plurality of media streams to the client device, and instruct the client device to display the EPG data within a user interface in an order that is different from a default order.

Example 12 includes the apparatus of one or more of examples 1-11, wherein the programmable circuitry is to determine the order in which EPG data is displayed within the user interface based on one or more of a genre of the content, a time of day, and a property shared across a group of client devices within the private network, the group to include the client device.

Example 13 includes a non-transitory machine readable storage medium comprising instructions to cause programmable circuitry located within a private network to at least obtain a request for electronic programming guide (EPG) data from a client device within the private network, identify a first media stream corresponding to a first copy of content and second media stream corresponding to a second copy of the same content, and provide, in response to the request, EPG data of the first media stream but not the second media stream to the client device, the providing based on one or more EPG filtering policies set by a management organization of the private network.

Example 14 includes the non-transitory machine readable storage medium of example 13, wherein the request is a first request from the client device, and wherein the programmable circuitry is to provide the EPG data of the first media stream to the client device in response to the first request, detect a change in a total bandwidth consumed within the private network, and provide EPG data of the second media stream but not the first media stream in response to a second request from the client device and based on the detected change.

Example 15 includes the non-transitory machine readable storage medium of one or more of examples 13-14, wherein the request is a first request, the client device is a first client device, and the programmable circuitry is to transmit the EPG data of the first media stream to the first client device in response to the first request, obtain a second request for EPG data from a second client device within the private network, and transmit EPG data for the second media stream but not the first media stream to the second client device in response to the second request.

Example 16 includes the non-transitory machine readable storage medium of one or more of examples 13-15, wherein the first media stream corresponds to a first content provider located outside the private network, the second media stream corresponds to a second content provider located outside the private network, and the programmable circuitry is to provide the EPG data of the first media stream to the client device based on a connection between the programmable circuitry and the first content provider having a larger bandwidth than a connection between the programmable circuitry and the second content provider.

Example 17 includes the non-transitory machine readable storage medium of one or more of examples 13-16, wherein the first media stream corresponds to a first content provider located outside the private network, the second media stream corresponds to a second content provider located outside the private network, and the programmable circuitry is to provide the EPG data of the first media stream but not the second media stream to the client device based on a difference in price between the first content provider and the second content provider.

Example 18 includes the non-transitory machine readable storage medium of one or more of examples 13-17, wherein the first media stream corresponds to a first video resolution and the second media stream correspond to a second video resolution that is different than the first video resolution.

Example 19 includes the non-transitory machine readable storage medium of one or more of examples 13-18, wherein the programmable circuitry is to provide the EPG data of the first media stream but not the second media stream to the client device because the client device does not support media playback at the second video resolution.

Example 20 includes the non-transitory machine readable storage medium of one or more of examples 13-19, wherein the media stream is a linear television channel.

Example 21 includes the non-transitory machine readable storage medium of one or more of examples 13-20, wherein the programmable circuitry is to identify a plurality of media streams, remove a media stream whose corresponding content is not available on another media steam in the plurality, and provide EPG data of the remaining media streams to the client device.

Example 22 includes the non-transitory machine readable storage medium of one or more of examples 13-21, wherein the programmable circuitry is to remove the media stream based on one or more of a genre of the content, a time of day, and a property shared across a group of client devices within the private network, the group to include the client device.

Example 23 includes the non-transitory machine readable storage medium of one or more of examples 13-22, wherein the programmable circuitry is to provide EPG data corresponding to a plurality of media streams to the client device, and instruct the client device to display the EPG data within a user interface in an order that is different from a default order.

Example 24 includes the non-transitory machine readable storage medium of one or more of examples 13-23, wherein the programmable circuitry is to determine the order in which EPG data is displayed within the user interface based on one or more of a genre of the content, a time of day, and a property shared across a group of client devices within the private network, the group to include the client device.

Example 25 includes a method comprising obtaining a request for electronic programming guide (EPG) data from a client device within a private network, identifying a first media stream corresponding to a first copy of content and second media stream corresponding to a second copy of the same content, and providing, in response to the request, EPG data of the first media stream but not the second media stream to the client device, the providing based on one or more EPG filtering policies set by a management organization of the private network.

Example 26 includes the method of example 25, wherein the request is a first request from the client device, and wherein the method includes providing the EPG data of the first media stream to the client device in response to the first request, detecting a change in a total bandwidth consumed within the private network, and providing EPG data of the second media stream but not the first media stream in response to a second request from the client device and based on the detected change.

Example 27 includes the method of one or more of examples 25-26, wherein the request is a first request from the client device, and wherein the method includes providing the EPG data of the first media stream to the first client device in response to the first request, obtaining a second request for EPG data from a second client device within the private network, and providing EPG data for the second media stream but not the first media stream to the second client device in response to the second request.

Example 28 includes the method of one or more of examples 25-27, wherein the first media stream corresponds to a first content provider located outside the private network, the second media stream corresponds to a second content provider located outside the private network, and the method includes providing, with programmable circuitry, the EPG data of the first media stream but not the second media stream to the client device based on a connection between the programmable circuitry and the first content provider having a larger bandwidth than a connection between the programmable circuitry and the second content provider.

Example 29 includes the method of one or more of examples 25-28, wherein the first media stream corresponds to a first content provider located outside the private network, the second media stream corresponds to a second content provider located outside the private network, and the method includes providing the EPG data of the first media stream but not the second media stream to the client device based on a difference in price between the first content provider and the second content provider.

Example 30 includes the method of one or more of examples 25-29, wherein the first media stream corresponds to a first video resolution and the second media stream correspond to a second video resolution that is different than the first video resolution.

Example 31 includes the method of one or more of examples 25-30, includes providing the EPG data of the first media stream but not the second media stream to the client device because the client device does not support media playback at the second video resolution.

Example 32 includes the method of one or more of examples 25-31, wherein the media stream is a linear television channel.

Example 33 includes the method of one or more of examples 25-32, including identifying a plurality of media streams, removing a media stream whose corresponding content is not available on another media steam in the plurality, and providing EPG data of the remaining media streams to the client device.

Example 34 includes the method of one or more of examples 25-33, including removing the media stream based on one or more of a genre of the content, a time of day, and a property shared across a group of client devices within the private network, the group to include the client device.

Example 35 includes the method of one or more of examples 25-34, including providing EPG data corresponding to a plurality of media streams to the client device, and instructing the client device to display the EPG data within a user interface in an order that is different from a default order.

Example 36 includes the method of one or more of examples 25-35, including determining the order in which EPG data is displayed within the user interface based on one or more of a genre of the content, a time of day, and a property shared across a group of client devices within the private network, the group to include the client device.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus to provide electronic programming guide (EPG) data, the apparatus comprising:

interface circuitry;

machine readable instructions; and programmable circuitry to at least one of instantiate or execute the machine readable instructions to:

obtain a request for EPG data from a client device within a private network;

identify a first media stream corresponding to a first copy of content and second media stream corresponding to a second copy of the same content; and provide, in response to the request, EPG data of the first media stream but not the second media stream to the client device, the providing based on one or more EPG filtering policies set by a management organization of the private network.

2. The apparatus of claim 1, wherein the request is a first request from the client device, and wherein the programmable circuitry is to:

provide the EPG data of the first media stream to the client device in response to the first request;

detect a change in a total bandwidth consumed within the private network; and provide EPG data of the second media stream but not the first media stream in response to a second request from the client device and based on the detected change.

3. The apparatus of claim 1, wherein the request is a first request, the client device is a first client device, and the programmable circuitry is to:
   transmit the EPG data of the first media stream to the first client device in response to the first request;
   obtain a second request for EPG data from a second client device within the private network; and
   transmit EPG data for the second media stream but not the first media stream to the second client device in response to the second request.

4. The apparatus of claim 1, wherein:
   the first media stream corresponds to a first content provider located outside the private network;
   the second media stream corresponds to a second content provider located outside the private network; and
   the programmable circuitry is to provide the EPG data of the first media stream but not the second media stream to the client device based on a connection between the programmable circuitry and the first content provider having a larger bandwidth than a connection between the programmable circuitry and the second content provider.

5. The apparatus of claim 1, wherein:
   the first media stream corresponds to a first content provider located outside the private network;
   the second media stream corresponds to a second content provider located outside the private network; and
   the programmable circuitry is to provide the EPG data of the first media stream but not the second media stream to the client device based on a difference in price between the first content provider and the second content provider.

6. The apparatus of claim 1, wherein the first media stream corresponds to a first video resolution and the second media stream corresponds to a second video resolution that is different than the first video resolution.

7. The apparatus of claim 6, wherein the programmable circuitry is to provide the EPG data of the first media stream but not the second media stream to the client device because the client device does not support media playback at the second video resolution.

8. The apparatus of claim 1, wherein the media stream is a linear television channel.

9. The apparatus of claim 1, wherein the programmable circuitry is to:
   identify a plurality of media streams;
   remove a media stream whose corresponding content is not available on another media steam in the plurality; and
   provide EPG data of the remaining media streams to the client device.

10. The apparatus of claim 9, wherein the programmable circuitry is to remove the media stream based on one or more of:
   a genre of the content;
   a time of day; and
   a property shared across a group of client devices within the private network, the group to include the client device.

11. The apparatus of claim 1, wherein the programmable circuitry is to:
   provide EPG data corresponding to a plurality of media streams to the client device; and
   instruct the client device to display the EPG data within a user interface in an order that is different from a default order.

12. The apparatus of claim 11, wherein the programmable circuitry is to determine the order in which EPG data is displayed within the user interface based on one or more of:
   a genre of the content;
   a time of day; and
   a property shared across a group of client devices within the private network, the group to include the client device.

13. A non-transitory machine readable storage medium comprising instructions to cause programmable circuitry located within a private network to at least:
   obtain a request for electronic programming guide (EPG) data from a client device within the private network;
   identify a first media stream corresponding to a first copy of content and second media stream corresponding to a second copy of the same content; and
   provide, in response to the request, EPG data of the first media stream but not the second media stream to the client device, the providing based on one or more EPG filtering policies set by a management organization of the private network.

14. The non-transitory machine readable storage medium of claim 13, wherein the request is a first request from the client device, and wherein the programmable circuitry is to:
   provide the EPG data of the first media stream to the client device in response to the first request;
   detect a change in a total bandwidth consumed within the private network; and
   provide EPG data of the second media stream but not the first media stream in response to a second request from the client device and based on the detected change.

15. The non-transitory machine readable storage medium of claim 13, wherein the request is a first request, the client device is a first client device, and the programmable circuitry is to:
   transmit the EPG data of the first media stream to the first client device in response to the first request;
   obtain a second request for EPG data from a second client device within the private network; and
   transmit EPG data for the second media stream but not the first media stream to the second client device in response to the second request.

16. The non-transitory machine readable storage medium of claim 13, wherein:
   the first media stream corresponds to a first content provider located outside the private network;
   the second media stream corresponds to a second content provider located outside the private network; and
   the programmable circuitry is to provide the EPG data of the first media stream to the client device based on a connection between the programmable circuitry and the first content provider having a larger bandwidth than a connection between the programmable circuitry and the second content provider.

17. The non-transitory machine readable storage medium of claim 13, wherein:
   the first media stream corresponds to a first content provider located outside the private network;
   the second media stream corresponds to a second content provider located outside the private network; and
   the programmable circuitry is to provide the EPG data of the first media stream but not the second media stream to the client device based on a difference in price between the first content provider and the second content provider.

18. The non-transitory machine readable storage medium of claim 13, wherein the programmable circuitry is to:

identify a plurality of media streams;

remove a media stream whose corresponding content is not available on another media steam in the plurality; and provide EPG data of the remaining media streams to the client device.

19. The non-transitory machine readable storage medium of claim 18, wherein the programmable circuitry is to remove the media stream based on one or more of:

a genre of the content;

a time of day; and a property shared across a group of client devices within the private network, the group to include the client device.

20. A method comprising:

obtaining a request for electronic programming guide (EPG) data from a client device within a private network;

identifying a first media stream corresponding to a first copy of content and second media stream corresponding to a second copy of the same content; and providing, in response to the request, EPG data of the first media stream but not the second media stream to the client device, the providing based on one or more EPG filtering policies set by a management organization of the private network.

* * * * *